(12) United States Patent
Kamata et al.

(10) Patent No.: US 6,313,904 B1
(45) Date of Patent: Nov. 6, 2001

(54) LENS-FITTED PHOTO FILM UNIT AND METHOD OF PRODUCING PHOTOGRAPHIC PRINT

(75) Inventors: Kazuo Kamata; Mitsuro Kamata, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/665,900

(22) Filed: Sep. 20, 2000

Related U.S. Application Data

(62) Division of application No. 09/186,682, filed on Nov. 5, 1998.

(30) Foreign Application Priority Data

Nov. 13, 1997 (JP) .................................................. 9-311864
Dec. 18, 1997 (JP) .................................................. 9-349210
Dec. 18, 1997 (JP) .................................................. 9-349271
Mar. 26, 1998 (JP) ................................................. 10-788557

(51) Int. Cl.⁷ .................................................. G03B 27/52
(52) U.S. Cl. ................................ 355/40; 355/32; 355/41; 396/311
(58) Field of Search ................................ 396/6, 310, 311, 396/317, 319, 316, 318, 332, 60; 355/40, 41, 32, 38

(56) References Cited

U.S. PATENT DOCUMENTS

| | | |
|---|---|---|
| 5,343,265 | 8/1994 | Oi et al. . |
| 5,471,265 | 11/1995 | Shibata et al. . |
| 5,517,266 | 5/1996 | Funaki et al. . |
| 5,587,752 | 12/1996 | Petruchik . |
| 5,619,738 | 4/1997 | Petruchik et al. . |
| 5,758,216 | 5/1998 | Arnold . |
| 5,784,658 | 7/1998 | Hata et al. . |
| 5,995,197 | * 11/1999 | Yoshino .................... 355/40 |

* cited by examiner

Primary Examiner—Alan A. Mathews
(74) Attorney, Agent, or Firm—Young & Thompson

(57) ABSTRACT

A lens-fitted photo film unit incorporates a mechanism for taking an exposure, and is pre-loaded with unexposed photo film. A telephoto selectable type indicia is imprinted previously on a first edge of the photo film outside imaging frames in an optical manner. An indicia recorder imprints a magnification indicia on a second edge of the photo film outside the imaging frames in an optical manner each time that one exposure is taken. A combination of the telephoto selectable type indicia and the magnification indicia designates a printing condition for each of the imaging frames.

8 Claims, 47 Drawing Sheets

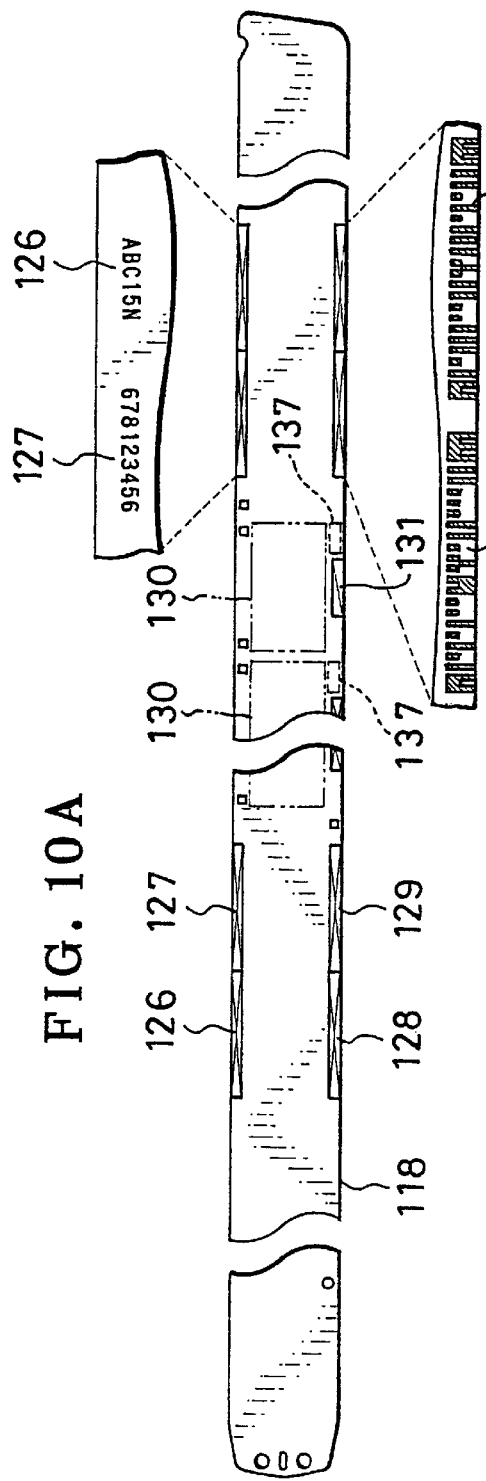
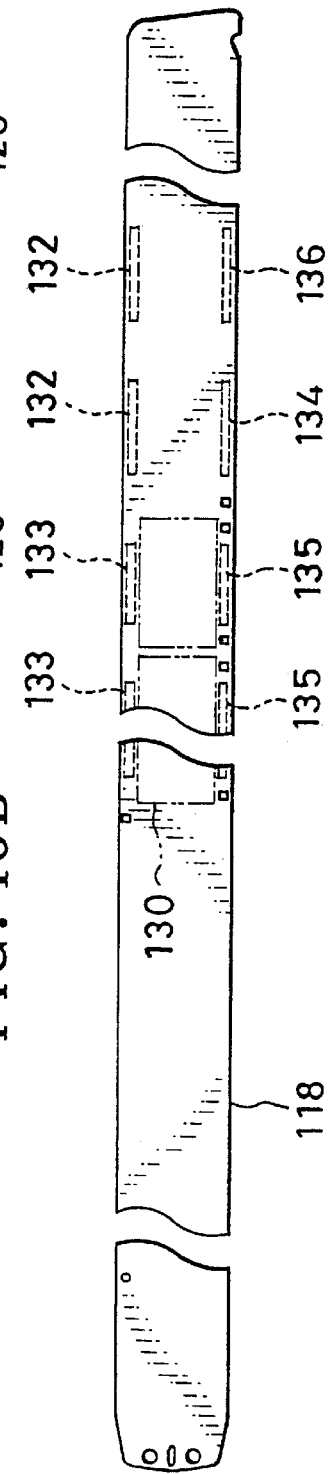
FIG. 10A
FIG. 10B
FIG. 10C

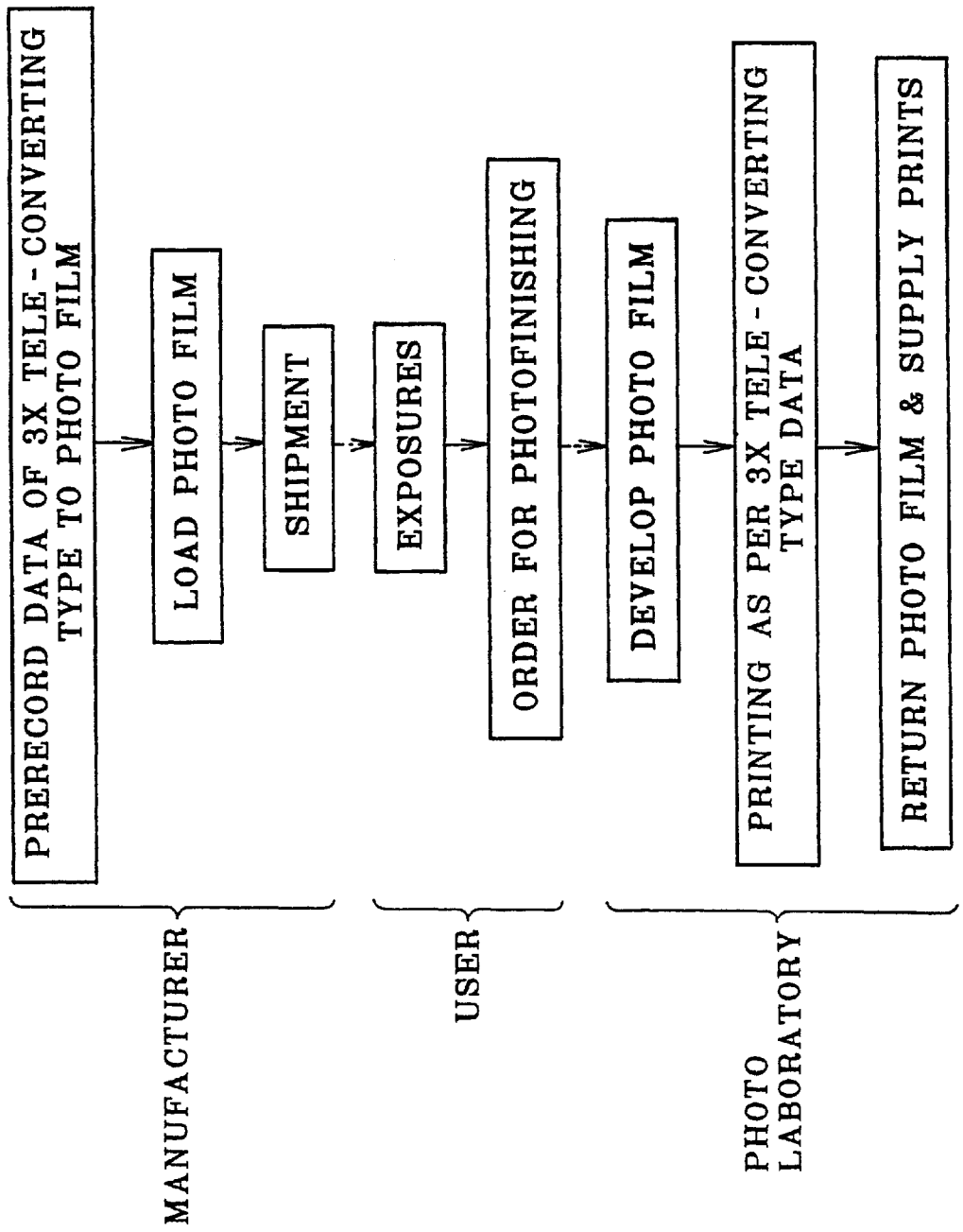

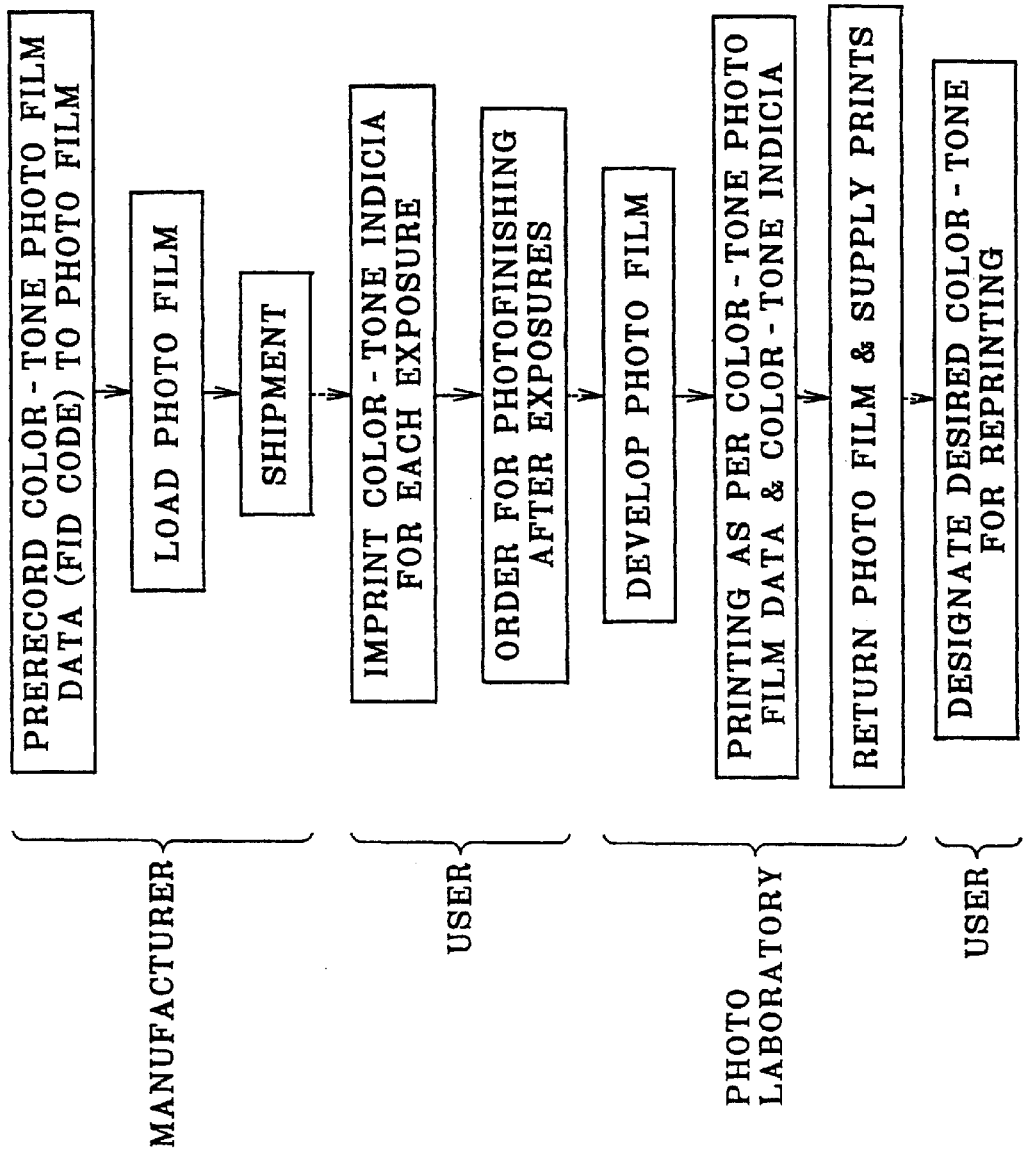

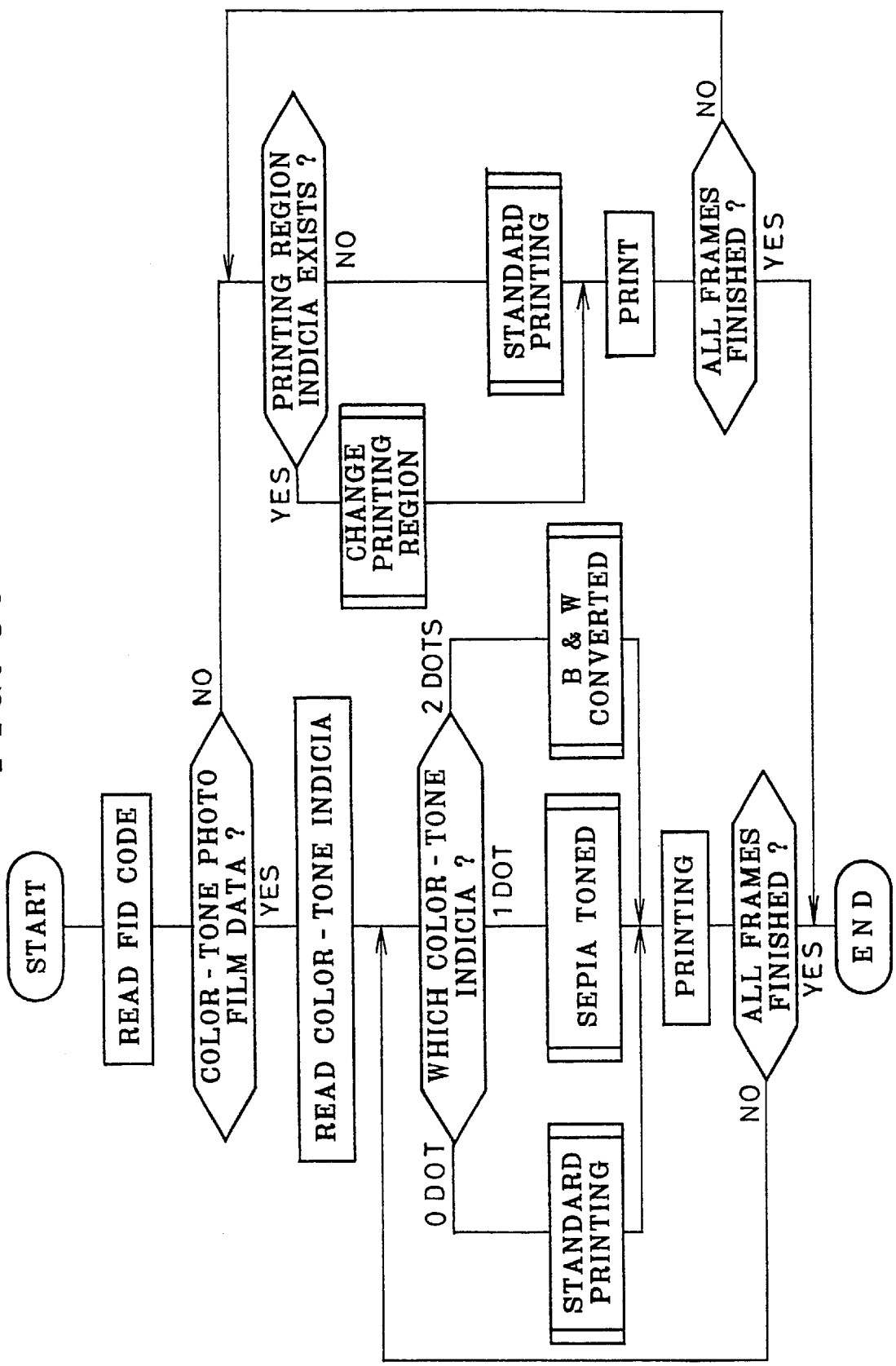

ically for every imaging frame. According to the present invention, the photo film has photo film data, prerecorded thereon, for signaling a printing condition directly or indirectly, the printing condition being predetermined for production of a photographic print from an imaging frame.

LENS-FITTED PHOTO FILM UNIT AND METHOD OF PRODUCING PHOTOGRAPHIC PRINT

CROSS-REFERENCE TO RELATED APPLICATIONS

This application is a division of copending application Ser. No. 09/186,682, filed Nov. 5, 1988.

BACKGROUND OF THE INVENTION

1. Field of the Invention

The present invention relates to a lens-fitted photo film unit and a method of producing a photographic print. More particularly, the present invention relates to a lens-fitted photo film unit and a method of producing a photographic print, which are adapted to photographic printing service of various types.

2. Description Related to the Prior Art

There is a known type of lens-fitted photo film unit in which a frame size is changeable between a standard size and a panoramic size, and either is determined selectively to take an exposure. The lens-fitted photo film unit has two light-shielding plates rotatable upon being operated externally on the rear of an exposure unit. In the exposure of the panoramic size, a width of the exposure aperture defining an exposure region is reduced. Another type of the lens-fitted photo film unit is sold in the market. In this type, an exposure mode is changeable between a macroscopic mode and a standard mode. An additional lens element is movably disposed to set either of the exposure modes.

Also there is a type of the lens-fitted photo film unit in which a taking lens has a great focal length for telephotography. A length of an optical path from the taking lens to the photo film is considerably great. Therefore two mirrors are incorporated in its optical system for forming the optical path in a Z-shape. This is effective in reducing a back-to-front thickness of the lens-fitted photo film unit to ensure portability.

According to the Advanced Photo System, there is a photo film cassette of IX 240 type, of which a back surface of the photo film is wholly coated with a coating of a transparent magnetic recording layer. Various data are recordable to the magnetic recording layer, including data for designating the number of photographic prints to be produced, data for designating a printing aspect ratio irrespective of the equal size of the exposure region, and other data of printing conditions. Note that types of the printing aspect ratio includes the H size or standard size (89×158 mm), the panoramic size (89×254 mm) and the C size (89×127 mm).

There is also a known method of image synthesis for use with the lens-fitted photo film unit. Additional transparent film is previously supplied, has an auxiliary image such as letters or symbols printed thereon, and is fitted on sides or at corners of an exposure aperture of the lens-fitted photo film unit. Each time that an exposure is taken in the lens-fitted photo film unit, the letters or symbols are exposed to overlap on the predetermined position of the imaging frame.

According to the known photofinishing system associated with the IX 240 type of the photo film, only the above-described kinds of printing service are available. To extend variety in the printing service for the lens-fitted photo film unit, it is conceivable to provide the lens-fitted photo film unit with a magnetic recorder device. However the magnetic recorder device is expensive, and essentially inconsistent with the lens-fitted photo film unit of which a cost should be low. It is practically possible to provide the lens-fitted photo film unit with a selector mechanism of a low cost for the purpose of changing the size of the exposure region or designating a macroscopic mode. However any other selector mechanism more complex than those types would be impractical, such as a mechanism for changing over the focal length of the taking lens.

In the above telephoto type of the lens-fitted photo film unit, the optical path is Z-shaped in view of the portability. However, there remains a problem in a considerable size in comparison with the standard type of the lens-fitted photo film unit. The optical system for determining the Z-shape of the optical path increases the manufacturing cost.

It is possible for a user orally to instruct a photofinisher to apply a desired one of the printing conditions when he or she requests photofinishing. However, he or she must give suitable instructions in relation to each strip of photo film, each imaging frame, and each of the printing conditions. There is a possibility of errors in such instructions. In a photo laboratory, printing operation is complicated due to the printing conditions designated separately between the imaging frames and strips of photo films.

The photo film exposed in the lens-fitted photo film unit having the mechanism for the image synthesis includes the auxiliary image exposed together with the subject image. Even if the user wishes to obtain the photographic print from which the auxiliary image such as letters or symbols is eliminated, it is impossible to produce such prints.

SUMMARY OF THE INVENTION

In view of the foregoing problems, an object of the present invention is to provide a lens-fitted photo film unit of which photo film can be subjected to printing in extended variety of printing service without high cost.

Another object of the present invention is to provide a lens-fitted photo film unit and a photographic print producing method in which efficiency of printing operation with the photo film can be high even with the extended variety of printing service.

Still another object of the present invention is to provide a lens-fitted photo film unit and a photographic print producing method in which photo film can be subjected to printing with image synthesis at a low cost easily.

In order to achieve the above and other objects and advantages of this invention, a lens-fitted photo film unit is provided with a housing which incorporates a mechanism for taking an exposure, and is pre-loaded with unexposed photo film. Plural optical indicia are imprinted in an optical manner in positions outside each imaging frame on the photo film, the positions being different from one another, a combination of the plural optical indicia designating a printing condition for printing of the each imaging frame.

In a preferred embodiment, a first optical indicia is imprinted previously on a first edge of the photo film outside imaging frames in an optical manner. An indicia recorder imprints a second optical indicia on a second edge of the photo film outside the imaging frames in an optical manner each time that one exposure is taken, wherein a combination of the first and second optical indicia designates a printing condition for each of the imaging frames.

According to one aspect of the present invention, the photo film has photo film data, prerecorded thereon, for signaling a printing condition directly or indirectly, the printing condition being predetermined for production of a photographic print from an imaging frame.

Furthermore, the printing condition is to trim a predetermined trimmed region from an exposure region of the each imaging frame exposed through a taking lens, and to obtain the photographic print by enlarging the predetermined trimmed region at a predetermined printing magnification.

In another preferred embodiment, an operation member is externally operable, for selecting one of plural printing conditions for each of imaging frames, the plural printing conditions being predetermined for producing a photographic print from the imaging frames. An indicia recorder optically imprints a predetermined optical indicia on the photo film at the each imaging frame in association with the one printing condition. The photo film has photo film data, prerecorded thereon, for signaling directly or indirectly that the optical indicia designates the one printing condition.

Furthermore, the printing condition is to enlarge the each imaging frame in two directions at respective printing magnifications in accordance with the optical indicia to obtain the photographic print, the two directions being parallel to respectively shorter and longer sides of a rectangular exposure region of the each imaging frame.

The photo film further includes a magnetic recording layer formed on a back surface opposite to an emulsion surface. The photo film data is magnetically recorded in a magnetic data track predetermined in the magnetic recording layer.

The photo film data is imprinted optically.

In a photographic print producing method, it is determined whether photo film data exists on the photo film, the photo film data representing a predetermined printing condition directly or indirectly. If the photo film data exists on the photo film, the printer is controlled according to the predetermined printing condition, so as to obtain the photographic print.

Furthermore, the printer is a digital printer in which an image of the imaging frame is photoelectrically converted to obtain image data, and the image is optically exposed on photographic paper according to the image data. The image data is processed according to the predetermined printing condition.

In a preferred embodiment, it is determined whether an optical indicia exists for the imaging frame on the photo film, the optical indicia being predetermined for one of plural printing conditions. It is determined whether photo film data exists on the photo film, the photo film data signaling directly or indirectly that the optical indicia designates the one printing condition. If the optical indicia and the photo film data exist on the photo film, the printer is controlled according to the one printing condition, so as to obtain the photographic print.

According to another aspect of the present invention, an operation member is externally operable, for selecting one of plural printing color-tone conditions for each of imaging frames, the plural printing color-tone conditions being predetermined for producing a photographic print from the imaging frames. A color-tone indicia recorder optically imprints a predetermined color-tone indicia on the photo film at the each imaging frame in association with the one printing color-tone condition. The photo film has photo film data, prerecorded thereon, for signaling directly or indirectly that the color-tone indicia designates the one printing color-tone condition.

Furthermore, the printing color-tone conditions associated with respectively the color-tone indicia are color printing, black-and-white printing, and monochromatic printing of a toned color.

According to still another aspect of the present invention, the photo film includes encoded auxiliary image data, recorded magnetically or optically in a position outside the imaging frame or a position keeping the exposure safe, for representing a type of an auxiliary image, the auxiliary image being combined with the subject image for image synthesis in production of a photographic print.

Furthermore, the auxiliary image data is a single type of auxiliary image data, and the single type is recorded for each of imaging frames on the photo film.

In a preferred embodiment, the photo film includes encoded auxiliary image data, recorded magnetically or optically in a position outside the imaging frame or a position keeping the exposure safe, for representing a type of an auxiliary image, the auxiliary image being combined with the subject image for image synthesis in production of a photographic print. An operation member is operable externally, for selecting one of first and second predetermined printing conditions for the imaging frame, wherein the first printing condition is to print the subject image with the auxiliary image according to the imaging frame, and the second printing condition is to print the subject image without the auxiliary image according to the imaging frame. A data recorder records data of the one printing condition to the photo film for the imaging frame.

In another preferred embodiment, a data recorder records encoded auxiliary image data to the photo film magnetically or optically in a position outside the imaging frame or a position keeping the exposure safe, the encoded auxiliary image data representing a type of an auxiliary image, the auxiliary image being combined with the subject image for image synthesis in production of a photographic print.

BRIEF DESCRIPTION OF THE DRAWINGS

The above objects and advantages of the present invention will become more apparent from the following detailed description when read in connection with the accompanying drawings, in which:

FIG. 10A is an explanatory view illustrating an emulsion surface of the photo film;

FIG. 10B is an explanatory view illustrating a back surface of the photo film;

FIG. 10C is an explanatory view illustrating a layered structure of the photo film;

FIG. 24 is a flow chart illustrating a process of a system in which the lens-fitted photo film unit is used;

FIG. 37 is a flow chart illustrating a color-tone indicia;

FIG. 39 is a flow chart illustrating an operation of the digital printer;

DETAILED DESCRIPTION OF THE PREFERRED EMBODIMENTS OF THE PRESENT INVENTION

Figure 1:
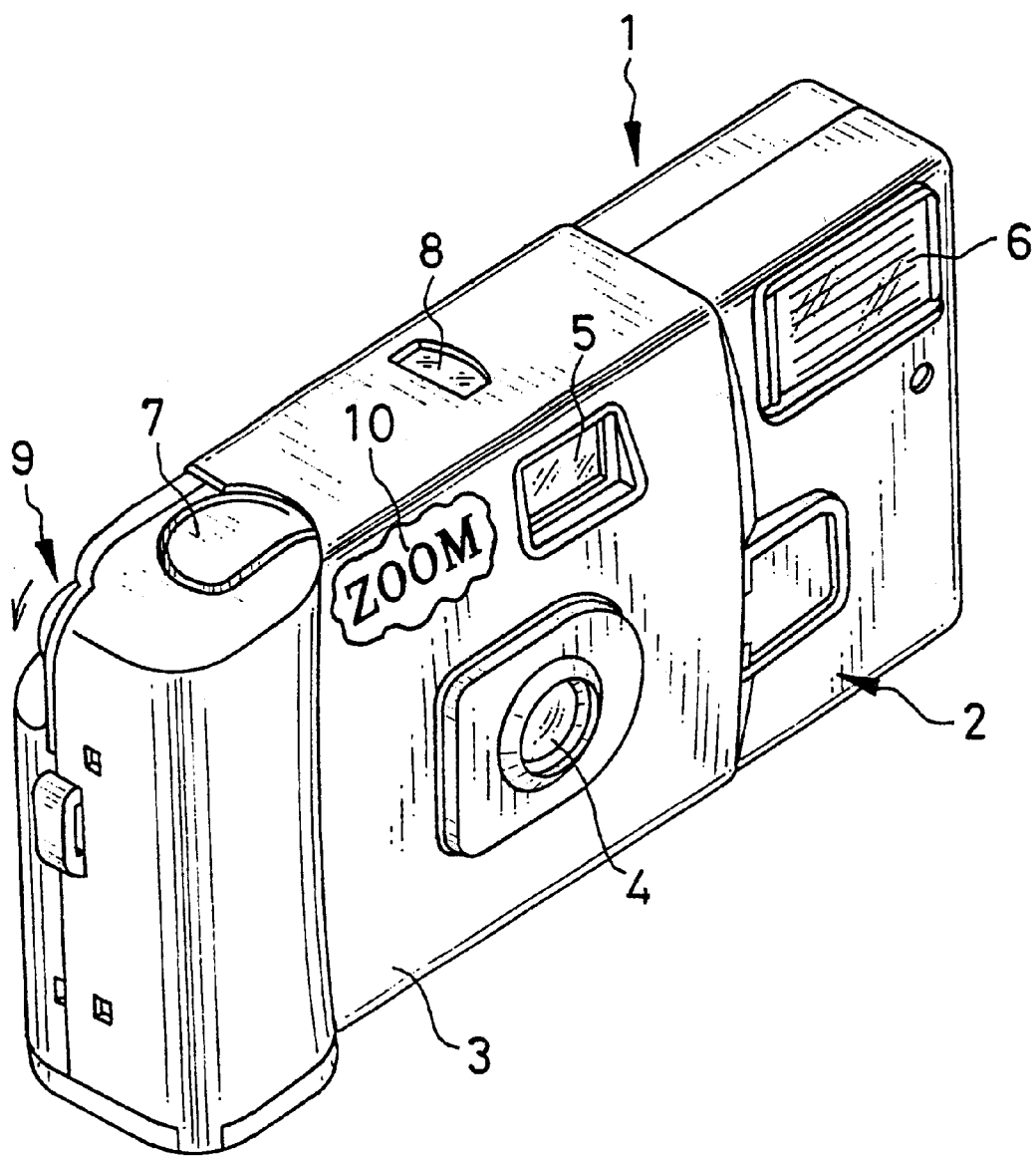
FIG. 1 is a perspective illustrating a lens-fitted photo film unit.

In FIG. 1, a lens-fitted photo film unit 1 of the present invention includes a mechanism for taking an exposure, and is constituted by a housing 2 pre-loaded with photo film, and a label 3 or sticker wound on the housing 2 in a belt-shape and attached to it.

The label 3 is provided with openings through which there appear a taking lens 4, and an eyepiece window and an objective window 5 included in a viewfinder. A printed caption 10 of "ZOOM" is disposed on the front of the label 3 to indicate the feature of the lens-fitted photo film unit 1. The front of the housing 2 has the taking lens 4, the objective window 5 of the viewfinder, and a flash emitter 6 of an electronic flash unit. The top of the housing 2 has a shutter release button 7 and a counter window 8. The rear of the housing 2 has a winder wheel 9 and the eyepiece window of the viewfinder.

Figure 3:
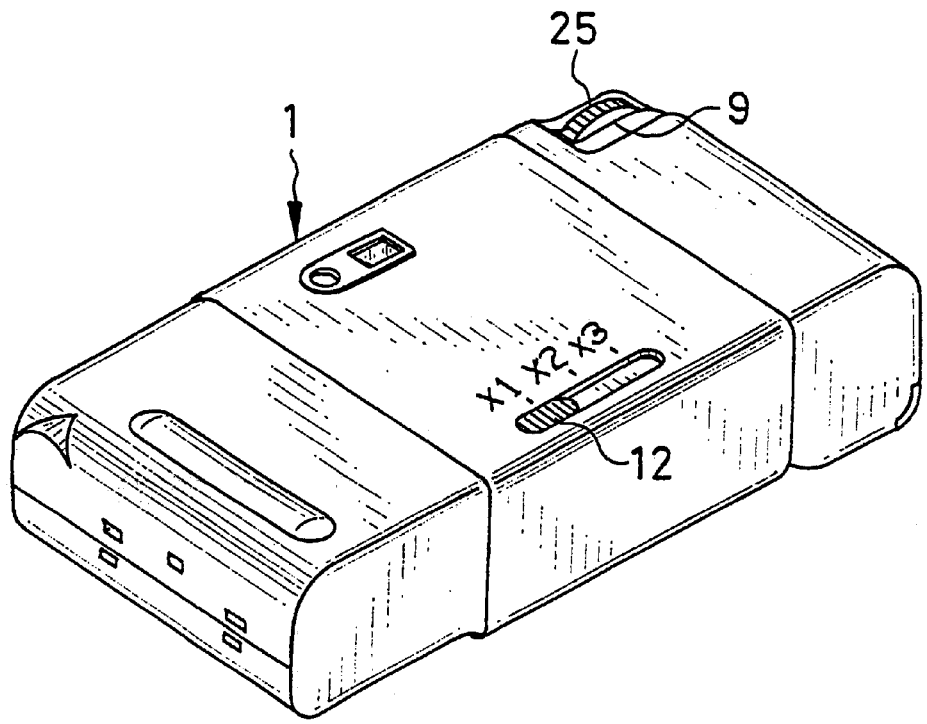
FIG. 3 is a perspective illustrating a rear of the lens-fitted photo film unit.

In FIG. 3, an operation button 12 or slider is disposed on the rear of the lens-fitted photo film unit 1 for the purpose of determining a printing magnification of an imaging frame before each exposure. The operation button 12 is set at a desired one of the indices X1, X2 and X3, to designates one of a "Standard magnifying mode (1-time)", a "2-time tele-converting mode" and a "3-time tele-converting mode". Those modes are predetermin ed in a photofin ishing system for use with the lens-fitted photo film unit 1. In the 2- and 3-time tele-converting modes, a central portion of the imaging frame is printed at a printing magnification which is respectively two or three times as great as a printing magnification used in the Standard magnifying mode. Photographic prints obtained in those modes are called a pseudo-zoom photograph. Information of the designated modes is recorded to a predetermined position in the lens-fitted photo film unit 1 at the time of exposing the imaging frame.

Figure 2:
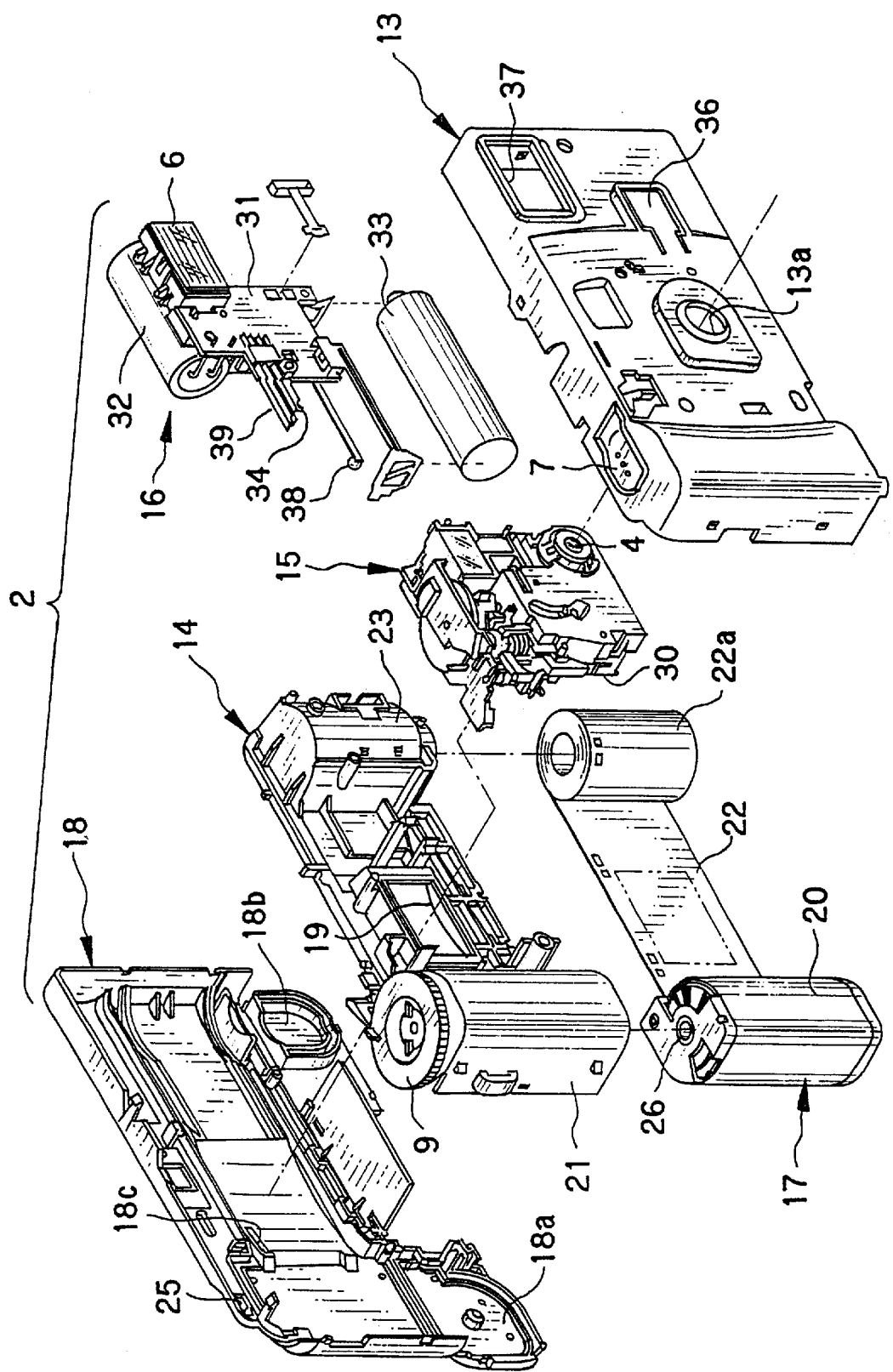
FIG. 2 is an exploded perspective illustrating a housing of the lens-fitted photo film unit of FIG. 1.

In FIG. 2, the housing 2 is constituted by a front cover 13, a main body 14, an exposure unit 15, an electronic flash unit 16, a photo film cassette 17 or cartridge and a rear cover 18. The main body 14 is provided with a cassette holder chamber 21 and a roll holder chamber 23 between which an exposure aperture 19 is located. The cassette holder chamber 21 contains a cassette 20. The roll holder chamber 23 contains a photo film roll 22*a*, which consists of photo film 22 drawn out of the cassette 20 and externally wound in a roll form.

Bottom lids 18*a* and 18*b* are formed with the rear cover 18 to close the bottoms of the cassette holder chamber 21 and the roll holder chamber 23. After mounting the rear cover 18, the photo film cassette 17 is held between the main body 14 and the rear cover 18 by closing the bottoms of the cassette holder chamber 21 and the roll holder chamber 23. The bottom lid 18*a* under the cassette holder chamber 21 will be opened when the cassette 20 contain ing the photo film 22 is removed in a photo laboratory after exposure.

The winder wheel 9 is disposed on the top of the cassette holder chamber 21 in a rotatable manner. An opening 25 is formed in the rear cover 18 to cause a part of the winder wheel 9 to appear externally. When the winder wheel 9 is operated to wind the photo film, the photo film 22 being unexposed is pulled from the roll holder chamber 23 and set at the exposure aperture 19. At the same time the exposed portion of the photo film 22 is contained into the cassette 20.

The shutter release button 7 is flexible on the top of the front cover 13, because formed with an edge of a hole formed on the top wall of the front cover 13. When the shutter release button 7 is depressed, it actuates the shutter mechanism in the exposure unit 15. The shutter mechanism is a type in which a shutter blade is swung back and forth for one time in front of a shutter opening. The shutter blade being swung, light from a photographic subject is passed through an exposure opening 13*a* in the front cover 13, and the taking lens 4 of the exposure unit 15, and then the shutter opening, and becomes incident upon the photo film 22 set at the exposure aperture 19. A light-shielded box 30 of a base portion of the exposure unit 15 shields ambient light from a path between the shutter opening and the exposure aperture 19.

The flash unit 16 is a unified component including a main capacitor 32, a dry battery 33, a synchro switch 34 and the flash emitter 6. Those elements are mounted on a printed circuit board 31, which includes a power source circuit, a flash charger circuit, a flash emitting circuit. An example of the battery 33 is a UM-3 battery.

When a charger pushbutton 36 in the front cover 13 is depressed, the flash charger circuit is closed. The voltage of the battery 33 is boosted, to charge the main capacitor 32. Then the shutter mechanism is released. The shutter blade fully opens. The synchro switch 34 is turned on to send a trigger signal to a flash discharge tube inside the flash emitter 6. In response to this the charged voltage in the main capacitor 32 causes the flash discharge tube to illuminate. The flash emitter 6 emits flash light to illuminate a photographic subject through a flash emitter window 37 in the front cover 13.

The printed circuit board 31 has a lamp 38 and a lamp control switch 39. The lamp 38 is a light source for the imprinting operation of an optical indicia. The lamp control switch 39 controls time of driving the lamp 38. A combination of the lamp control switch 39 and the lamp 38 constitutes an illuminating circuit.

The illuminating circuit is disposed on the printed circuit board 31, and drives the lamp 38 by causing a current of at least a predetermined amount to flow in the lamp 38 in response to turning on of the lamp control switch 39. The printed circuit board 31 also has a preheating circuit, which preheats a filament of the lamp 38 by causing a current of at most the predetermined amount to flow in the lamp 38 in response to halfway depression of the shutter release button 7. There is a detector, disposed under the shutter release button 7, for detecting the half depression of the shutter release button 7. When the front cover 13 is combined with the main body 14, the detector is connected to the preheating circuit on the printed circuit board 31 in a removable manner.

Figure 4:
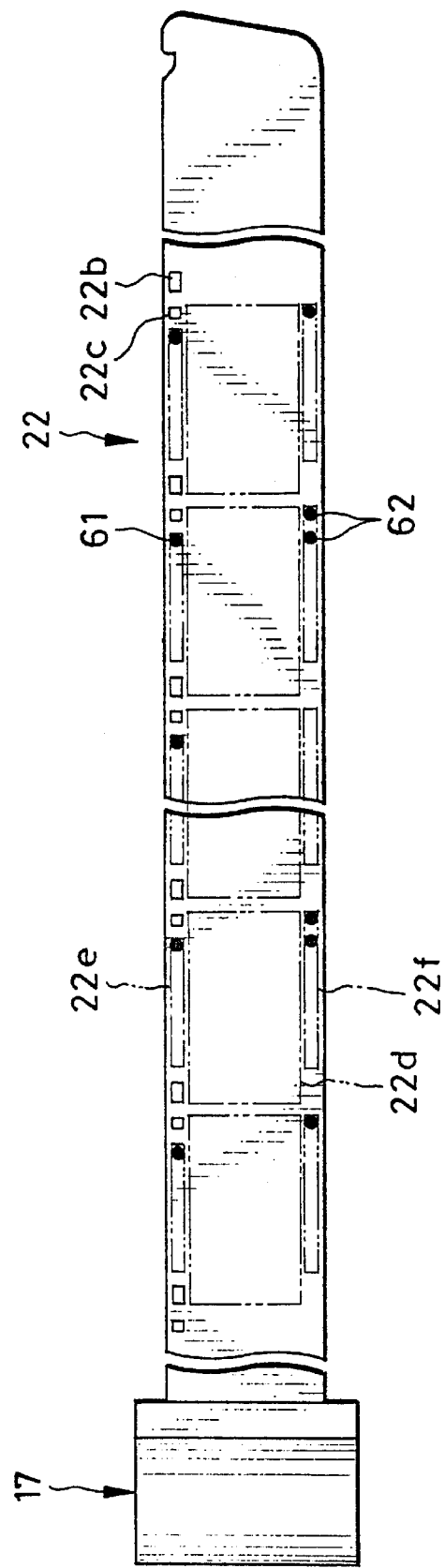
FIG. 4 is a plan illustrating first and second optical indicia areas.

In FIG. 4, imaging frames 22*d* or exposure ranges are located on the photo film 22. There are a first optical indicia area 22*e* and a second optical indicia area 22*f* on respective edges of the photo film 22 outside the imaging frames 22*d*. The first optical indicia area 22*e* is located along the first edge where perforations 22*b* and 22*c* of two kinds are disposed. A first optical indicia is imprinted into the first optical indicia area 22*e* in a form of zero, one, two or three dots arranged in line. The second optical indicia area 22*f* is located along the second edge opposite to the first edge. A second optical indicia is imprinted into the second optical indicia area 22*f* in a form of zero, one or two dots arranged in line. Combinations of the first and second optical indicia respectively define a printing condition, as indicated in Table 1.

TABLE 1

|  |  | Dots in second indicia area 22 f | | |
|---|---|---|---|---|
|  |  | 0 | 1 | 2 |
| Dots in first indicia area 22e | 0 | H-size print | P-size print | C-size print |
|  | 1 | Standard magnified print | 2x tele-converted print | 3x tele-converted print |
|  | 2 | Color print | Sepia print | B/W print |
|  | 3 | Standard print | Slim print | Soft print |

In the present embodiment, the trimming printing is intended to obtain a pseudo-zoom photograph. The first optical indicia area 22e is previously provided with a telephoto selectable type indicia 61, which consists of one dot as first optical indicia. The second optical indicia area 22f is exposed by the lamp 38 to imprint a magnification indicia 62, which consists of zero, one or two dots as second optical indicia.

Figure 5:
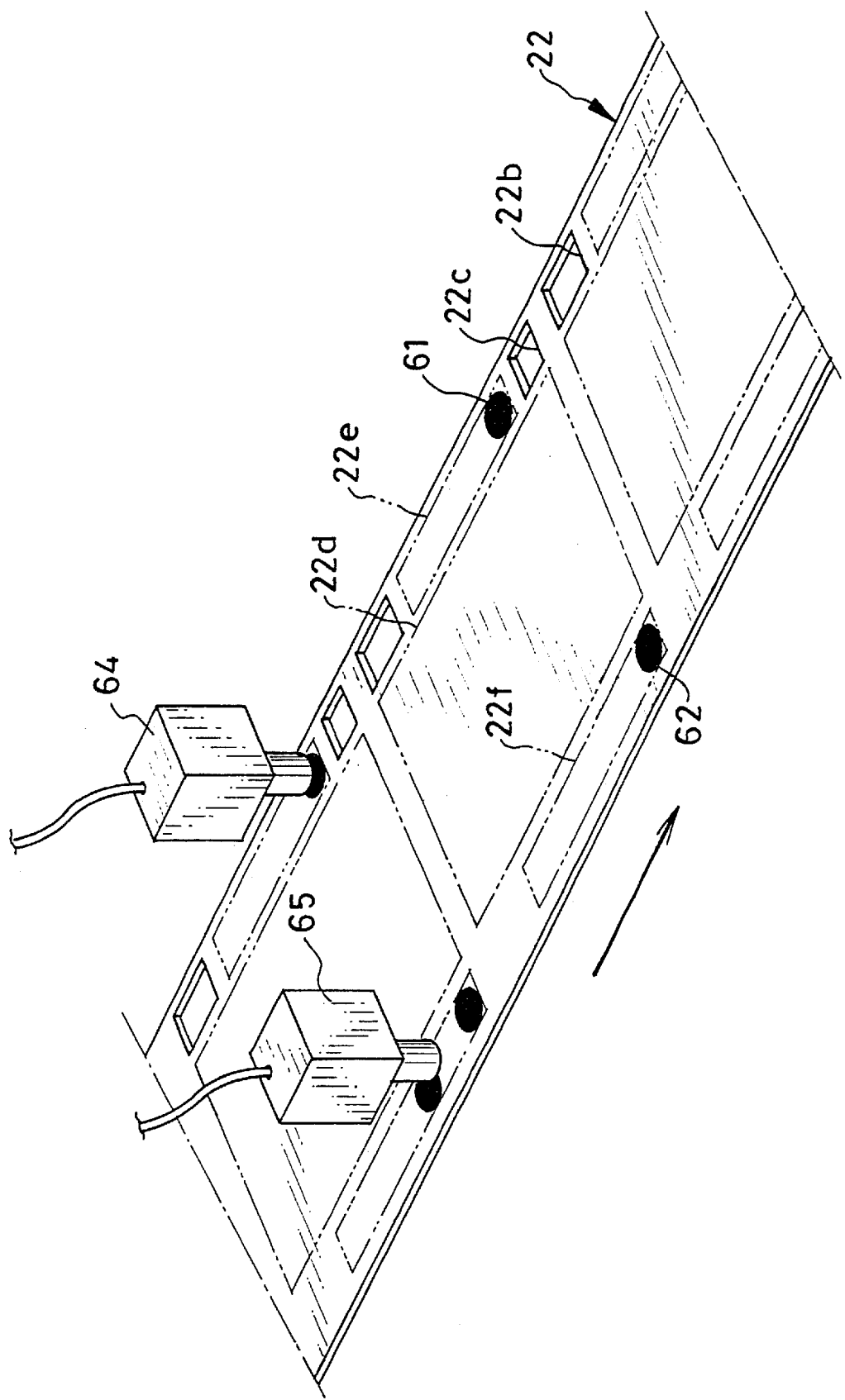
FIG. 5 is a perspective illustrating detection of the optical indicia.

In FIG. 5, photo sensors 64 and 65 of a reflection type are used in the photo laboratory shortly before the printing operation. The optical indicia areas 22e and 22f of the photo film 22 are searched by the photo sensors 64 and 65 to detect optical indicia. A combination of the optical indicia is evaluated to designate one of the printing conditions. In the present embodiment, the photo film 22 is detected intended for producing pseudo-zoom photographs in accordance with the telephoto selectable type indicia 61 which consists of the one prerecorded dot. As indicated in Table 1, one of the "Standard magnified print", "2-time tele-converted print" and "3-time tele-converted print" is designated according to the number of the dot or dots in the magnification indicia 62 recorded within the second optical indicia area 22f. It is to be noted that the photo sensor 64 is a sensor which has been so far used for optically detecting perforations. This new way of using the known sensor is effective in reducing additional expense for investment in equipment for the photo-finishing.

Figure 6:
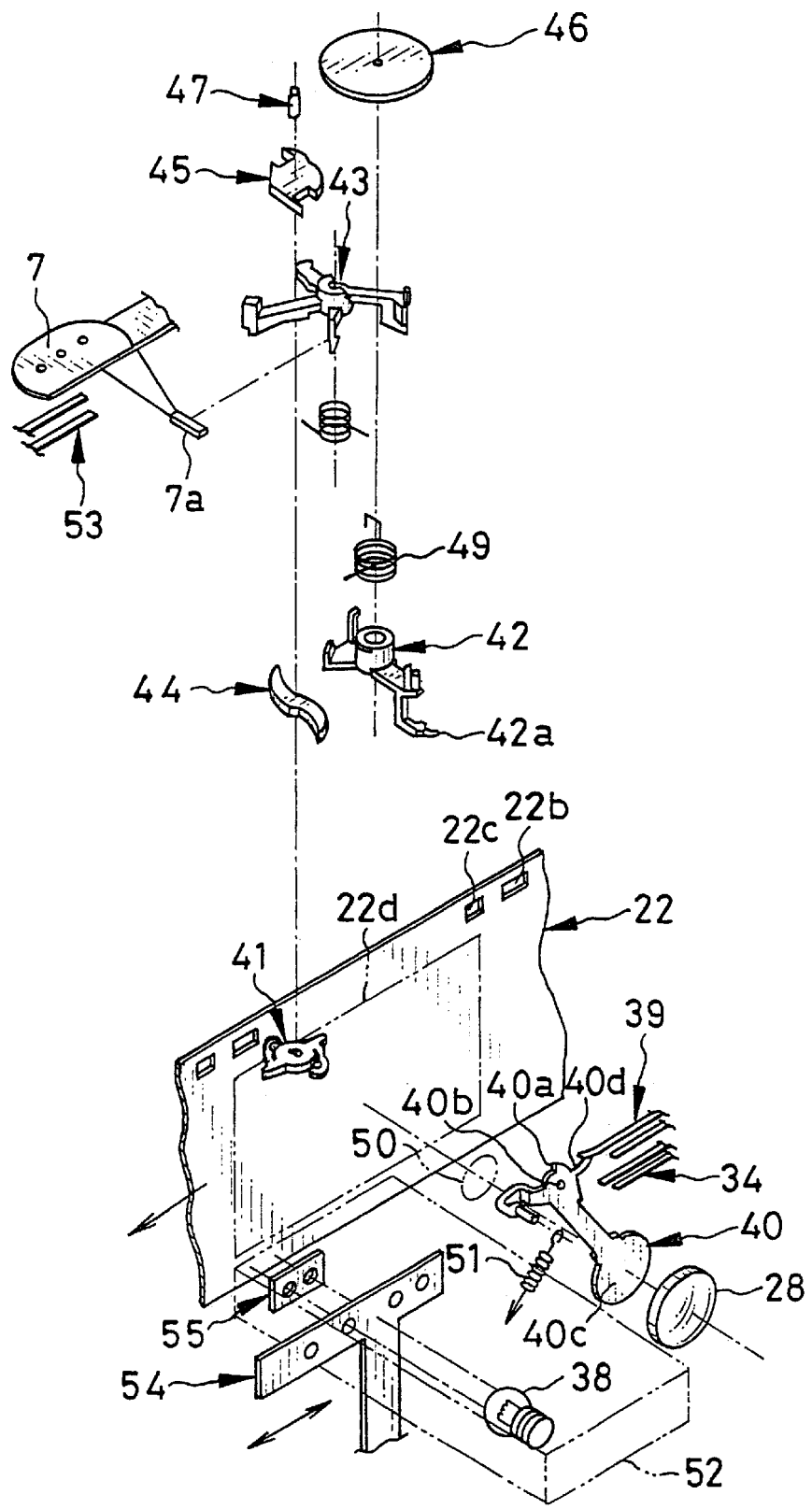
FIG. 6 is a perspective illustrating a shutter mechanism and a recorder for the optical indicia.

The exposure unit 15 is a unified component including the taking lens 4, a shutter mechanism, a one-frame advance mechanism, a shutter charge mechanism, and a photo film counter mechanism. In FIG. 6, the exposure unit 15 is constituted by a shutter blade 40, a sprocket wheel 41, a shutter drive lever 42, a retainer lever 43, a charge cam 44, a one-frame advance cam 45, a counter wheel 46 and the like.

The sprocket wheel 41 has plural teeth engageable with the perforations 22b and 22c formed in the photo film 22, and is caused to make half a rotation by advance of one frame of the photo film 22. The direction of the advance is indicated by the arrow in the drawing.

Rotation of the sprocket wheel 41 is transmitted to the charge cam 44 and the one-frame advance cam 45, to cause the retainer lever 43 to rotate to the frame set position upon advance of the photo film by one frame. Then the retainer lever 43 becomes engaged with the one-frame advance cam 45 and the winder wheel 9 to block rotation of the sprocket wheel 41 and block operation of the winder wheel 9. The rotation of the charge cam 44 charges the shutter drive lever 42 in the charged position, so that the retainer lever 43 is kept in the frame set position. Also a two-toothed gear 47 is caused by the rotation of the one-frame advance cam 45 to step the counter wheel 46 one by one.

When the shutter release button 7 is depressed fully in its stroke, a rod 7a formed under the shutter release button 7 pushes the retainer lever 43 to rotate it from the frame set position to a block-released position. Then the retainer lever 43 releases the shutter drive lever 42 from the retention. The shutter drive lever 42 is instantaneously rotated by a charge spring 49 from the charged position to the release finished position. In the course of the rotation a knocker arm 42a of the shutter drive lever 42 knocks a blade end 40a of the shutter blade 40.

The shutter blade 40 is rotatable about a shaft 40b, and has a blade portion 40c, which is opposite to the blade end 40a with respect to the shaft 40b, for blocking a shutter opening 50. When the blade end 40a is knocked away, the blade portion 40c rotates to an open position to open the shutter opening 50, and then is returned to a closed position by a return spring 51 to close the shutter opening 50. The synchro switch 34 is disposed in the vicinity of the blade end 40a. When the shutter blade 40 comes to the open position, an upper segment of the synchro switch 34 is pushed by a projection 40d to contact a lower segment, so that the synchro switch 34 is turned on.

The lamp control switch 39 is disposed over the synchro switch 34. The lamp control switch 39 is constituted by two segments arranged in a rotational direction of the shutter blade 40 in a manner similar to the synchro switch 34. The lamp control switch 39 is different from the synchro switch 34 incertain features. When the shutter blade 40 is in the closed position, the upper segment of the lamp control switch 39 is kept by the projection 40d away from the lower segment. When the shutter blade 40 swings, the projection 40d retreats to allow contact of the upper segment with the lower segment to turn on the lamp control switch 39. During the opening and closing movement of the shutter blade 40, the two segments are kept in contact with each other due to their free state.

An end of an upper segment of the lamp control switch 39 is located in a moving path of the knocker arm 42a, and also in a rotating orbit of the projection 40d. A lower segment of the lamp control switch 39 has a length to reach the outside of the rotating orbit of the projection 40d. The lamp control switch 39 is turned on by the retreat of the projection 40d upon the opening movement of the shutter blade 40. Before the return of the shutter blade 40 to the closed position, the shutter drive lever 42 reaches the release finished position. The lamp control switch 39 is turned on because the knocker arm 42a raises the end of the upper segment of the lamp control switch 39. Thus the lamp control switch 39 constitutes a switch device for the illuminating control with the projection 40d of the shutter blade 40 and the knocker arm 42a.

The knocker arm 42a raises the end of the upper segment of the lamp control switch 39 for turning off. Therefore the end of the upper segment is shaped with a curvature in a direction opposite to the lower segment, for the purpose of guiding entry of the knocker arm 42a between the segments. This is effective in avoiding in terference of the knocker arm 42a with the end of the upper segment. Also when the shutter blade 40 returns to the closed position, the projection 40d is prevented from contacting the upper segment, and kept from causing the shutter blade 40 to bound.

The time of opening and closing the shutter blade 40 is determined by the knocking force of the shutter drive lever 42 and the bias force of the return spring 51. The moving amount of the knocker arm 42a is also predetermined. Thus the time of turning on the lamp control switch 39 is constant in synchronism with opening and closing of the shutter blade 40.

A reference numeral 53 designates a half depression switch, disposed under the shutter release button 7, for detection of a half depression of the shutter release button 7. The half depression switch 53 is constituted by two segments arranged in a direction of the depression of the shutter release button 7. The upper one of the segments is fixed on the bottom of the shutter release button 7. The lower one of the segments is disposed to be contacted by the upper segment when the shutter release button 7 is depressed half as much as the stroke of the shutter release button 7.

There is also a light-shielded box 52 formed under the light-shielded box 30. The light-shielded box 52 is formed with the exposure unit 15, and accommodates the lamp 38, an imprinter plate 55 and an indicia selector plate 54. The imprinter plate 55 includes two holes, which are arranged in the photo film advance direction.

The indicia selector plate 54 is movable in a direction of the advance of the photo film in front of the imprinter plate 55, and is linked with the operation button 12, which appears in the rear face of the rear cover 18. The indicia selector plate 54 has openings which operate to open one or both of the two holes formed in the imprinter plate 55. Of course the indicia selector plate 54 includes portions to close the two holes.

Figure 7:
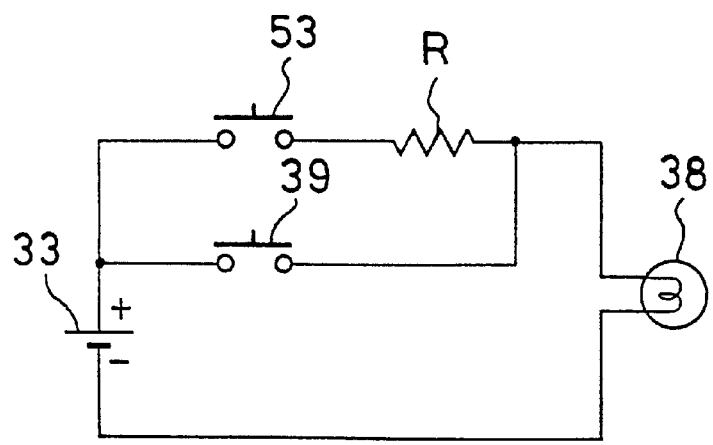
FIG. 7 is a block diagram schematically illustrating a lamp driving circuit and a preheating circuit.

In FIG. 7, the illuminating circuit and the preheating circuit in the printed circuit board 31 are illustrated. The illuminating circuit consists of a connected series of the battery 33, the lamp control switch 39 and the lamp 38. The power source of the preheating circuit is also the battery 33. The half depression switch 53 and a resistor element R in series therewith are connected in parallel with the lamp control switch 39.

As is known in the art, a filament of the lamp 38, when energized, is caused to generate heat, so that the lamp 38 illuminates when the filament comes to have temperature enough for emitting light. The resistor element R has such resistance as to keep a current equal to or less than a value to heat the filament only at a temperature short of the light emitting temperature.

The operation of the above construction is described now. Immediately after taking an exposure, the upper segment of the lamp control switch 39 is raised by the knocker arm 42a, so that the lamp control switch 39 remains turned off.

The winder wheel 9 is rotated in a direction to wind the photo film. The photo film 22 being unexposed is drawn from the photo film roll 22a and advanced to the exposure aperture 19. The advance of the photo film 22 causes the sprocket wheel 41 to rotate to charge the shutter mechanism.

Charging of the shutter mechanism causes the knocker arm 42a to move to the charged position. The knocker arm 42a is moved away from the end of the upper segment. But the projection 40d keeps the upper segment of the lamp control switch 39 in its position. The lamp control switch 39 is still kept turned off electrically.

The photo film 22 is advanced by one frame by the photo film winding operation. Then the one-frame advance mechanism is caused to block rotation of the sprocket wheel 41 and winding of the winder wheel 9.

A user, before photographing, selects one of the three printing conditions including the "Standard magnifying model", the "2-time tele-converting mode" and the "3-time tele-converting model", and sets the operation button 12 at the corresponding one of the three indices. For an exposure with flash light, the charger pushbutton 36 is depressed to charge the flash unit. Then the shutter release button 7 is depressed to take the exposure.

When the shutter release button 7 is depressed half as much as its stroke, the half depression switch 53 is turned on. The preheating circuit is operated to preheat the filament of the lamp 38. The current flowing in the filament is insufficient for heating to the light emitting temperature due to the resistor element R. Thus the lamp 38 does not illuminate. The shutter blade 40 still remains in the closed position. The projection 40d is raising the upper segment of the lamp control switch 39, which is kept turned off.

When the shutter release button 7 is fully depressed within its whole stroke, the rod 7a causes the retainer lever 43 to rotate toward the block-released position. Then the shutter drive lever 42 is released from the retention, and rotates in stantaneously from the charged position to the release finished position. In the course of this rotation, the knocker arm 42a knocks the blade end 40a of the shutter blade 40 to swing the shutter blade 40 back and forth for one time.

The blade end 40a of the shutter blade 40 is knocked. The shutter blade 40 rotates in the clockwise direction about the shaft 40b. In an initial step in this rotation, the projection 40d is moved away from the upper segment of the lamp control switch 39. The upper segment of the lamp control switch 39 is moved back to its initial position by its resiliency to contact the lower segment. The lamp control switch 39 is turned on. As the filament has been preheated since the step before the shutter releasing, the filament comes to have the light emitting temperature upon turning on of the lamp control switch 39. The lamp 38 emits light instantaneously.

When the shutter blade 40 fully opens the shutter opening 50, the synchro switch 34 is turned on to emit flash light. Then the return spring 51 causes the shutter blade 40 to rotate counterclockwise about the shaft 40b. Before the return of the shutter blade 40 to the closed position, the knocker arm 42a raises the upper segment of the lamp control switch 39, and moves it away from the lower segment. The lamp control switch 39 is turned off. So the lamp 38 is turned off.

The light emitted by the lamp 38 is passed through the openings in the indicia selector plate 54 and the holes in the imprinter plate 55, and imprints the magnification indicia 62 in the second optical indicia area 22f on the photo film 22. The lamp control switch 39 operates in synchronism with the regularly determined movement of the shutter blade and the knocker arm 42a. There is no time lag in the start of the light emission. Therefore the magnification indicia 62 can be imprinted at an appropriately determined exposure.

Similarly all the remaining frames are exposed in the lens-fitted photo film unit 1. The lens-fitted photo film unit 1 is forwarded to a photo laboratory. Then the label 3 is peeled. The bottom lid 18a is opened. The photo film cassette 17, contain ing the photo film 22 being exposed, is removed from out of the cassette holder chamber 21.

The photo film cassette 17 is set in an automatic photo film processor to develop the photo film 22. Then the photo film 22 being developed is set in a photographic printer. In FIG. 5, the optical indicia areas 22e and 22f are sorted by the photo sensors 64 and 65 for each of the imaging frames. One of the printing conditions is determined according to a combination of the optical indicia being detected, for printing the imaging frame.

In the present embodiment, the telephoto selectable type indicia 61 consisting of the one dot is detected at any of the imaging frames. If the magnification indicia 62 is detected constituted by zero (0) dot, then the associated imaging frame is printed to produce a "Standard magnified print". If the magnification indicia 62 is detected constituted by one (1) dot, then the associated imaging frame is printed to produce a "2-time tele-converted print", in which the central portion in the imaging frame 22d is printed at twice as great a printing magnification as that of the Standard magnified print. If the magnification indicia 62 is detected constituted by two (2) dots, then the associated imaging frame is printed to produce a "3-time tele-converted print", in which the central portion in the imaging frame 22d is printed at three times as great a printing magnification as that of the Standard magnified print. Note that photographic paper used in any of the three modes has the same size, because only the central portions of the imaging frame 22d are enlarged for the 2- or 3-time tele-converted print.

In the above embodiment, the first optical indicia is prerecorded in the first optical indicia area. Alternatively the first optical indicia may be recorded by the lens-fitted photo film unit to the first optical indicia area. For this purpose an additional lamp may be used. This makes it possible to provide the printing service in a more extended manner. Also three or more lamps may be used. Before loading of the photo film, two or more types of the optical indicia may be prerecorded.

In the above embodiment, the optical indicia are imprinted on the front side of the photo film. Alternatively optical indicia may be imprinted on a rear side of the photo film.

FIGS. 8–14 are now referred to. Another preferred lens-fitted photo film unit is described, in which data for representing selectability of telephoto is magnetically recorded to photo film. The lens-fitted photo film unit incorporates various mechanisms for taking an exposure, and is constituted by a housing 102 and a label 103 or sticker. The housing 102 is pre-loaded with a photo film cassette of the IX 240 type. The label 103 covers a portion of the housing 102.

Figure 9:
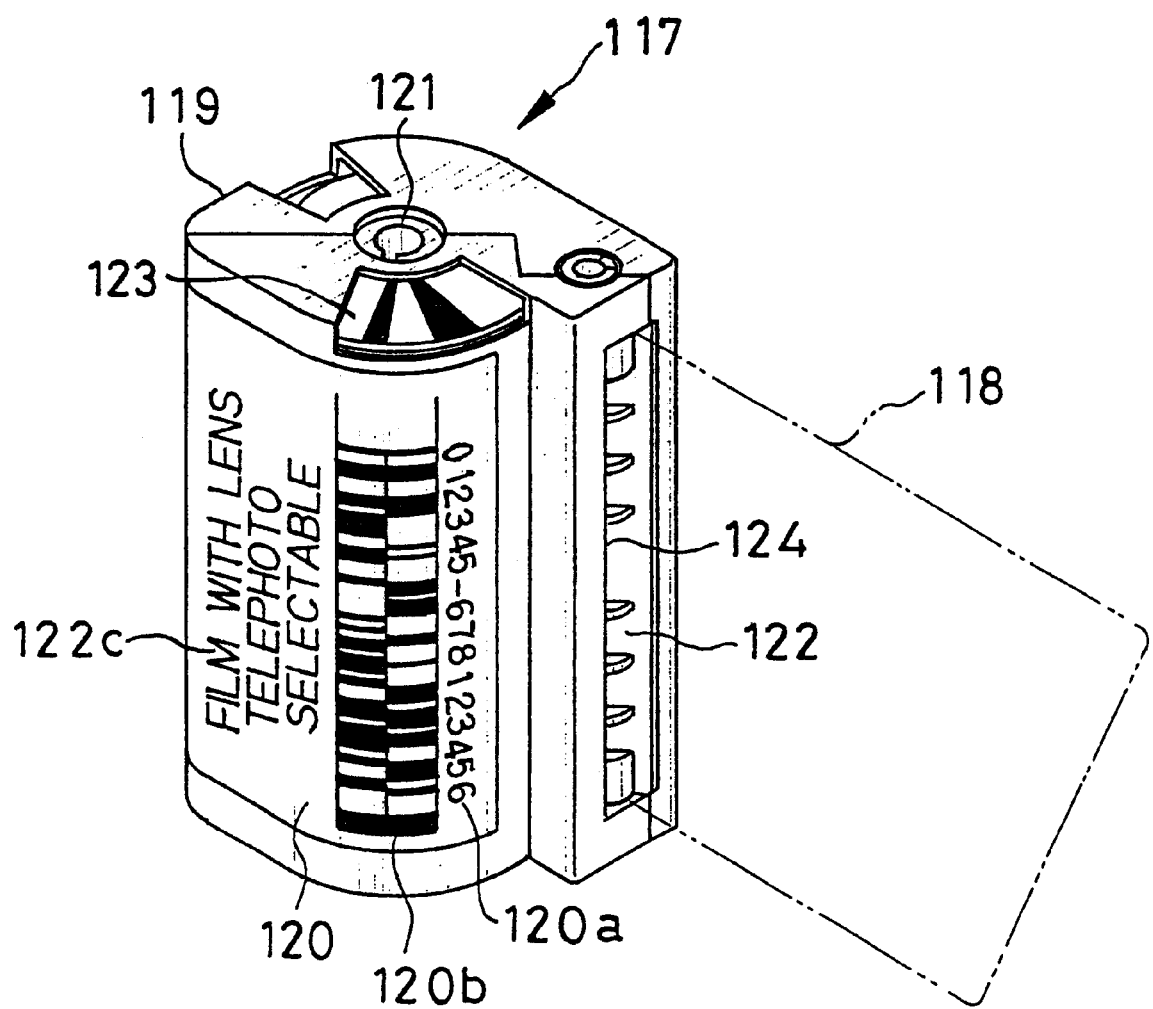
FIG. 9 is a perspective illustrating a photo film cassette.

In FIG. 9, a photo film cassette 117 or cartridge of IX 240 type is illustrated. The photo film cassette 117 is constituted by photo film 118, a cassette 119 for containing the photo film 118, and a label 120 or sticker attached to the cassette 119. The cassette 119 is constituted by a rotatable spool 121, a cassette shutter 122, a disk 123 and various parts which are included in a photo film advancing mechanism and a spool lock mechanism.

The photo film 118 has a trailer secured to the spool 121 in a removable manner. At the time of photo film development, the photo film 118 is removed from the spool 121 and separated from the cassette 119. A passageway 124 is formed for advancing the photo film 118 to the outside of the cassette 119, and closed by the cassette shutter 122. At the time of transport or preservation of the photo film cassette 117, the photo film 118 inclusive its leader is wound about the spool 121, and contained in the cassette 119. The spool 121 is closed to shield the in side of the cassette 119 from ambient light. While the cassette shutter 122 is open, the spool 121 is unlocked and rotatable. When the spool 121 is rotated in the clockwise direction, the leader of the photo film 118 is advance to the outside of the cassette 119 through the passageway 124.

The label 120 includes a numerical code 120a and a bar code 120b. The numerical code 120a represents in formation of the type of the photo film 118, the number of available frames and the cassette ID number. The bar code 120b has the form representing the in formation of the numerical code 120a. Type in formation 120c is printed on the label 120 to indicate the type used in the telephoto selectable type of the lens-fitted photo film unit.

In FIG. 10A, the leader and the trailer of the photo film 118, which are not used for exposures, include a manufacturing lot code 126, a photo film ID code 127 and bar codes 128 and 129, which are side-printed in the course of photo film manufacture. The manufacturing lot code 126 consists of a train of numbers and letters and represents a manufacturing lot number. The photo film ID code 127 is a numeral of 9 digits as a photo film ID number. The bar code 128 represents in formation of the manufacturing lot number. The bar code 129 is a bin ary code representing the photo film ID number and the available frame number. There are imaging frames 130, defined on the photo film 118, and having a regular size as exposure ranges. A frame number code 131 is side-printed in the vicinity of the imaging frames 130. When the photo film 118 is developed, the manufacturing lot code 126, the photo film ID code 127, the bar codes 128 and 129 and the frame number code 131 become visible.

The photo film ID number indicated by the photo film ID code 127 and the bar code 129 is different between individual strips of the photo film 118, and determined equal to the cassette ID number of the cassette 119. It is possible to associate the photo film 118 with the cassette 119 even when the photo film 118 is removed from the cassette 119.

In FIG. 10C, the photo film 118 has a transparent magnetic recording layer 118c as a coating, which is applied to the back of a support 118a and opposite to an emulsion layer 118b. There are magnetic data tracks on the photo film 118 in regions outside exposure regions for magnetic recording of various data. In FIG. 10B, the magnetic data tracks are a PLD track 132 or photofinishing leader data track, a PFSD track 133 or photofinishing frame specific data track, a CLD track 134 or camera leader data track, a CFSD track 135 or camera frame specific data track, and a CDD track 136 or customer device data track. The PLD track 132 and the PFSD track 133 are used to store data related to the photo film 118, and data related to development and printing in a photo laboratory. The CLD track 134 and the CFSD track 135 store data related to an exposure, and data for designating a number of prints to be produced. The CDD track 136 store an ID number of a camera used for exposures.

Among those tracks, the PLD track 132 and the CLD track 134 are disposed on the leader of the photo film 118, and store data related to the photo film 118 and common among the imaging frames. To be precise, the PLD track 132 is provided with instruction data related to photo film development by the manufacturer at the time of manufacture. Or development data is written to the PLD track 132 in relation to developing operation in a photo laboratory. For the CLD track 134, PAR (print aspect ratio) data is written to it by a camera for designating a printing size or aspect ratio of photographic prints in a manner common among all the imaging frames.

The PFSD track 133 and the CFSD track 135 are formed for each of the imaging frames. Information for each imaging frame is written to the PFSD track 133 and the CFSD track 135. For example, correction data for color correction in the printing is written to the PFSD track 133. The number of prints designated at the time of exposures and the PAR data are written to the CFSD track 135.

In FIG. 10A, there is an optical indicia area 137 associated with each of the imaging frames. The optical indicia area 137 is originally used for optically imprinting an optical indicia (hereinafter referred to PAR indicia), which designates production of one of an H-size print (89×158 mm), a panoramic size print (89×254 mm) and a C-size print (89×127 mm). Those are different in the aspect ratio of printed frames. As will be described later, magnification indicia as optical indicia are imprinted in the optical indicia area 137 in the same shape as the PAR indicia, for the purpose of producing a 2-time tele-converted print and a 3-time tele-converted print in addition to a standard magnified print.

In the course of development and printing, the data are magnetically or optically read by magnetic heads or photo sensors in a photo film processor or a printer from the data tracks 132–136, the bar codes 128 and 129 and/or the optical indicia area 137. The obtained data are used for various controls.

The photo film cassette 117 having this construction is commercially marketed or used as a component inserted in a lens-fitted photo film unit. If used for a lens-fitted photo film unit, photo film data is prerecorded to the photo film 118 for signaling information that the photo film is intended to produce prints according to a predetermined printing condition.

The photo film data is in the indirect form of telephoto selectable type data, which represents the type to produce a standard magnified print, a 2-time tele-converted print and a 3-time tele-converted print. The telephoto selectable type data is magnetically recorded to the PLD track 132 during the manufacture. The telephoto selectable type data is registered in a printer installed in a photo laboratory or a photofinishing shop. When the telephoto selectable type data is detected, printing is controlled according to any one of three magnification indicia.

A magnification indicia 138, depicted in FIGS. 18–20, is imprinted in the optical indicia area 137 respectively for the imaging frames 130, and is constituted by two bits, which consist of first and second dots 138a and 138b. Printing conditions are predetermined in accordance with the number of the dots in the magnification indicia 138. If both the first and second dots 138a and 138b are imprinted for the magnification indicia 138, then a 2-time tele-converted print is to be produced from the imaging frame. If only the first dot 138a is imprinted for the magnification indicia 138, then a 3-time tele-converted print is to be produced from the imaging frame. If no dot is imprinted for the magnification indicia 138, then a standard magnified print is to be produced from the imaging frame.

Figure 11:
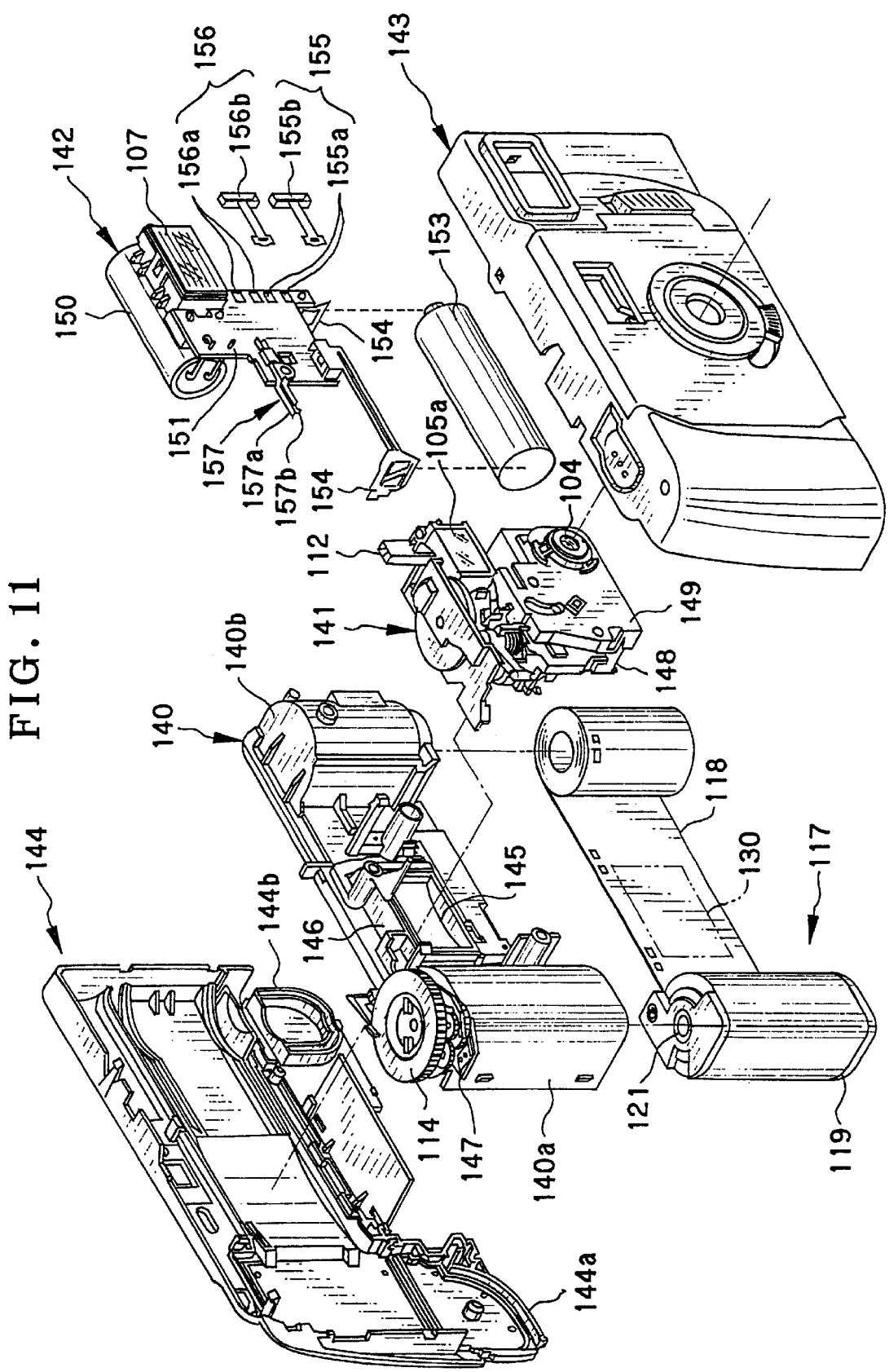
FIG. 11 is an exploded perspective illustrating the lens-fitted photo film unit.

In FIG. 11, the top of a cassette holder chamber 140a has a winder wheel 114 and a shutter drive mechanism 147, which operates to rotate the cassette shutter 122 of the cassette 119 to a closed position. A drive shaft is formed on the bottom face of the winder wheel 114, and is engaged with the spool 121 of the cassette 119. For each exposure, the winder wheel 114 is rotated in the counterclockwise direction, the spool 121 winds an exposed portion of the photo film 118 into the cassette 119. The shutter drive mechanism 147 counts the number of rotations of the winder wheel 114. When the winder wheel 114 is rotated by an amount enough to wind the entirety of the photo film 118 into the cassette 119, then the cassette shutter 122 closes the passageway 124.

An exposure unit 141 includes an indicator light guide member 112, which is slidable up and down and indicates a finished state of charging of an electronic flash unit 142. When a charger lever 108 is slid up, the indicator light guide member 112 protrudes upward through the top face of the lens-fitted photo film unit.

A front face of a printed circuit board 151 has pairs of contact points 155a and 156a. There are contact segments 155b and 156b, disposed in front of the contact points 155a and 156a, respectively for contacting the contact points 155a and 156a when the charger lever 108 is slid up to the on-position.

A charger switch 155 is constituted by the contact points 155a and the contact segment 155b. A flash set switch 156 is constituted by the contact points 156a and the contact segment 156b. The charger switch 155 is turned on when the contact segment 155b contacts the contact points 155a. A main capacitor 150 is charged while the charger switch 155 remains turned on. The flash set switch 156 is turned on when the contact segment 156b contacts the contact points 156a. The flash set switch 156, while turned on, allows emission of flash light, and while turned off, inhibits emission of flash light.

A synchro switch 157 for flash emission is disposed on the printed circuit board 151. The synchro switch 157 is constituted by upper and lower resilient contact segments 157a and 157b. When the shutter blade is fully open, a push projection (not shown) of the shutter blade deforms the upper contact segment 157a down resiliently, so that the upper contact segment 157a contacts the lower contact segment 157b to turn on the synchro switch 157.

On the rear of the printed circuit board 151, an indicator LED 158 and an imprinter LED 159 are disposed. The indicator LED 158 emits light upon the finish of charging, and causes the indicator light guide member 112 to inform a finished state of the charging. The imprinter LED 159 is a light source adapted to imprint the magnification indicia 138. See FIG. 14. The imprinter LED 159 is driven while the synchro switch 157 is turned on and irrespective of a position of the charger lever 108.

In FIG. 11, a reference numeral 140a designates the cassette holder chamber loaded with the cassette 119. Bottom lids 144a and 144b cover respective bottoms of the cassette holder chamber 140a and a roll holder chamber 140b. A base portion 148 constitutes the exposure unit 141, and holds a shutter mechanism 141a having the shutter blade (See FIG. 14), a one-frame advancing mechanism, and an objective lens 105a and an eyepiece lens (not shown) of a viewfinder 105. A lens holder 149 holds a taking lens 104 inclusive of two elements in front of the base portion 148. Metal segments 154 hold a dry battery 153, and connects it with the flash circuit electrically.

Figure 12:
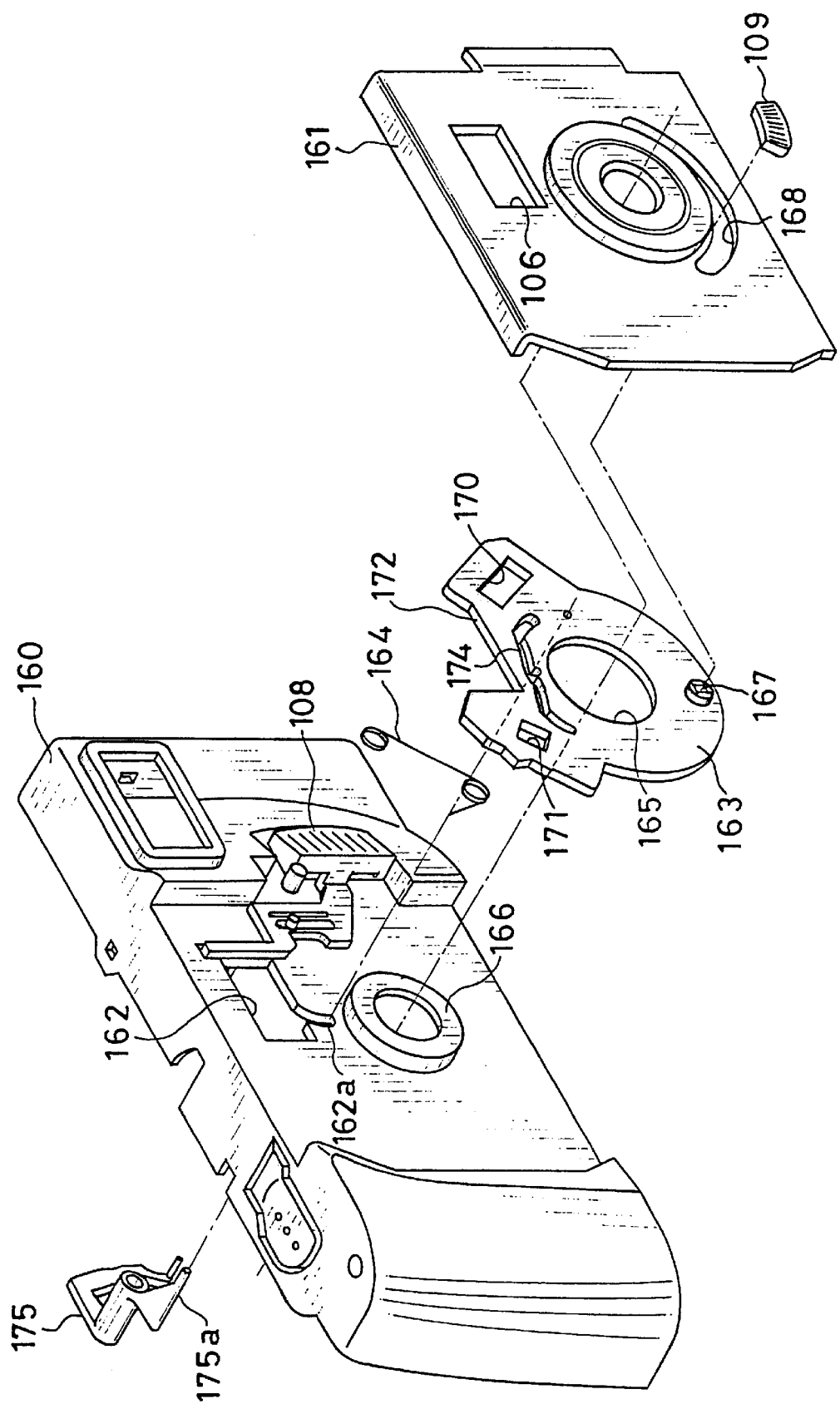
FIG. 12 is an exploded perspective illustrating a view selector plate in the front cover.

In FIG. 12, a front cover 143 is constituted by a front cover body 160 and a front panel 161 secured to the front face of the front cover body 160. A finder opening 162 is formed in the front cover body 160 in the same shape as an objective window 106 in the front panel 161. The charger lever 108, a view selector plate 163 and a toggle spring 164 are disposed between the front cover body 160 and the front panel 161. The view selector plate 163, the toggle spring 164 and the objective window 106 constitutes a view selector mechanism for changing over the visual field of the viewfinder 105.

The view selector plate 163 is approximately disk-shaped, and has a circular opening 165 in its center. A lens barrel 166 is formed in the front face of the front cover body 160, and receives in the circular opening 165 inserted therein. Thus the view selector plate 163 is rotatable on the front cover body 160. A boss 167 is formed with a bottom of the front of the view selector plate 163. An operation button 109 is secured to the boss 167, and inserted through a slit 168, which is formed in the front panel 161 in an arc shape.

A first telephoto finder frame 170 and a second telephoto finder frame 171 are formed in the periphery of the view selector plate 163 to define a visual field of the viewfinder 105. When the operation button 109 is operated to rotate the view selector plate 163, the telephoto finder frames 170 and 171 are selectively positioned in front of the objective lens 105a. There is a recess 172 located between the telephoto finder frames 170 and 171 to open the objective window 106 as a standard finder frame.

In the present lens-fitted photo film unit, the standard magnifying mode is predetermined to print the whole of the imaging frame 130 in enlargement for the H-size by use of the taking lens 104 having the focal length of 24 mm. The objective window 106 for the standard finder frame defines a standard visual field of the viewfinder 105, which allows observation in a region to be printed in this mode. The standard visual field occurs when the recess 172 is set behind the objective window 106.

The first telephoto finder frame 170 has an aspect ratio equal to that of the objective window 106, but has a width and a length half as great as those of the objective window 106. When the first telephoto finder frame 170 is set at the objective window 106, the visual field of the viewfinder 105 becomes a central portion having an area ¼ as much as that of the standard visual field, in compliance with the 2-time tele-converting mode. A photographic field of view is observable in this region in a manner the same as a region which would be observed through a taking lens having a focal length of 48 mm.

The second telephoto finder frame 171 has an aspect ratio equal to that of the objective window 106, but has a width and a length ⅓ as great as those of the objective window 106. When the second telephoto finder frame 171 is set at the objective window 106, the visual field of the viewfinder 105 becomes a central portion having an area ⅑ as much as that of the standard visual field, in compliance with the 3-time tele-converting mode. A photographic field of view is observable in this region in a manner the same as a region which would be observed through a taking lens having a focal length of 72 mm.

When the operation button 109 is set in the standard position, the view selector plate 163 is positioned to set the recess 172 behind the objective window 106. When the operation button 109 is set in the 2-time tele-converting position, the first telephoto finder frame 170 is set behind the objective window 106. When the operation button 109 is set in the 3-time tele-converting position, the second telephoto finder frame 171 is set behind the objective window 106. The toggle spring 164 is used to keep the view selector plate 163 reliably positioned to set the telephoto finder frames 170 and 171 and the recess 172 at the objective window 106.

Figure 13:
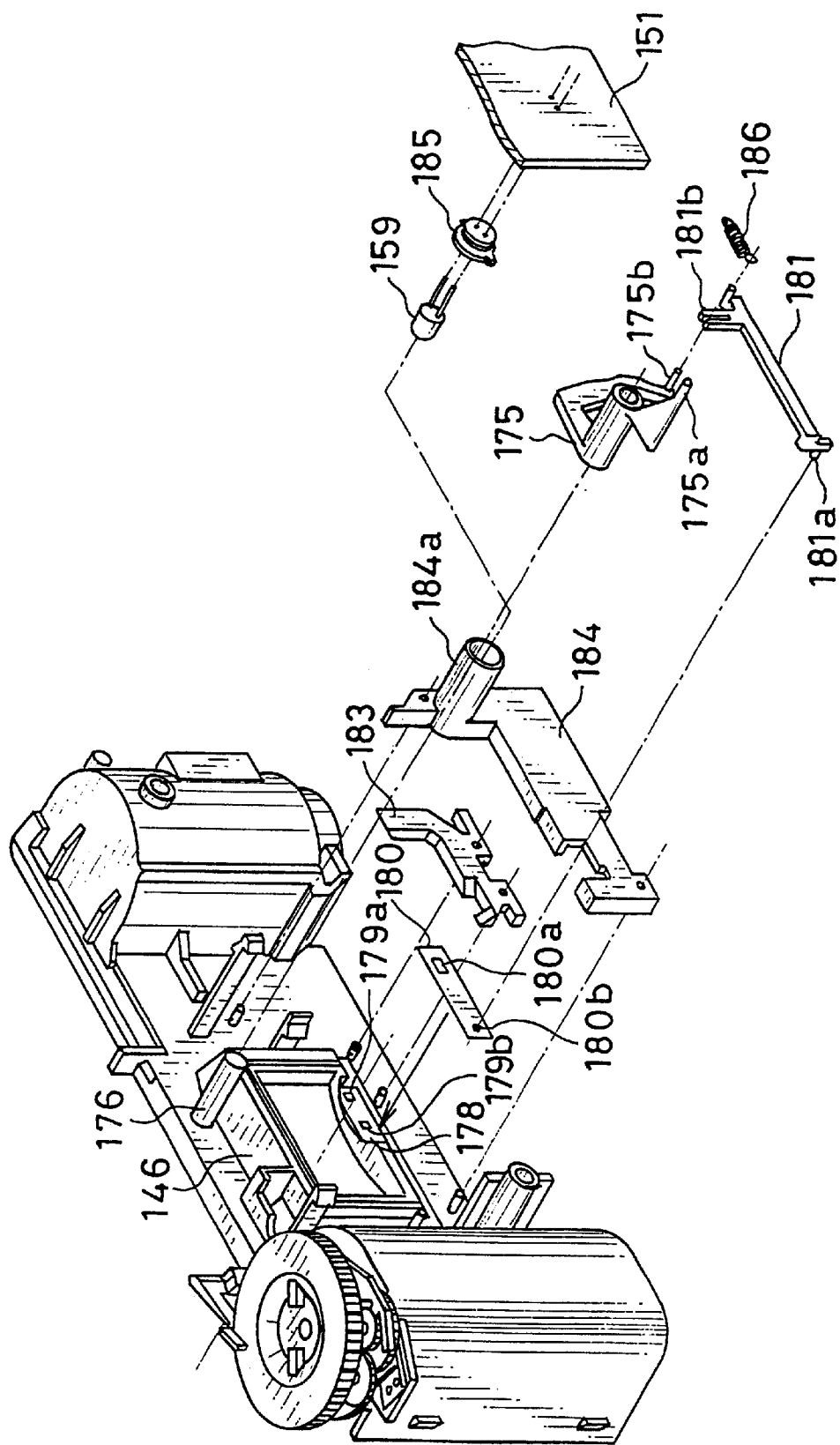
FIG. 13 is an exploded perspective illustrating an indicia selector.

A cam groove 174 is formed in the view selector plate 163 in a position different from the circular opening 165. A distance from the cam groove 174 to the center of the circular opening 165 is changed in a predetermined manner. A lever 175 is disposed on a main body 140 in a rotatable manner, and has a lever end 175a inserted in the cam groove 174. As illustrated in FIG. 13, a pin 176 supports the lever 175 axially. The pin 176 is disposed to protrude from a position above a light-shielded tunnel 146 of the main body 140. The lever end 175a of the lever 175 is inserted through a notch 162a (See FIG. 12), which is formed in an edge of the finder opening 162 in the front cover body 160. As the lever end 175a is engaged with the cam groove 174, rotation of the view selector plate 163 causes the lever 175 to rotate about the pin 176 by following the shape of the cam groove 174.

There is a cavity 178 formed under the light-shielded tunnel 146 to extend in the photo film advancing direction. There are first and second openings 179a and 179b located in the cavity 178 for the purpose of imprinting the magnification indicia 138 to the photo film 118. An indicia selector plate 180 is disposed in the cavity 178 in a horizontally slidable manner. The indicia selector plate 180 is thinly formed of plastic material with opacity, and has a selector opening 180a, which opens the openings 179a and 179b when the indicia selector plate 180 is set in a predetermined set position. A hole 180b is formed in an end of the indicia selector plate 180, and receives a pin 181a, which is formed with an end of a slider 181.

An imprinter light guide member 183 and a light-shielding cover 184 are located in front of the indicia selector plate 180. The slider 181 is mounted in front of the light-shielding cover 184 in a horizontally slidable manner. A coil spring 186 has one end connected with the light-shielding cover 184, and a remaining end connected with one end of the slider 181. The coil spring 186 biases the slider 181 to the right in the drawing. A fork 181b is formed with a remaining end of the slider 181. A lever end 175b of the lever 175 is located in an arm portion extending beside the light-shielded tunnel 146, and engaged with the fork 181b. The indicia selector plate 180 is slid by the slider 181 sliding in response to rotation of the lever 175. The coil spring 186 keeps the lever end 175a of the lever 175 in contact with an inner surface of the cam groove 174, to transmit rotation of the view selector plate 163 to the indicia selector plate 180.

Light emitted by the imprinter LED 159 behind the printed circuit board 151 is passed through a tube 184a in the light-shielding cover 184, and becomes incident upon an end of the imprinter light guide member 183, is guided by reflection inside the imprinter light guide member 183, and directed toward the openings 179a and 179b. A reference numeral 185 designates a light-shielding member, held between the printed circuit board 151 and the tube 184a in a slightly collapsed manner, for preventing ambient light from entry to the tube 184a through a bottom of the imprinter LED 159, and preventing light of the imprinter LED 159 from spreading inside the housing 102.

Consequently the indicia selector mechanism for selectively determining the form of the magnification indicia 138 according to a magnification set with the operation button 109 is constructed by a combination of the cam groove 174, the lever 175, the openings 179a and 179b, the indicia selector plate 180, the slider 181, the imprinter light guide member 183, the light-shielding cover 184 and the coil spring 186.

When the operation button 109 is operated to set the first telephoto finder frame 170 at the objective window 106, the indicia selector mechanism causes the indicia selector plate 180 to move to the left in FIG. 13 and away from the first opening 179a. Also the selector opening 180a comes in front of the second opening 179b. Thus both the openings 179a and 179b are opened. The first and second dots 138a and 138b are imprinted to the optical indicia area 137 as the magnification indicia 138. If the operation button 109 is operated to set the second telephoto finder frame 171 at the objective window 106, the indicia selector mechanism causes the indicia selector plate 180 to move to the right in FIG. 13. The selector opening 180a comes in front of the first opening 179a. The indicia selector plate 180 closes the second opening 179b. Thus only the first opening 179a is open. Only the first dot 138a is imprinted to the optical indicia area 137 as the magnification indicia 138.

When the operation button 109 is positioned to set the recess 172 at the objective window 106, the indicia selector plate 180 is set in a position to block both the openings 179a and 179b. No dot is imprinted in the optical indicia area 137. The dot number of the magnification indicia 138 is zero (0).

Figure 14:
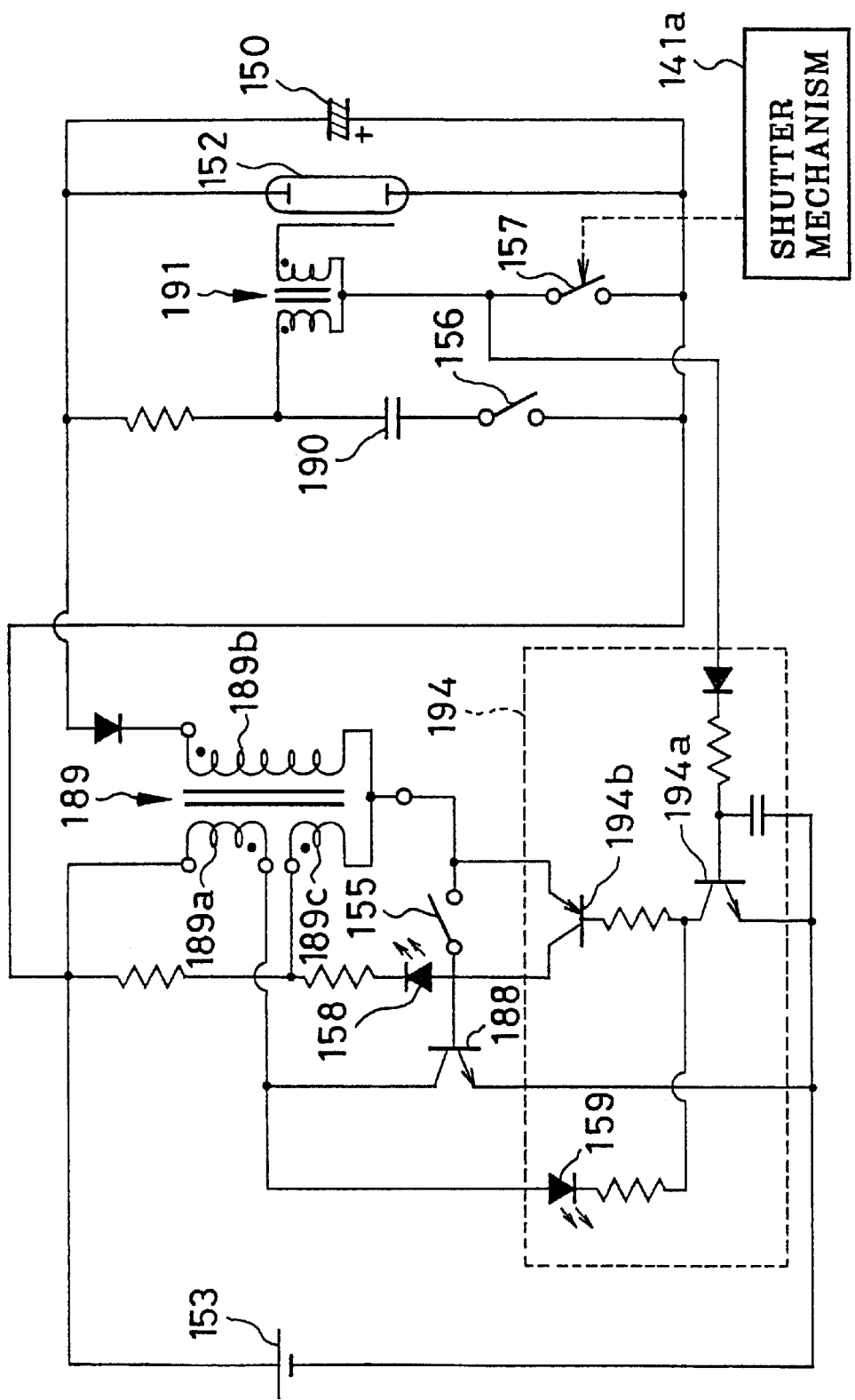
FIG. 14 is a block diagram schematically illustrating a driving circuit for an imprinter LED incorporated in a flash circuit.

In FIG. 14, the flash unit 142 has the main capacitor 150, a flash discharge tube 152, the battery 153, the charger switch 155, the flash set switch 156, the synchro switch 157 and the indicator LED 158, and also includes an oscillation transistor 188, an oscillation transformer 189, a trigger capacitor 190, a trigger transformer 191 and the like.

The oscillation transistor 188 and the oscillation transformer 189 constitute a blocking oscillator for converting the low voltage of the battery 153 to high voltage as known in the art. The blocking oscillator operates while the charger switch 155 is turned on, to generate the high voltage in a secondary winding 189b according to a ratio between the numbers of turns of the secondary winding 189b and a primary winding 189a. Thus the main capacitor 150 and the trigger capacitor 190 are charged. Terminals of a tertiary winding 189c apply voltage to the indicator LED 158 in a forward direction. The forwards directed voltage increases in proportion to the charged voltage of the main capacitor 150 in the course of the charging, until the indicator LED 158 comes to illuminate upon the finish of the charging.

When the shutter blade in the shutter mechanism 141a turns on the synchro switch 157, the trigger capacitor 190 is discharged under the condition of keeping the flash set switch 156 turned on. Trigger voltage generated by the trigger transformer 191 is applied to the flash discharge tube 152, the main capacitor 150 is discharged in connection with the flash discharge tube 152. The flash discharge tube 152 is caused to emit flash light, with which a flash emitter 107 illuminates.

A drive circuit 194 for driving the imprinter LED 159 is incorporated in the above-described flash circuit, and constitutes the indicia exposing device in combination with the above indicia selector mechanism. In the drive circuit 194, a first transistor 194a is turned on when the synchro switch 157 is turned on, in a manner irrespective of designated occurrence of flash emission, set positions of the charger switch 155 or the flash set switch 156, the charged voltage of the main capacitor 150, or the like. When the first transistor 194a is turned on, a second transistor 194b is also turned on, the second transistor 194b being connected in parallel with the charger switch 155. Then the blocking oscillator in the flash circuit starts operating.

The imprinter LED 159 is connected between one terminal of the oscillation transformer 189 and the grounded potential. In other words the imprinter LED 159 is connected with a collector and an emitter of the oscillation transistor 188 via the first transistor 194a. While the first transistor 194a is turned on, a voltage between the collector and the emitter of the oscillation transistor 188. The voltage between the collector and the emitter of the oscillation transistor 188 is increased in a pulsed manner by 6–7 volts in synchronism with oscillation of a blocking oscillator. The imprinter LED 159 emits light while the synchro switch 157 is turned on each time that the shutter blade operates for an exposure. Details of this circuit are described in the commonly assigned U.S. Pat. No. 5,784,658 (corresponding to JP-A 8-248572). Of course the construction for driving the imprinter LED 159 or that for imprinting the magnification indicia 138 may be modified.

The above lens-fitted photo film unit is provided with the finder frames in the view selector plate 163 and printed indication on the label 103, but except for those elements, can be constructed from parts common with the lens-fitted photo film unit in which the PAR indicia are imprinted to photo film to enable production of prints at plural aspect ratios. It is possible to reduce changes in a manufacturing line, and reduce addition of new elements to manufacturing facilities. Increase in the manufacturing cost can be minimized.

By the construction in which the photo film 118 storing the telephoto selectable type data is used and the magnification indicia 138 for one magnification is imprinted, it is possible to produce photographic prints in manners of photographing as if a taking lens having focal lengths of 48 mm and 72 mm were used for exposures. It is not necessary to increase a length of an optical path from the taking lens 104 to the photo film 118. No complicated mechanism to change over the taking lens is required. Accordingly the lens-fitted photo film unit can have a reduced size and a thin shape without complicating the structure.

Figure 15:
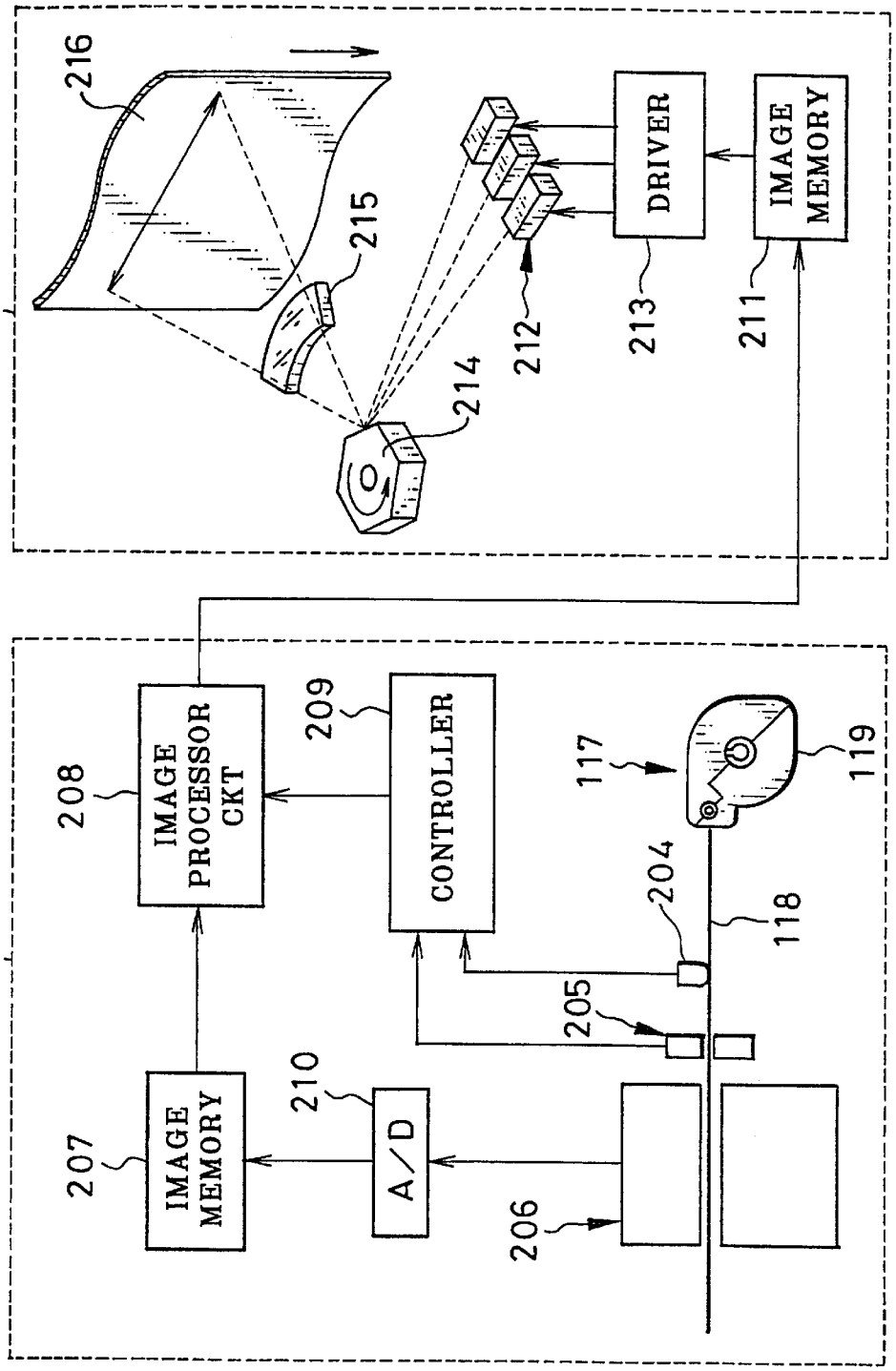
FIG. 15 is a block diagram schematically illustrating a digital printer.

In FIG. 15, an example of a printer for producing prints from the photo film 118 is depicted. The printer is structured to produce prints from the photo film 118 according to the magnification indicia 138. The printer is provided with a modified or additional program on the basis of a program of a digital printer for producing prints of predetermined types from an ordinary photo film or the photo film 118 with the PAR indicia imprinted thereto.

The digital printer generally consists of an input component 201 and an output component 202. The input component 201 includes a magnetic head 204, a photo sensor 205, a scanner 206, an image memory 207, an image processor circuit 208, a conveyor mechanism (not shown), a controller 209 and the like. The magnetic head 204 reads data from the magnetic data track. The photo sensor 205 reads the bar codes 128 and 129 and indicia in the optical indicia area 137. The scanner 206 reads an image from the imaging frame 130 of the photo film 118. The conveyor mechanism conveys the photo film 118 from the cassette 119 toward the scanner 206 after the photo film cassette 117 is set. The controller 209 controls those elements.

While the photo film 118 is conveyed, the magnetic head 204 reads data of various kinds from the magnetic data tracks of the photo film 118. The data are sent to the controller 209, and used for control of image processing in the image processor circuit 208. Also during the conveyance of the photo film 118, the photo sensor 205 reads the bar codes 128 and 129 of the visible forms, and optical indicia in the optical indicia area 137, namely the PAR indicia or the magnification indicia 138. A result read by the photo sensor 205 is sent to the controller 209, and used in the image processing in combination with the data from the magnetic tracks.

The scanner 206 is constituted by a photo film carrier, an illuminator, a CCD (charge coupled-device), a lens and the like. The illuminator illuminates the imaging frame 130 of the photo film set in the photo film carrier. The CCD reads the imaging frame 130. The lens focuses an image of the imaging frame 130 on the CCD. The CCD in the scanner 206 measures the image of the imaging frame 130 by photometry of three-color separation of red, blue and green colors each time the photo film 118 is advanced by one frame. The scanner 206 obtains an photoelectric signal, and sends it to an A/D converter 210.

The A/D converter 210 converts the image in the imaging frame 130 into three-color image data by digital conversion of the photoelectric signal of each of the colors. The three-color image data is written to the image memory 207. The image processor circuit 208, upon writing of the image data for one frame, reads the image data from the image memory 207, and processes an image under the control by the controller 209.

For this image processing, colors of an image are corrected. If the telephoto selectable type data is detected from the photo film 118, a trimmed region is trimmed from the imaging frame 130 according to the magnification indicia 138 for each imaging frame, and is enlarged by a printing magnification determined from a size of the trimmed region. If the magnification indicia 138 of an imaging frame has no dot, then the imaging frame is handled in the standard manner of the printing. The whole region of the imaging frame 130 is used to produce processed image data for printing the imaging frame 130 by fully using the photographic paper of the H-size. If the magnification indicia 138 of an imaging frame has two (2) dots, then the imaging frame is handled in the 2-time tele-converting printing. The 2-time tele-converted trimmed region, which has an area ¼ as much as that of the imaging frame 130, is used to produce processed image data for printing the imaging frame 130 by fully using the photographic paper of the H-size. If the magnification indicia 138 of an imaging frame has one (1) dot, then the imaging frame is handled in the 3-time tele-converting printing. The 3-time tele-converted trimmed region, which has an area ⅑ as much as that of the imaging frame 130, is used to produce processed image data for printing the imaging frame 130 by fully using the photographic paper of the H-size.

The output component 202 is constituted by an image memory 211, a laser unit 212, a driver 213, a polygon mirror 214, an Fθ lens 215, a conveyor mechanism (not shown) and the like. The image memory 211 stores the processed image data written to it by the image processor circuit 208. The laser unit 212 outputs laser of each of red, blue and green colors. The driver 213 controls the output of the laser unit 212 according to the processed image data of the image memory 211. The conveyor mechanism conveys continuous color photographic paper 216.

While the color photographic paper 216 is conveyed in its longitudinal direction, the output component 202 exposes the color photographic paper 216 by use of main scanning of laser light with the polygon mirror 214 rotating at high speed, and sub scanning of the color photographic paper 216 being conveyed, so as to create an image processed by the image processor circuit 208. The color photographic paper 216 being exposed is developed, and cut frame from frame to produce photographic prints. Note that the color photographic paper 216, as measured in the direction perpendicular to the conveying direction, has a width equal to a shorter side of a photographic print of an H-size print.

Figure 8:
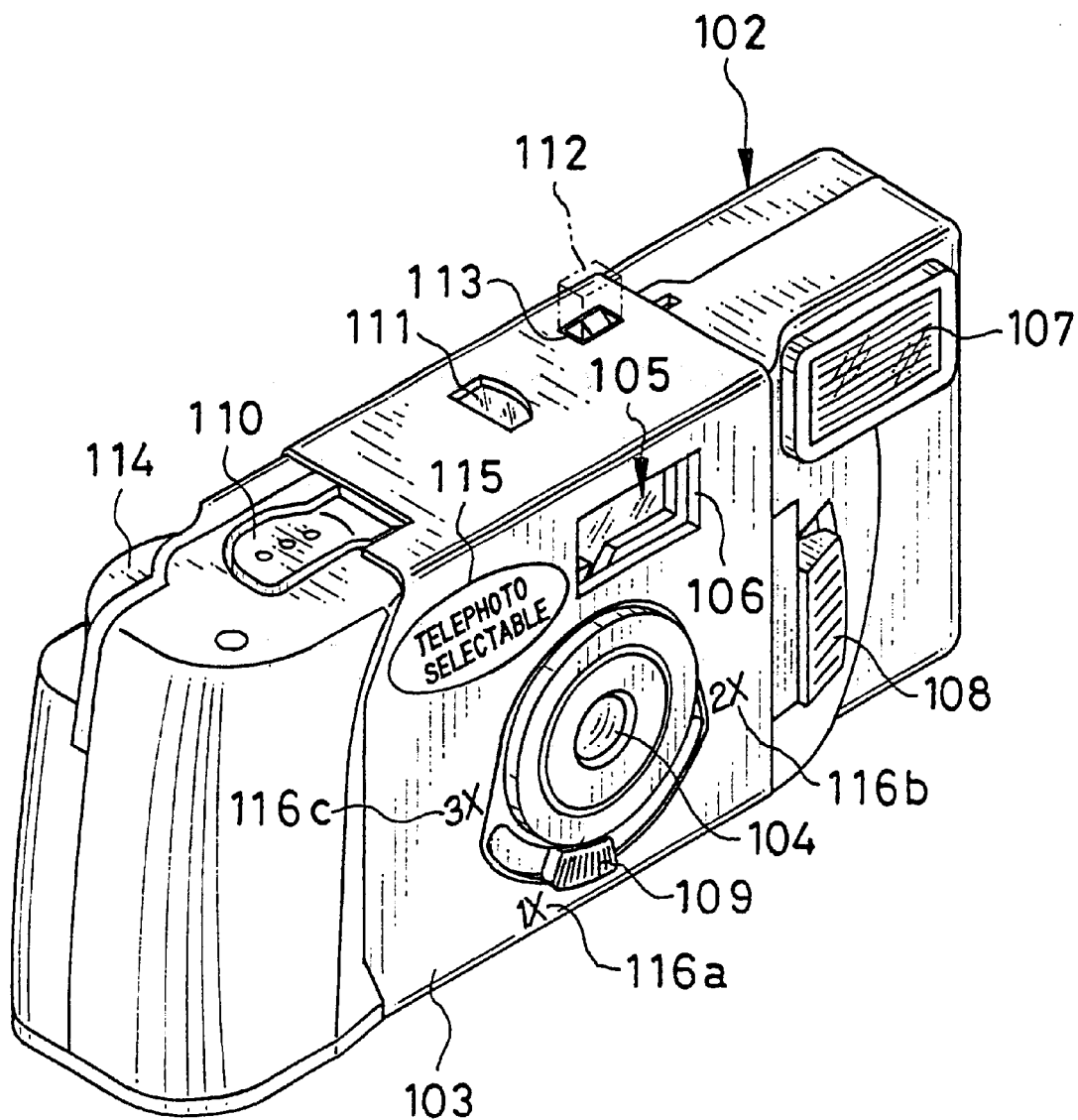
FIG. 8 is a perspective illustrating another preferred lens-fitted photo film unit.

In FIG. 8, a reference numeral 111 designates a counter window for indicating the number of remaining available frames. An opening 113 is formed for protrusion of the indicator light guide member 112. A printed caption "TELEPHOTO SELECTABLE" 115 indicates the type in which a printing magnification can be selectively designated to obtain pseudo-zoom photographs. Signs 116a, 116b and 116c are 1×, 2× and 3× for indicating respective set positions of the operation button 109.

Figure 16:
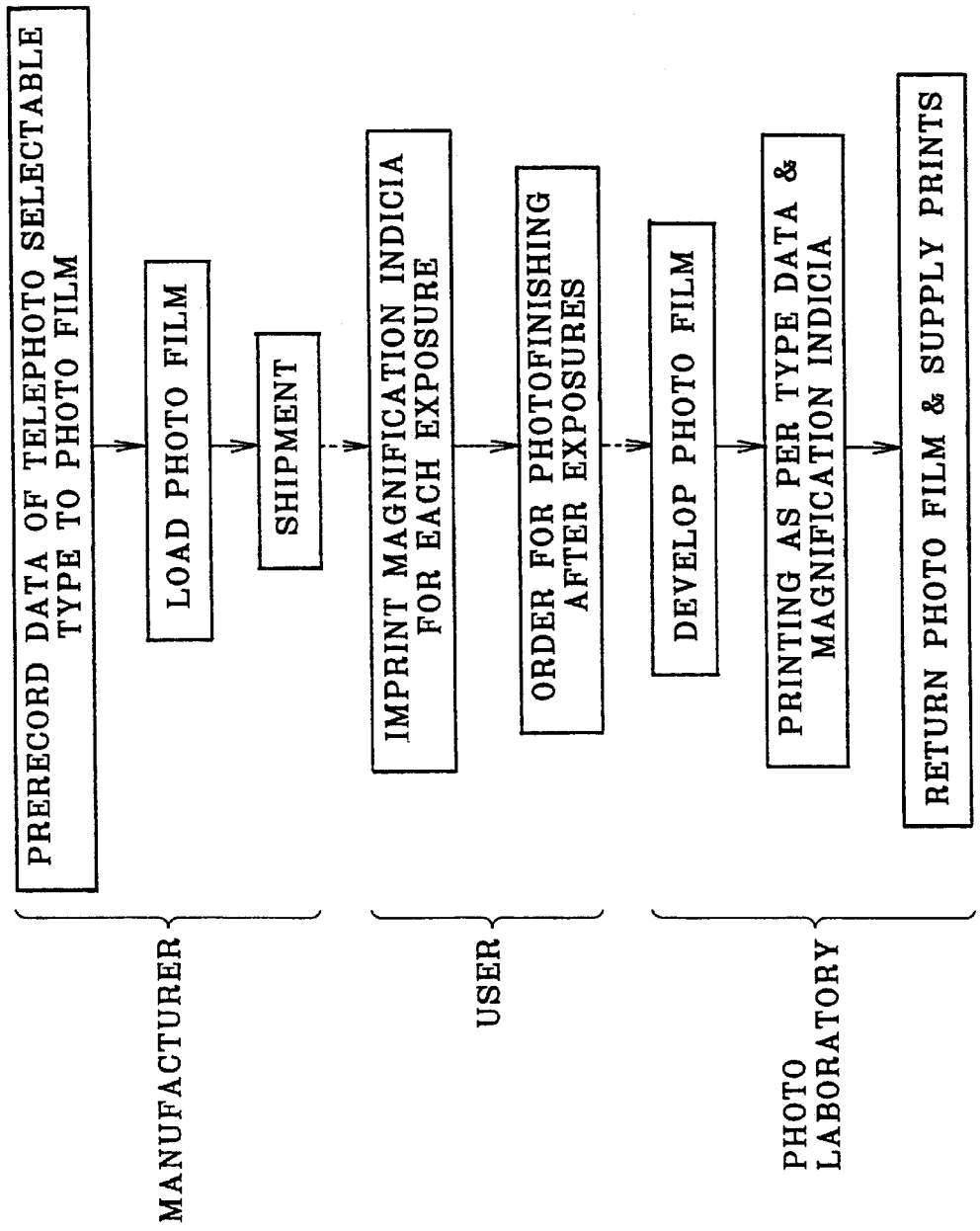
FIG. 16 is a flow chart illustrating a process of a system in which the lens-fitted photo film unit is used.

The operation of the above construction is described now. FIG. 16 illustrates a flow from the manufacture up to a return of photographic prints to a user. The photo film 118, which is to be loaded in a lens-fitted photo film unit of the telephoto selectable type, is subjected in the manufacture to a magnetic recording step, where the telephoto selectable type data is prerecorded to the PLD track 132.

The photo film 118 in which the telephoto selectable type data is prerecorded is inserted into the main body 140 with the cassette 119. A rear cover 144 is mounted on the main body 140 to finish assembly of the housing 102. The label 103 is attached to the housing 102 to obtain the lens-fitted photo film unit, which is shipped, supplied to a user, and used for taking exposures.

When the operation button 109 is operated, the view selector plate 163 is rotated. The visual field of the viewfinder 105 becomes that according to the designated printing mode. It is possible to observe the visual field equal to a region which a print will have. Rotation of the view selector plate 163 causes the lever 175 to slid the indicia selector plate 180 to a position according to the designated printing mode. A user observes the photographic field of view through the viewfinder 105, frames it, and depresses a shutter release button 110 to take an exposure.

If flash light is required, the charger lever 108 is slid to an on-position to turn on the charger switch 155. Illumination of the indicator LED 158 is checked at the indicator light guide member 112 to confirm a finish of the charging of the main capacitor 150. Then the shutter release button 110 is depressed.

When the shutter release button 110 is pushed, the shutter mechanism 141a is actuated to open and close the shutter blade. An exposure is taken. Upon a reach of the shutter blade to a fully open position, the synchro switch 157 is turned on. If the main capacitor 150 has finished being charged with the charger lever 108 kept in an on-position, flash light is emitted as the flash set switch 156 is turned on. Light passed through the taking lens 104 while the shutter blade is open is passed through an exposure aperture 145 to be incident upon an emulsion surface of the photo film 118. Thus the whole of the imaging frame 130 is exposed.

When the synchro switch 157 is turned on, the first transistor 194a in the drive circuit 194 is turned on in a manner irrespective of designation of flash emission. The second transistor 194b is also turned on. The blocking oscillator is operated while the synchro switch 157 is turned on even the charger switch 155 is turned off. The voltage between the collector and the emitter of the oscillation transistor 188 causes the imprinter LED 159 to illuminate.

The light emitted from the imprinter LED 159 is passed through the imprinter light guide member 183, and directed toward the openings 179a and 179b. The indicia selector plate 180 is suitably set between the imprinter light guide member 183 and the openings 179a and 179b. The light from the imprinter LED 159 comes incident to the bottom of the imaging frame 130 of the photo film 118 through a designated set of at least one of the openings 179a and 179b according to the designated printing mode. The magnification indicia 138 having a dot or dots of this mode is imprinted to the optical indicia area 137.

In a photo laboratory, the photo film cassette 117 after exposures is removed from the housing 102. The photo film 118 is drawn out of the cassette 119 of the photo film cassette 117. The photo film 118 is set in a photo film processor and developed, and contained in the cassette 119 again. The cassette 119 is then set in the digital printer. In the digital printer, the leader of the photo film 118 is drawn out of the cassette 119 and conveyed toward the scanner 206.

In the course of the conveyance, the magnetic head 204 reads the PLD track 132, the CDD track 136 and the CLD track 134 serially on the leader of the photo film 118. Then the magnetic head 204 reads the PFSD track 133 and the CFSD track 135 for each of the imaging frames. Various kinds of the data in those data tracks are recognized by the controller 209. Also during the conveyance, the photo sensor 205 reads the bar codes 128 and 129 and the optical indicia (either PAR indicia or magnification indicia) in the optical indicia area 137, all of which are developed visible images, and recognized by the controller 209. The controller 209, according to the data and indicia information, controls the image processor circuit 208.

Figure 17:
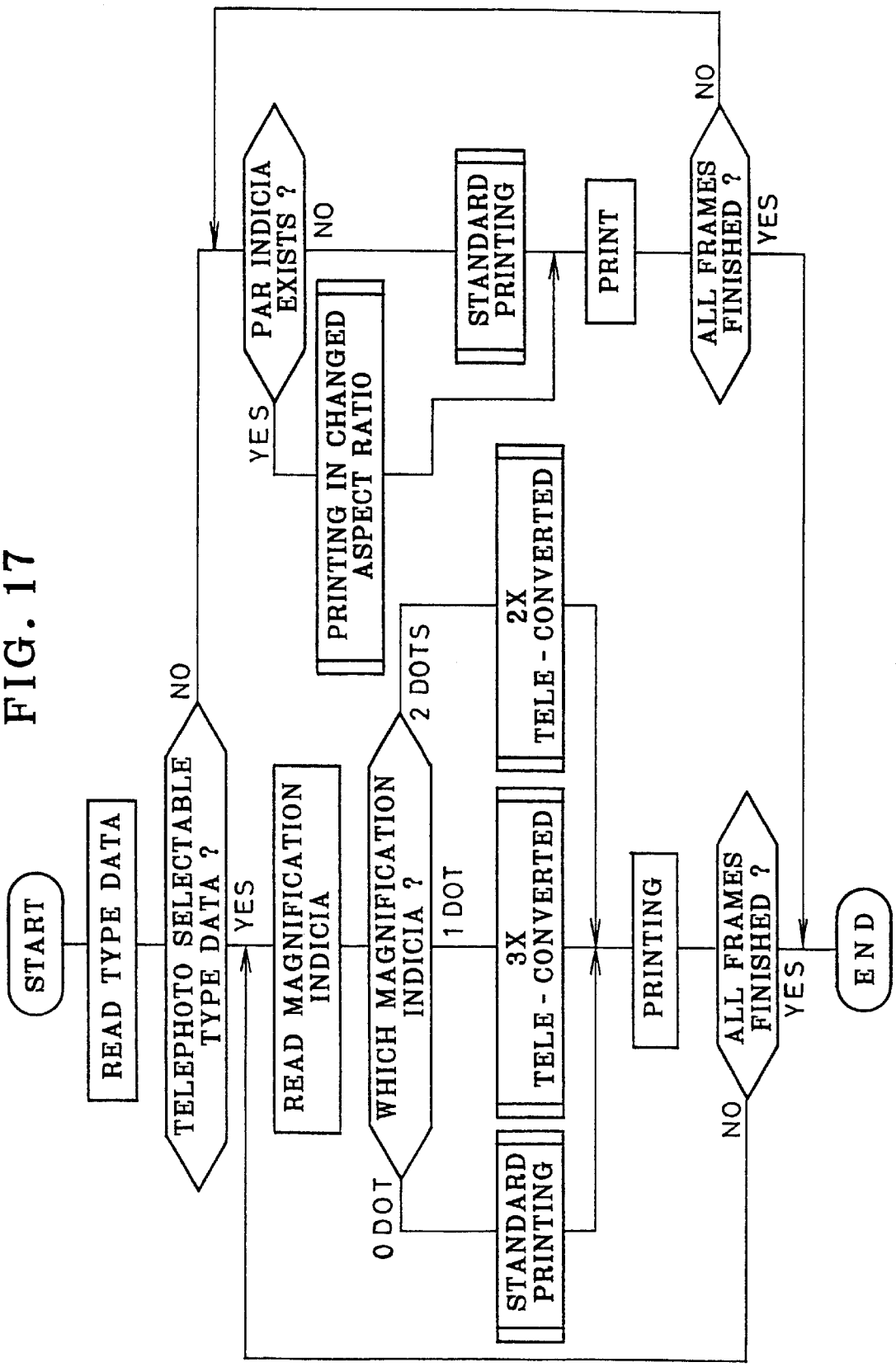
FIG. 17 is a flow chart illustrating an operation of the digital printer.

In FIG. 17, steps of operation of the digital printer are depicted. In the control of the image processor circuit 208, the controller 209 checks the type data magnetically recorded to the PLD track 132, and judges whether the type data is the telephoto selectable type data. Of course the photo film 118 originally has the telephoto selectable type data. The controller 209 changes over the control to determine the optical indicia in the optical indicia area 137 of the photo film 118 as the magnification indicia 138.

The photo sensor 205 reads the magnification indicia 138 from the optical indicia area 137 of a first imaging frame during a period beginning upon reading of each magnetic data track of the leader of the photo film 118 and ending upon setting of the first imaging frame at the photo film carrier of the scanner 206. The magnification indicia 138 is stored in the controller 209.

When the first imaging frame is set in the photo film carrier, the CCD starts being operated. An image of the whole of the imaging frame 130 of the first imaging frame is read. The three-color image data of the image is written to the image memory 207 in cooperation with the A/D converter 210. Then the image processor circuit 208 reads the image data from the image memory 207. The controller 209 sends an instruction signal to the image processor circuit 208 according to a detected result of the magnification indicia 138.

According to this instruction, the image processor circuit 208 designates only data of the trimmed region from the image data of the first imaging frame according to the magnification indicia, and produces processed image data with which an image of the trimmed region is printed in an area of the H-size. The image processor circuit 208 outputs the three-color processed image data, which is written to the image memory 211 of the output component 202.

The processed image data is written to the image memory 211. The laser unit 212 is driven by the driver 213 according to the processed image data. An image of the trimmed region according to the magnification indicia 138 determined for the first imaging frame is enlarged at the H-size and created on the color photographic paper 216. Similarly the image of each imaging frame is read by the scanner 206. An image of each trimmed region according to the magnification indicia 138 associated with each imaging frame is enlarged and created on the color photographic paper 216.

The exposed portion of the color photographic paper 216 is sent to a station of development for the color paper, and developed, fixed and dried. The color photographic paper 216 is cut at a frame size of the H-size print, and exited from the digital printer. Those photographic prints are supplied to the user with the photo film 118.

Figure 18A:
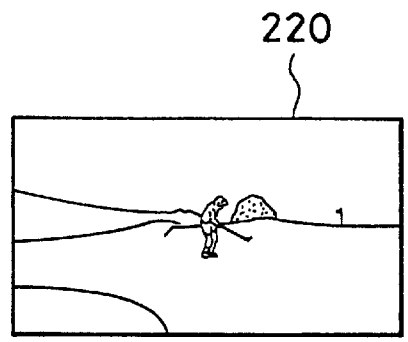
FIG. 18A is an explanatory view illustrating an image in a viewfinder according to the Standard mode.

If the operation button 109 is set at the standard position to designate the standard mode, the recess 172 is set behind the objective window 106. As depicted in FIG. 18A, a standard visual field 220 is defined in the viewfinder 105 to observe a subject image, and corresponds to photography with the taking lens having the focal length of 24 mm.

Figure 18B:
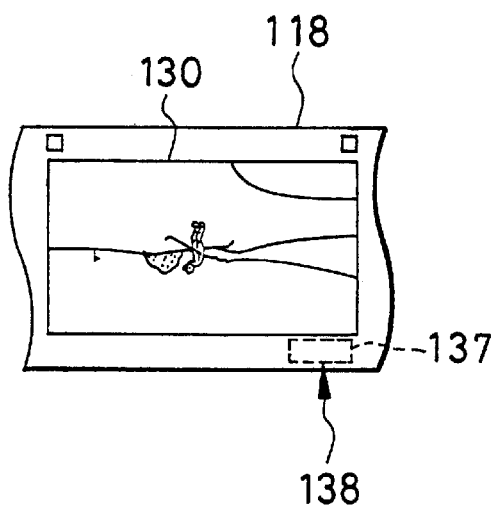
FIG. 18B is an explanatory view illustrating the image in an imaging frame.

An exposure is taken while framing the subject as illustrated in FIG. 18A. In FIG. 18B, the subject image observed through the viewfinder 105 is exposed on the photo film 118 in the whole of the imaging frame 130. In response to setting of the operation button 109 in the standard position, the openings 179a and 179b are blocked by the indicia selector plate 180. No dot is imprinted to the optical indicia area 137 if the imprinter LED 159 illuminates. The number of a dot of the magnification indicia 138 is zero (0).

Figure 18C:
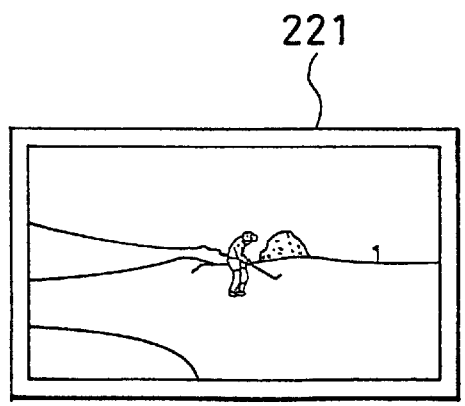
FIG. 18C is an explanatory view illustrating the image in a photographic print.

According to the magnification indicia 138 of this form lacking a dot, standard printing is designated, in which a printing magnification is determined to enlarge the whole of the imaging frame 130 approximately to the H-size in exposing the color photographic paper 216. In FIG. 18C, a standard photographic print 221 is obtained with an image size and an angle of view in a manner of photography with a taking lens having the focal length of 24 mm.

If the operation button 109 is set at the 2-time tele-converting position to designate the 2-time tele-converting mode, the first telephoto finder frame 170 is set behind the objective window 106. Hatched peripheral portions indicated in FIG. 19A inside the viewfinder 105 are masked to allow observing the central portion which has an area ¼ as much as the standard visual field 220. A first telephoto visual field 222 is defined to observe a subject image, and corresponds to telephotography with a taking lens having a focal length of 48 mm. Note that partial images in the hatched portion in the drawing are not seen through the viewfinder 105.

Figure 19A:
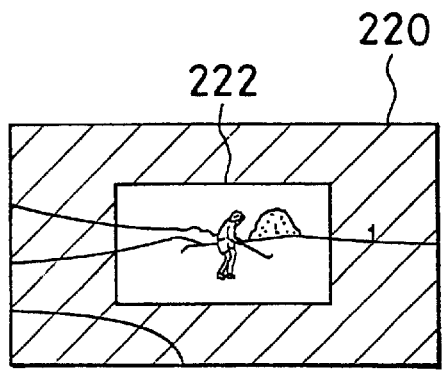
FIG. 19A is an explanatory view illustrating an image in the viewfinder according to the 2-time tele-converting mode.
Figure 19B:
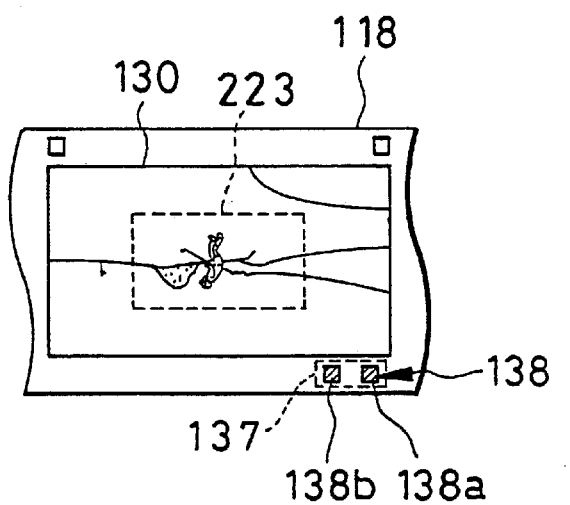
FIG. 19B is an explanatory view illustrating the image in an imaging frame.

A photographic subject is targeted as illustrated in FIG. 19A to take an exposure. In FIG. 19B, the whole image is exposed fully in the region of the imaging frame 130 in a manner inclusive of the partial peripheral images masked by the recess 172. The exposed state is the same as that with the taking lens 104 having the focal length of 24 mm. The observed subject image in the first telephoto visual field 222 is exposed to a first telephoto trimmed region 223, which has the same aspect ratio as the imaging frame 130 but has an area ¼ as much as that of the imaging frame 130. As the operation button 109 is positioned for the 2-time tele-converting printing, both the openings 179a and 179b are kept open by the indicia selector plate 180. The magnification indicia 138 including both the dots 138a and 138b is imprinted in the optical indicia area 137 by the light from the imprinter LED 159.

Figure 19C:
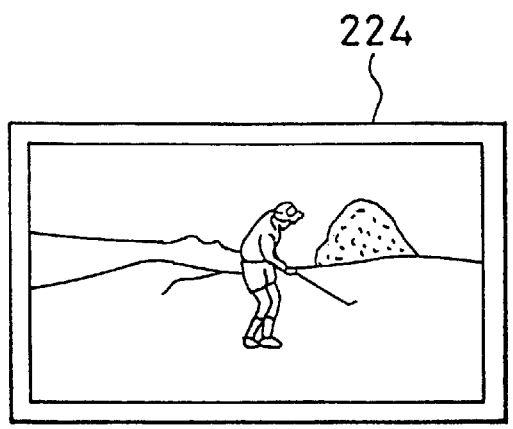
FIG. 19C is an explanatory view illustrating the image in a photographic print.

According to the two dots of the magnification indicia 138, 2-time tele-converting printing is designated, in which a printing magnification is determined to enlarge the first telephoto trimmed region 223 approximately to the H-size in exposing the color photographic paper 216. This printing magnification is two times as great as that for the standard print 221 described above. In FIG. 19C, a first telephoto photographic print 224 is obtained with an image size and an angle of view in a manner of telephotography with a taking lens having the focal length of 48 mm.

Figure 20A:
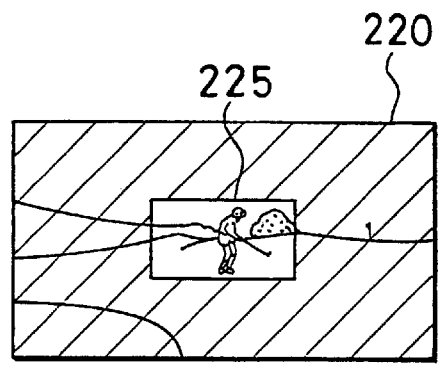
FIG. 20A is an explanatory view illustrating an image in the viewfinder according to the 3-time tele-converting mode.

If the operation button 109 is set at the 3-time tele-converting position to designate the 3-time tele-converting mode, the second telephoto finder frame 171 in the viewfinder 105 in FIG. 20A allows observing the central portion which has an area ⅑ as much as the standard visual field 220. A second telephoto visual field 225 is defined to observe a subject image, and corresponds to telephotography with a taking lens having a focal length of 72 mm.

Figure 20B:
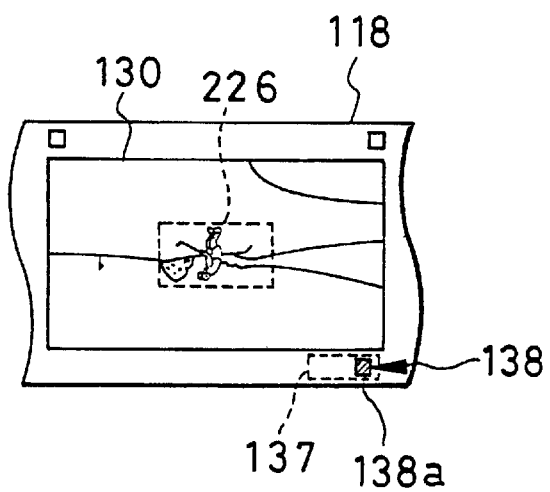
FIG. 20B is an explanatory view illustrating the image in an imaging frame.
Figure 20C:
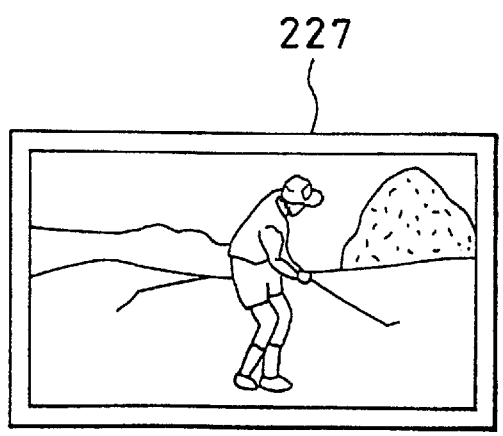
FIG. 20C is an explanatory view illustrating the image in a photographic print.

In FIG. 20B, the whole image is exposed fully in the region of the imaging frame 130 in a manner inclusive of the partial peripheral images masked by the second telephoto finder frame 171. The observed subject image is exposed to a second telephoto trimmed region 226, which has the same aspect ratio as the imaging frame 130 but has an area ⅑ as much as that of the imaging frame 130. Only the first opening 179a is kept open by the indicia selector plate 180. The magnification indicia 138 including only the first dot 138a is imprinted in the optical indicia area 137. At the time of printing, the 3-time tele-converting printing is designated according to the magnification indicia 138. In FIG. 20C, the image in the second telephoto trimmed region 226 is enlarged at the H-size. As a result a second telephoto photographic print 227 is obtained with an image size and an angle of view in a manner of telephotography with a taking lens having the focal length of 72 mm.

If no telephoto selectable type data is detected from photo film, the optical indicia in the optical indicia area 137 on the photo film is recognized as PAR indicia. According to the number of a dot or dots of the PAR indicia, prints are produced at the panoramic size or the C-size. If there is no dot, then a print of the H-size is produced.

Figure 21:
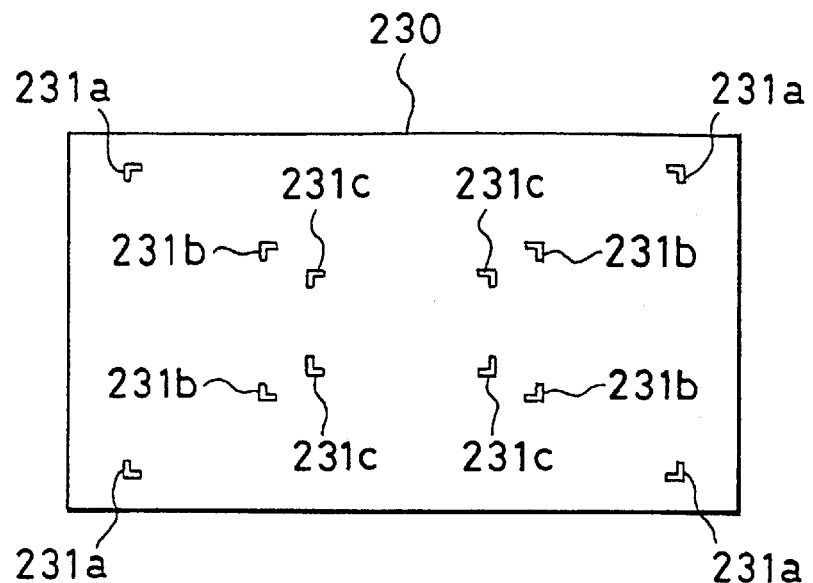
FIG. 21 is an explanatory view illustrating a preferred embodiment in which finder frames are observable associated with each of magnification modes.

In the above embodiment, the view selector plate is used to select one of the visual fields according to a designated printing mode. Alternatively a structure in FIG. 21 can be used. Inside a finder visual field 230 are observable standard frame pointers 231*a*, first frame pointers 231*b* and second frame pointers 231*c*. The standard frame pointers 231*a* indicate a region determined as if an exposure region were defined for a taking lens having a focal length of 24 mm. The first frame pointers 231*b* indicate a trimmed region determined as if an exposure region were defined for a taking lens having a focal length of 48 mm. The second frame pointers 231*c* indicate a trimmed region determined as if an exposure region were defined for a taking lens having a focal length of 72 mm. It is also possible to change a visual field of the viewfinder and a size of an observed image by changing over an eyepiece lens of the viewfinder 105 according to setting of the operation button 109.

Figure 22:
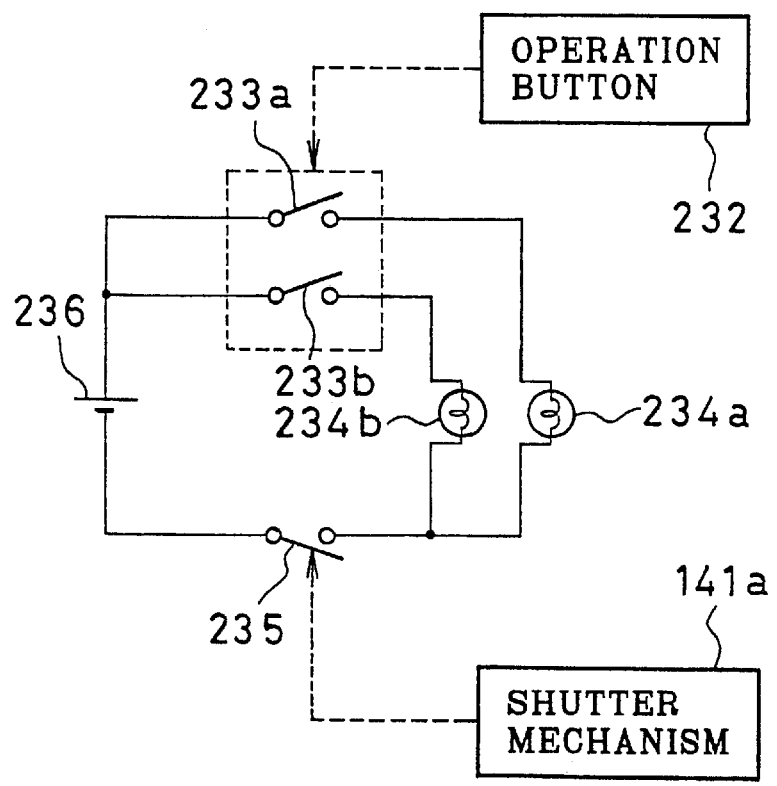
FIG. 22 is a block diagram schematically illustrating another preferred driving circuit for the imprinter LED.

A drive circuit for imprinting magnification indicia may be constructed as illustrated in FIG. 22. The drive circuit is constituted by first and second switches 233*a* and 233*b*, first and second lamps 234*a* and 234*b*, a synchro switch 235 and a dry battery 236. The switches 233*a* and 233*b* are turned on and off according to a position of an operation button 232. The lamps 234*a* and 234*b* are light sources for first and second dots of magnification indicia. The synchro switch 235 is turned on when the shutter blade of the shutter mechanism 141*a* fully opens. The operation button 232 is disposed on the rear of the lens-fitted photo film unit in a manner the same as the operation button 12 of FIG. 3.

When the operation button 232 is set in the position 1× of the standard magnifying mode, both the switches 233*a* and 233*b* are turned off. When the operation button 232 is set in the position 2× of the 2-time tele-converting mode, both the switches 233*a* and 233*b* are turned on. When the operation button 232 is set in the position 3× of the 3-time tele-converting mode, only the first switch 233*a* is turned on. The magnification indicia according to the printing mode designated with the operation button 232 by the user is imprinted to the optical indicia area 137.

There is no need of an indicia selector mechanism for changing the imprinted form of a printing magnification. The battery 236 may be the battery of the flash unit. Two (2) LEDs may be used instead of the lamps 234*a* and 234*b*. Furthermore only one lamp or LED may be used in combination with the indicia selector mechanism of the above embodiment for the purpose of imprinting magnification indicia. If the output voltage of the battery is insufficient for causing the LED to illuminate, it is necessary to obtain sufficiently high voltage in the manner the same as the above embodiment, or to use a battery of electromotive force of three (3) volts to drive the LED directly.

Another preferred embodiment is hereinafter described in which there is only one fixed printing condition of high magnification for pseudo-zoom photographs. Elements similar to those of the above embodiments are designated with identical reference numerals.

Figure 23:
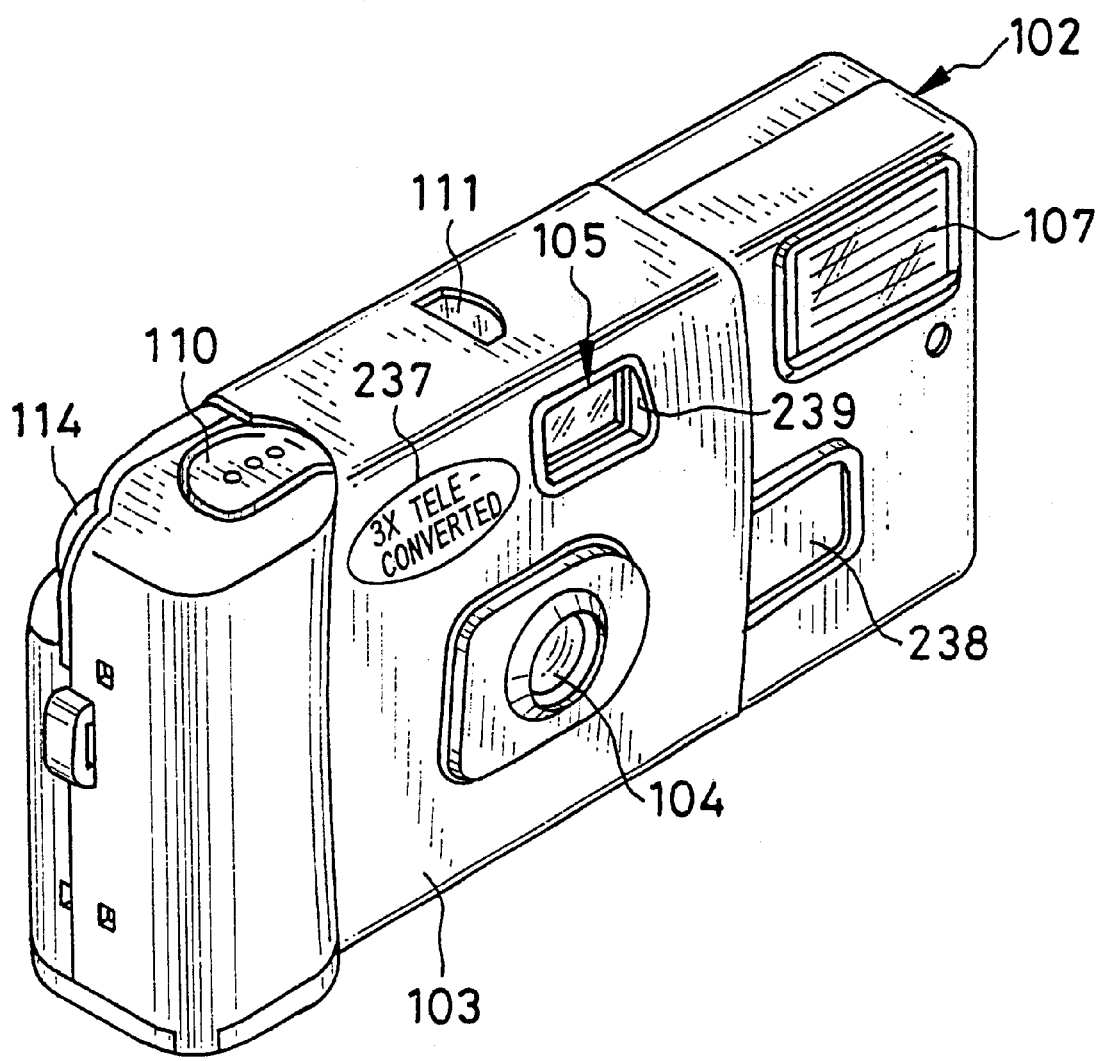
FIG. 23 is a perspective illustrating a lens-fitted photo film unit specialized for the 3-time tele-converting mode.

In FIG. 23, there is a printed caption 237 of "3× TELE-CONVERTED" on the label 103. A charger pushbutton 238 is disposed on the front face of the lens-fitted photo film unit. When the charger pushbutton 238 is depressed, the flash device is charged. There is an indicator window (not shown), formed near to the eyepiece of the viewfinder 105, for externally guiding illumination of an LED or neon tube to indicate a finish of the charging. If the main capacitor finished being charged, flash light is emitted. It is also possible to use the indication of the finish of the charging according to the above embodiment. The taking lens 104 has the focal length of 24 mm. The viewfinder 105 has an objective window 239, which only has a 3-time tele-converted visual field, which corresponds to the taking lens having the focal length of 72 mm.

The housing 102 is constituted by the main body 140, the exposure unit 141, the electronic flash unit 142, the front cover 143 and the rear cover 144, and is pre-loaded with the photo film cassette 117. The housing 102 does not have the operation button for the mode designation, the view selector plate or the indicia exposing device.

The photo film 118 has the PLD track 132 to which the 3-time tele-converting type data is prerecorded magnetically. The 3-time tele-converting type data is information of the photo film designated for producing prints according to the 3-time tele-converting printing condition. This printing condition is to enlarge a 3-time tele-converting trimmed region having an area ⅑ as large as the imaging frame 130, and to produce a 3-time tele-converted print at the H-size.

A printer for producing prints is the digital printer of FIG. 15. The printer is provided with a modified or additional program in such a manner that, when the 3-time tele-converting type data is detected from the PLD track 132, 3-time tele-converted prints are produced from any of the imaging frames of the photo film 118.

Figure 25A:
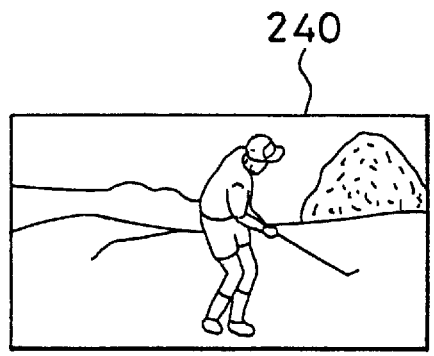
FIG. 25A is an explanatory view illustrating an image in the viewfinder according to the embodiment of FIG. 23.

The operation of the above embodiment is described now. In FIG. 24, the photo film 118 to be inserted in the lens-fitted photo film unit of the 3-time tele-converting type is previously subjected to magnetic recording, to prerecord the 3-time tele-converting type data to the PLD track 132. When a user intends to take an exposure, a photographic subject is targeted while framed inside a telephoto visual field 240 of the viewfinder 105. See FIG. 25A. This corresponds to a region photographable with a taking lens having a focal length of 72 mm.

Figure 25B:
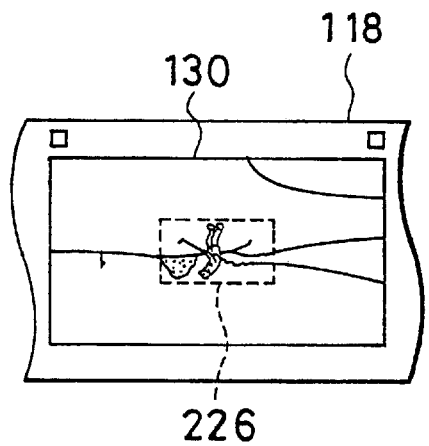
FIG. 25B is an explanatory view illustrating the image in an imaging frame.

The shutter release button 110 is depressed. In FIG. 25B, the whole image is exposed fully in the region of the imaging frame 130 in a manner inclusive of the partial peripheral images being masked around the telephoto visual field 240. The observed subject image is exposed to the second telephoto trimmed region 226 having the same aspect ratio as the imaging frame 130 but the area ⅑ as much as that of the imaging frame 130.

Figure 25C:
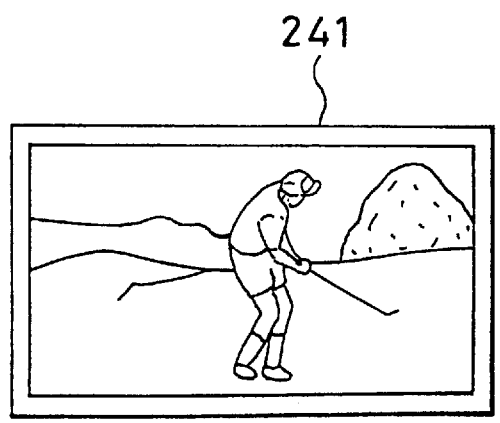
FIG. 25C is an explanatory view illustrating the image in a photographic print.

Exposures are taken one after another. The photo film is developed, and then set in the digital printer. The magnetic head 204 reads the 3-time tele-converting type data from the PLD track 132. The 3-time tele-converting printing is designated. The second telephoto trimmed region 226 in the imaging frame 130 is enlarged and printed. In FIG. 25C, a telephoto photographic print 241 is obtained.

Figure 26:
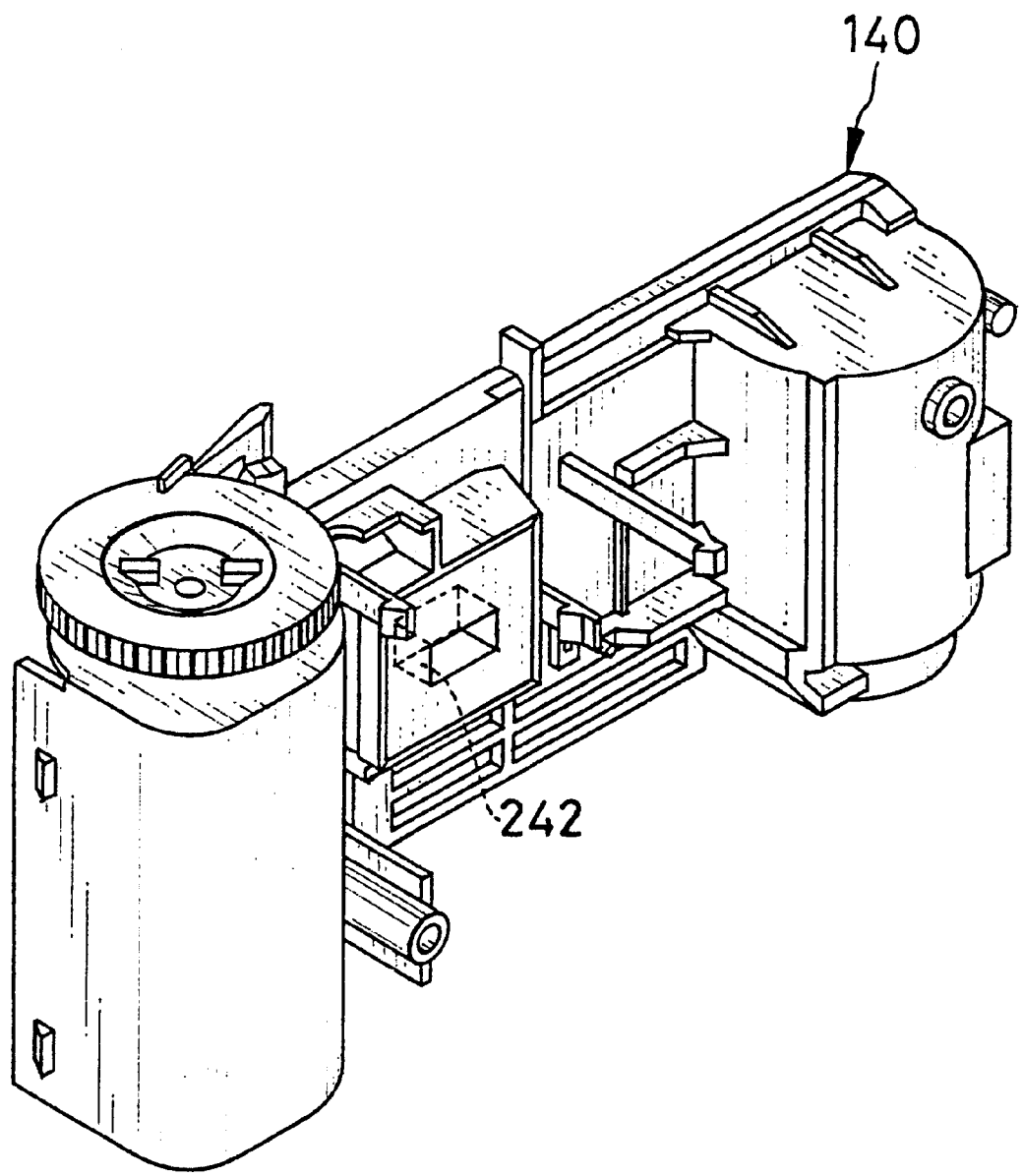
FIG. 26 is a perspective illustrating a preferred embodiment in which an exposure aperture has a reduced size.

The exposure aperture 145 of the main body 140 is determined as the full-size of the imaging frame 130. Alternatively an exposure aperture 242 of FIG. 26 may be formed and used, which has a length and a width ⅓ as great as those of the imaging frame 130. This is effective in reducing the size of the main body 140. Thus the lens-fitted photo film unit can have a reduced size.

It is also possible to prerecord the first dot for each optical indicia area of all the imaging frames, in combination of the 3-time tele-converting type data prerecorded magnetically.

This is similar to the previous embodiment, but enables production of 3-time tele-converted prints.

In the present embodiment, the printing magnification is three times as much in the tele-converting type as that in the standard magnifying type. Of course the printing magnification may be more or less than three times as much. Plural types of telephoto lens-fitted photo film unit may be manufactured and shipped. The lens-fitted photo film unit of the present embodiment may be manufactured together with that according to the first embodiment.

The values of tele-conversion as a ratio of higher magnifications to the standard magnification may be 1×, 1.5× and 3× in combination, or 1×, 2× and 4× in combination. Of course a combination of 1.5×, 2× and 3× can be used without using 1×. If such three magnifications are not required, it is possible to use a combination of two magnifications, such as 1× and 2×. One kind of the type data should be predetermined for each of those combination of the magnifications. It is consequently possible to ship plural types of lens-fitted photo film units between which the combinations of the selectable printing magnifications are different.

Another preferred lens-fitted photo film unit of a slim selectable type is described, in which the printing magnification is differently set between directions respectively parallel with a shorter side and a longer side of an imaging frame, and a subject image such as a standing person is slimly printed by regularly altering the subject image. Elements similar to those of the above embodiments are designated with identical reference numerals.

Figure 27:
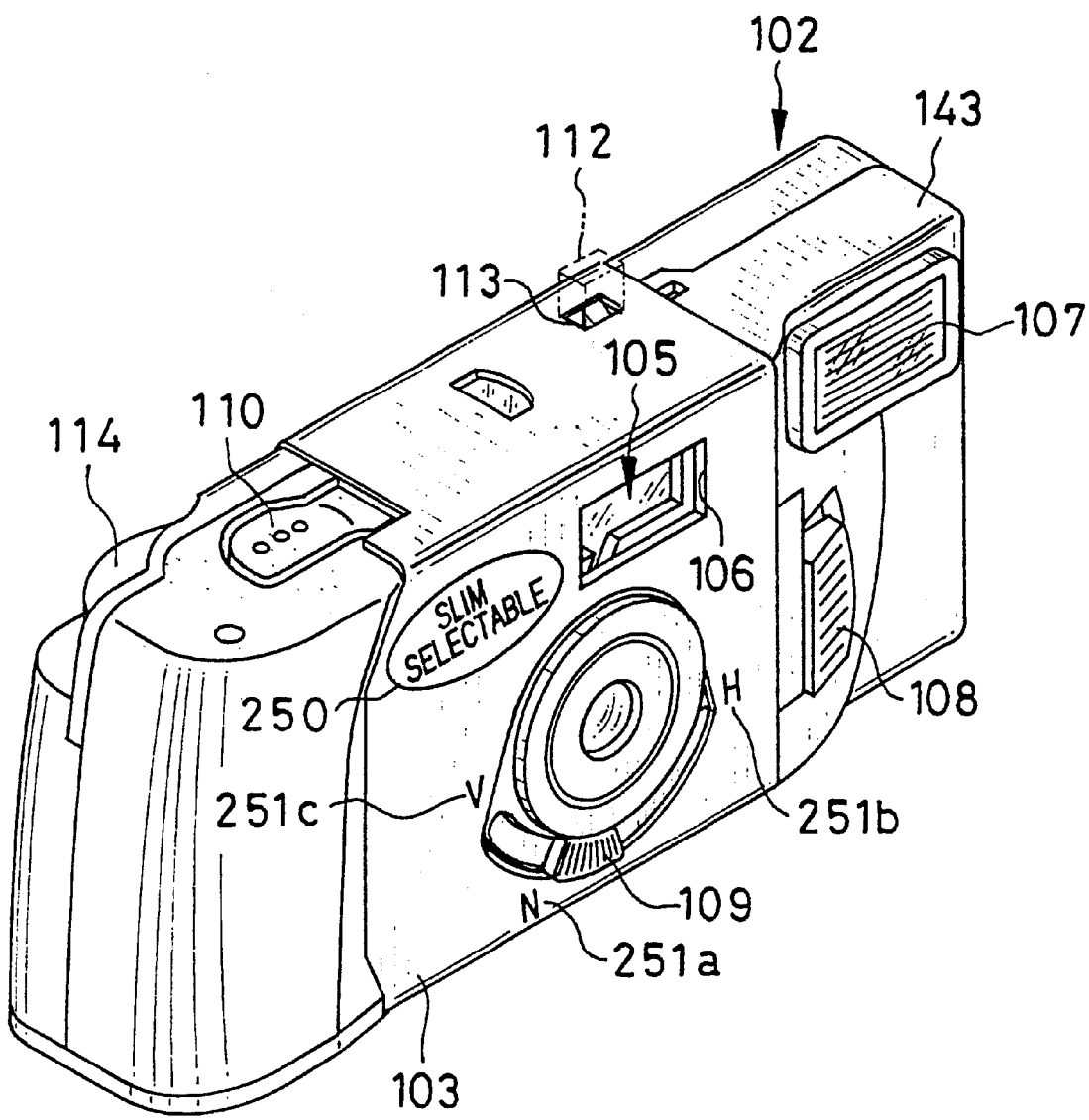
FIG. 27 is a perspective illustrating a preferred lens-fitted photo film unit of a slim selectable type.

In FIG. 27, a printed caption 250 of SLIM SELECTABLE is printed on the label 103. There are signs 251a, 251b and 251c of N (Normal or Standard), H (Horizontally slimming), and V (Vertically slimming), printed on the label 103, for indicating set positions of the operation button 109.

The operation button 109 is slid and set in any of a standard position, an H-slim position and a V-slim position, respectively indicated by the signs 251a–251c, to designate one of a standard mode, an H-slim mode and a V-slim mode. In the H-slim mode, an H-slimmed print is produced, in which a printing magnification is greater in a direction parallel with a shorter side of the imaging frame 130 than in that parallel with its longer side. In the V-slim mode, an V-slimmed print is produced, in which a printing magnification is greater in a direction parallel with a longer side of the imaging frame 130 than in that parallel with its shorter side.

There is a rotatable plate (not shown) incorporated in the front cover 143. The rotatable plate is similar to the view selector plate of the previous embodiment, but does not have the finder frames. The optical indicia (hereinafter referred to as slim indicia) imprinted to the optical indicia area 137 is changed by the rotatable disk in association with the operation button 109. The visual field of the viewfinder 105 is the fixed standard visual field.

Figure 30A:
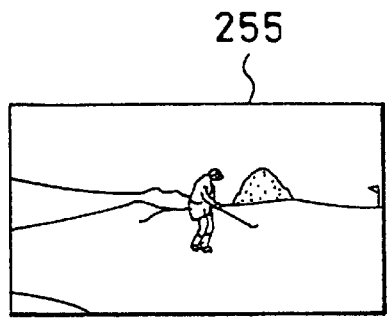
FIG. 30A is an explanatory view illustrating an image in the viewfinder according to the H-slim mode.
Figure 30B:
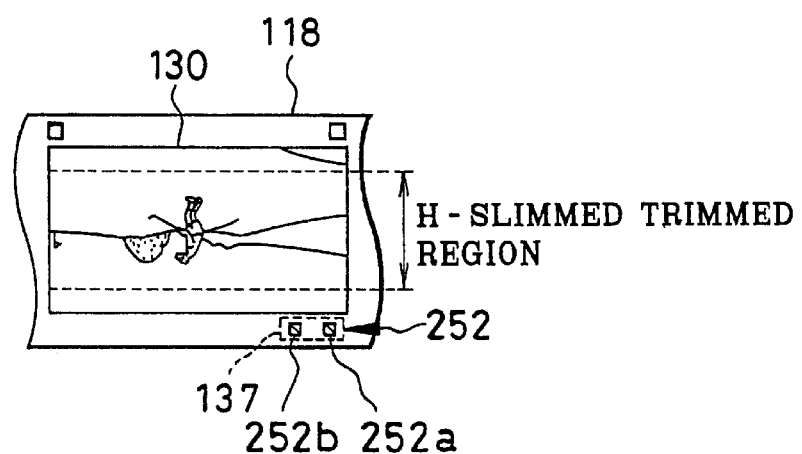
FIG. 30B is an explanatory view illustrating the image in an imaging frame.

For an H-slimmed print, a slim indica 252 is predetermined as first and second dots 252a and 252b as illustrated in FIG. 30B. For a V-slimmed print, the slim indica 252 is predetermined as only the first dot 252a as illustrated in FIG. 31B. For a standard print, the slim indica 252 is predetermined as zero (0) dot. Thus the form of the slim indica 252 to be imprinted by the optical indicia area 137 is changeable according to setting of the operation button 109. Note that the slim indica 252 has the same shape as the magnification indica and the PAR indica, and only has a meaning different from them.

The photo film 118 has the PLD track 132 to which the slim type data is prerecorded magnetically. The slim type data is information of the photo film designated for producing prints according to the slimming printing conditions. Those printing conditions are to produce a standard print, an H-slimmed print and a V-slimmed print by printing magnifications of the above modes according to the forms of the slim indica 252 imprinted in the optical indicia area 137 for each imaging frames.

The printer for use with the photo film 118 is the same as that in the above embodiment. The printer is provided with a modified or additional program in such a manner that, when the slim selectable type data is detected, the standard print, the H-slimmed print and the V-slimmed print are selectively produced.

Figure 28:
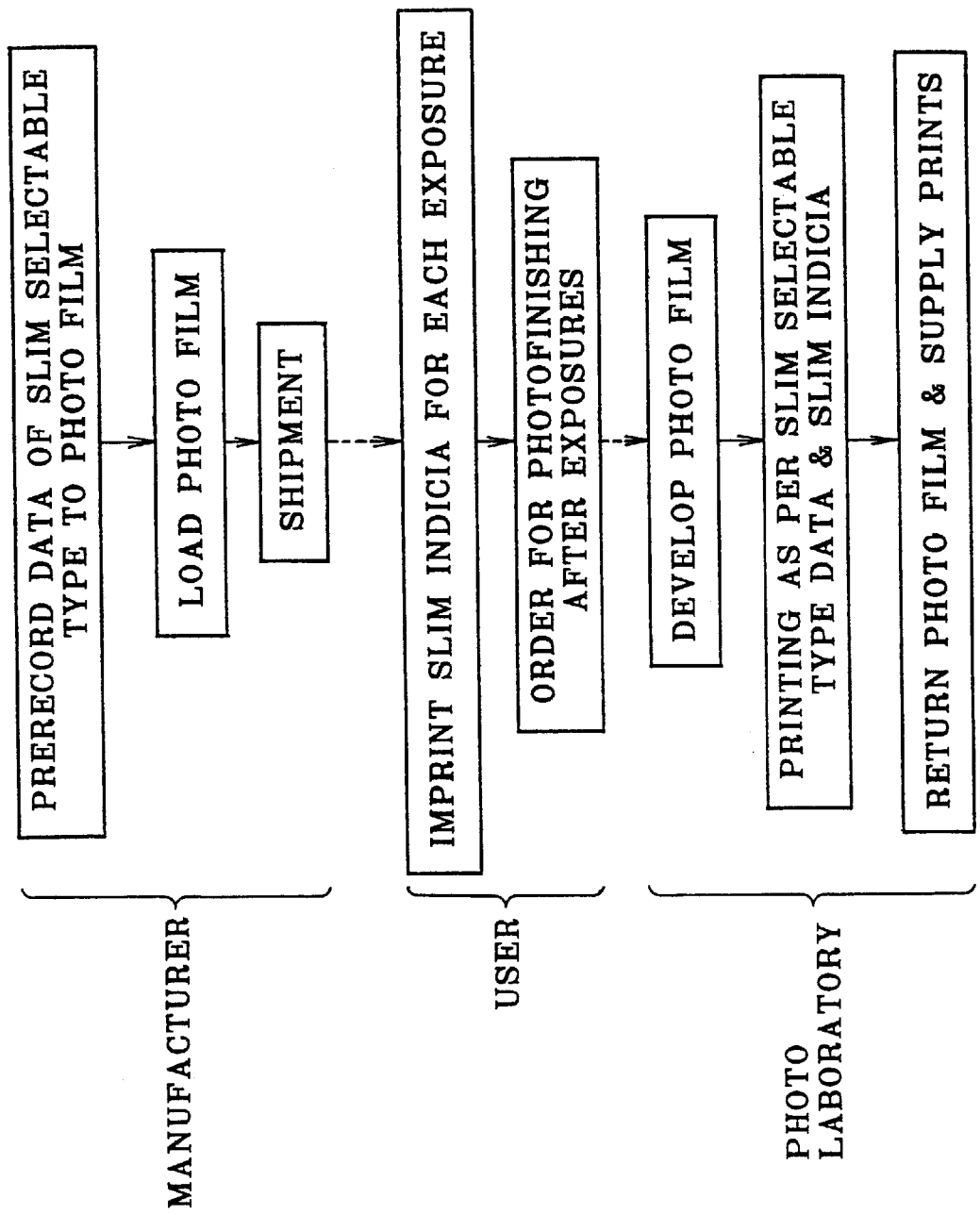
FIG. 28 is a flow chart illustrating a process of a system in which the lens-fitted photo film unit is used.
Figure 29:
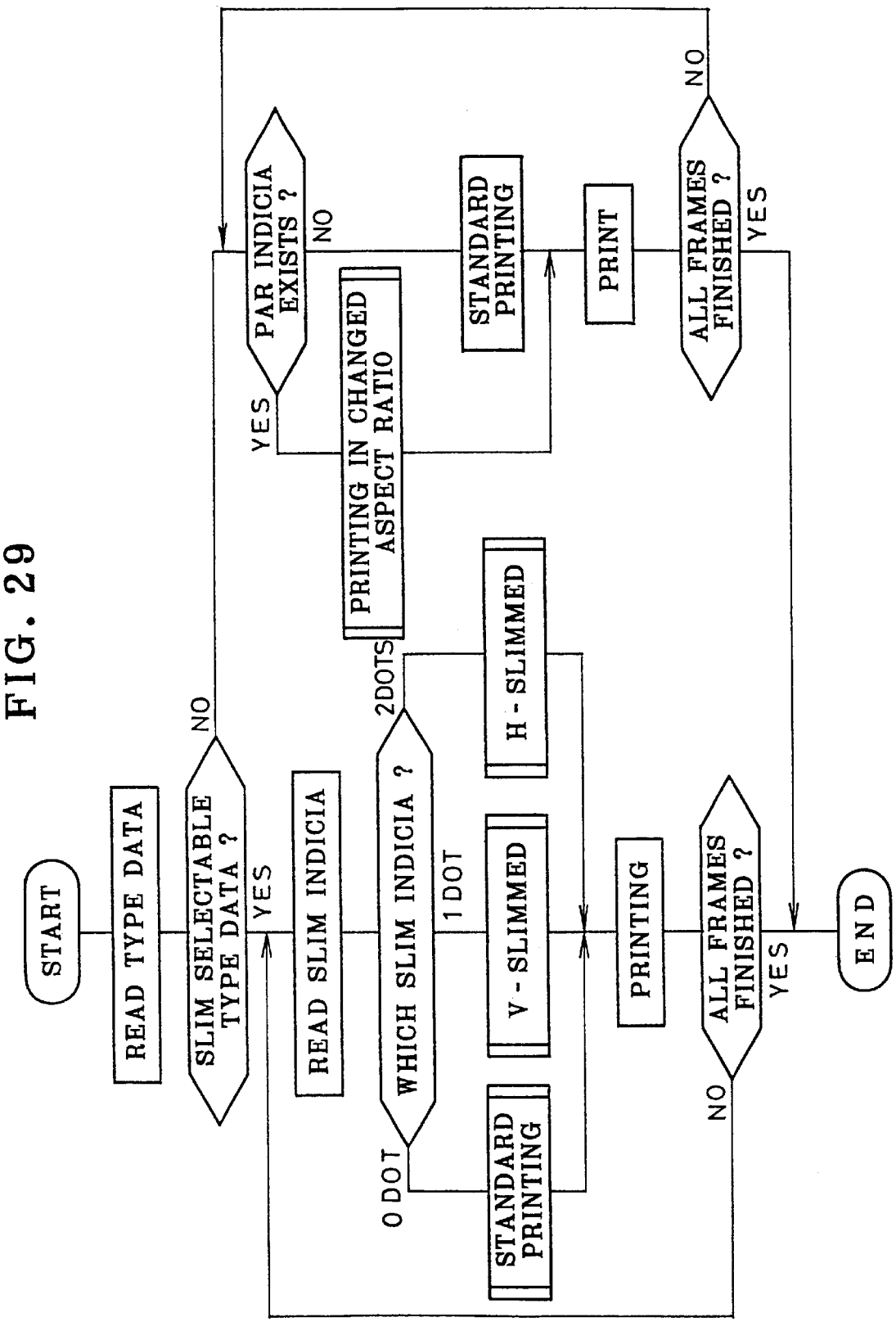
FIG. 29 is a flow chart illustrating an operation of the digital printer.

The operation of the above embodiment is described now with reference to FIGS. 28 and 29. The photo film 118 to be inserted in the lens-fitted photo film unit of the slim selectable type is previously subjected to magnetic recording, to prerecord the slim selectable type data to the PLD track 132. The photo film 118 with the cassette 119 is loaded in the main body 140.

Figure 30C:
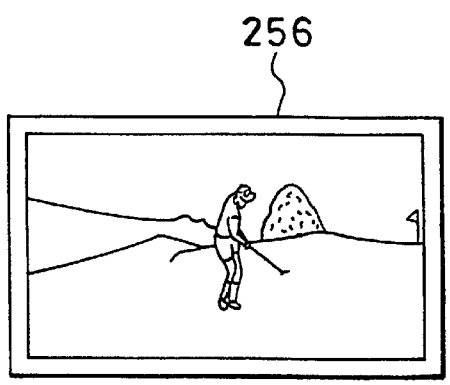
FIG. 30C is an explanatory view illustrating the image in a photographic print.

In FIG. 30A, a standard visual field 255 being a rectangular quadrilateral in the viewfinder 105 is oriented to extend horizontally. A standing person is targeted. The operation button 109 is set in the H-slim position while an exposure is taken. The person image is extended vertically or in the standing direction, in other words the person image is compressed in the horizontal direction perpendicular to the standing direction, so that the person image is printed more slimly than the person is. In FIG. 30B, the person image observed in the viewfinder 105 is exposed in the imaging frame 130. The slim indica 252 having two dots is created in the optical indicia area 137. The digital printer is used for printing this imaging frame. At first the magnetic head 204 in the digital printer detects the slim selectable type data from the PLD track 132. The imaging frame is handled in the H-slimmed printing according to the slim selectable type data and the two dots of the slim indica 252. A horizontally trimmed region is trimmed from the imaging frame 130. Let a first printing magnification be determined in a direction parallel with the shorter sides of the imaging frame 130. Let a second printing magnification be determined in a direction parallel with the longer sides of the imaging frame 130. A ratio of the first printing magnification to the second printing magnification is 1:0.95. As a result a horizontal slimmed photographic print 256 of FIG. 30C is obtained in which the person image is printed longer than it is in the shorter-side direction of the imaging frame.

Figure 31A:
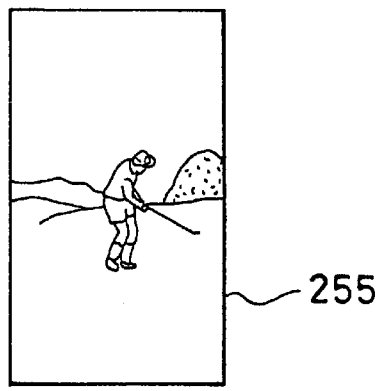
FIG. 31A is an explanatory view illustrating an image in the viewfinder according to the V-slim mode.
Figure 31B:
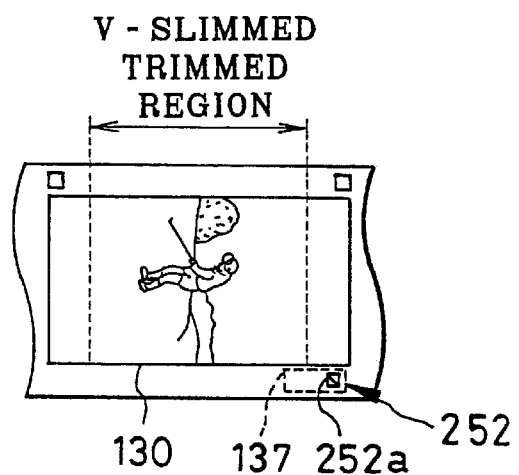
FIG. 31B is an explanatory view illustrating the image in an imaging frame.
Figure 31C:
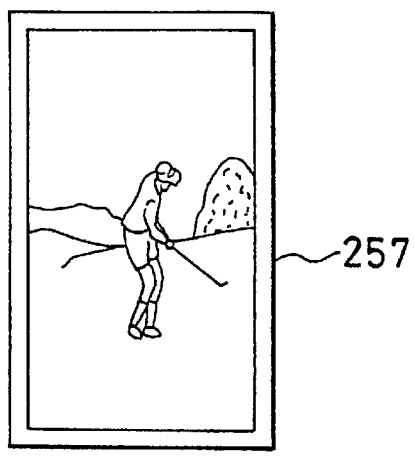
FIG. 31C is an explanatory view illustrating the image in a photographic print.

In FIG. 31A, the standard visual field 255 being a rectangular quadrilateral in the viewfinder 105 is oriented to extend vertically. A standing person is targeted. The operation button 109 is set in the V-slim position while an exposure is taken. In FIG. 31B, the person image observed in the viewfinder 105 is exposed in the imaging frame 130. The slim indica 252 having one dot is created in the optical indica area 137. For printing this imaging frame, the imaging frame is handled in the V-slim printing according to the slim selectable type data and the one dot of the slim indica 252. A vertically trimmed region is trimmed from the imaging frame 130. Let a first printing magnification be determined in a direction parallel with the shorter sides of the imaging frame 130. Let a second printing magnification be determined in a direction parallel with the longer sides of the imaging frame 130. A ratio of the first printing magnification to the second printing magnification is 0.95:1. As a result a vertical slimmed photographic print 257 of FIG. 31C is obtained in which the person image is printed longer than it is in the longer-side direction of the imaging frame.

When the operation button 109 is set in the standard position, a standard print is produced with the printing magnification set equal between the shorter-side and longer-side directions. Note that, in FIGS. 30C and 31C, the depicted slimmed images are exaggerated regarding the proportion of portions.

In the present embodiment the photographic subject observed through the viewfinder 105 is irrespective of the printing modes. But it is possible to use two lens elements, which may be disposed on the rotatable plate, for regularly altering the subject image in respectively vertical and horizontal directions. Portions to be eliminated from printing can be masked. Moreover the visual field in the view-finder 105 may be provided with additional visible indica for representing designated printing modes. In the present embodiment, portions of the exposed region of the imaging frame are not printed. Alternatively the whole of the imaging frame or the exposed region may be printed by changing the use of the photographic printer.

If it is intended to produce slimmed photographic prints of one kind from all the imaging frames, it is possible to prerecord type data of H-slim or V-slim printing to the photo film. This is similar to the above lens-fitted photo film unit having the only one fixed printing condition of high magnification for pseudo-zoom photographs.

In the above embodiments, type data of various kinds is magnetically recorded to the PLD track as photo film data. Alternatively the photo film data may be directly recorded to the PLD track magnetically. Moreover a magnetic data track other than the PLD track readable for printing may be used to store the type data. Also the type data may be optically side-printed. The photo film data may be prerecorded in a form of bar code. The manufacture lot number included in the information of the bar code may be used to represent printing conditions indirectly. The photo film data may be prerecorded magnetically to the PFSD track or the CFSD track at all of the imaging frames.

The above embodiments are telephoto selectable, fixedly 3-time telephoto and slim selectable. It is possible to ship and market two or more of those types at the same time, because any of the plural printing conditions can be discernible according to the photo film data recorded on the photo film. Various printing conditions can be predetermined, including color-tones of prints, and designated numbers of prints. For example, production of a telephoto print of the panoramic size or of the C-size may be designated. To this end, telephoto type data of a fixed tele-converting mode can be prerecorded to the photo film. The PAR indica can be imprinted into the optical indica area.

Furthermore it is possible to designate the printing conditions different between the imaging frames in accordance with the optical indica imprinted in the optical indica area. For example, a set of the optical indica may be predetermined in such a manner that production of the standard print is designated if the optical indica is zero (0) dot, production of the 2-time tele-converted print is designated if the optical indica is one dot, and production of the V-slimmed print is designated if the optical indica is two dots. Also it is possible that a first printing condition is commonly determined for the imaging frames, and that the optical indica is added for some of the imaging frames to designate a second printing condition different from the first. For example, the first printing condition may be production of a sepia-toned print. The second printing condition may be production of the 2-time or 3-time tele-converted print according to the optical indica. It is possible to obtain the 2-time and 3-time tele-converted prints, either of which is toned in the color-tone of sepia.

Note that, instead of the above-described digital printer, a photographic printer can be used in which an imaging frame on the photo film is illuminated to effect an exposure on photographic paper for obtaining a photographic print. Certainly there is a difficulty for such a photographic printer to produce slimmed prints, because a number of additional devices must be attached complexly to the printer. Consequently the digital printer is still preferable, because the printer can process image data easily, and can be set for any of various printing conditions.

The above use of the digital printer makes it easy to produce prints of a modified color-tone as desired. The image can be corrected with high precision, so that prints of high quality of images can be printed. Even an under-exposed imaging frame can be printed at a high quality because the digital printer can correct it by approximately +2 stops. It is possible to use a flash main capacitor having a reduced size, because emission of flash light at a reduced amount is allowed even to produce a high-quality print. This is effective in reducing the cost of the lens-fitted photo film unit.

In FIGS. 32–35, a lens-fitted photo film unit 262 is described, according to which a color-tone to be used for printing from imaging frames on photo film can be selectively designated from color, black-and-white and sepia. An operation button 272 is operable at the time of taking an exposure to designate one printing color-tone, and slidable in a slit 274. A label 264 or sticker has a set of printed signs of C (Color print), B/W (Black-and-white print) and S (Sepia print), which are set positions for positioning the operation button 272 along the slit 274.

Figure 33:
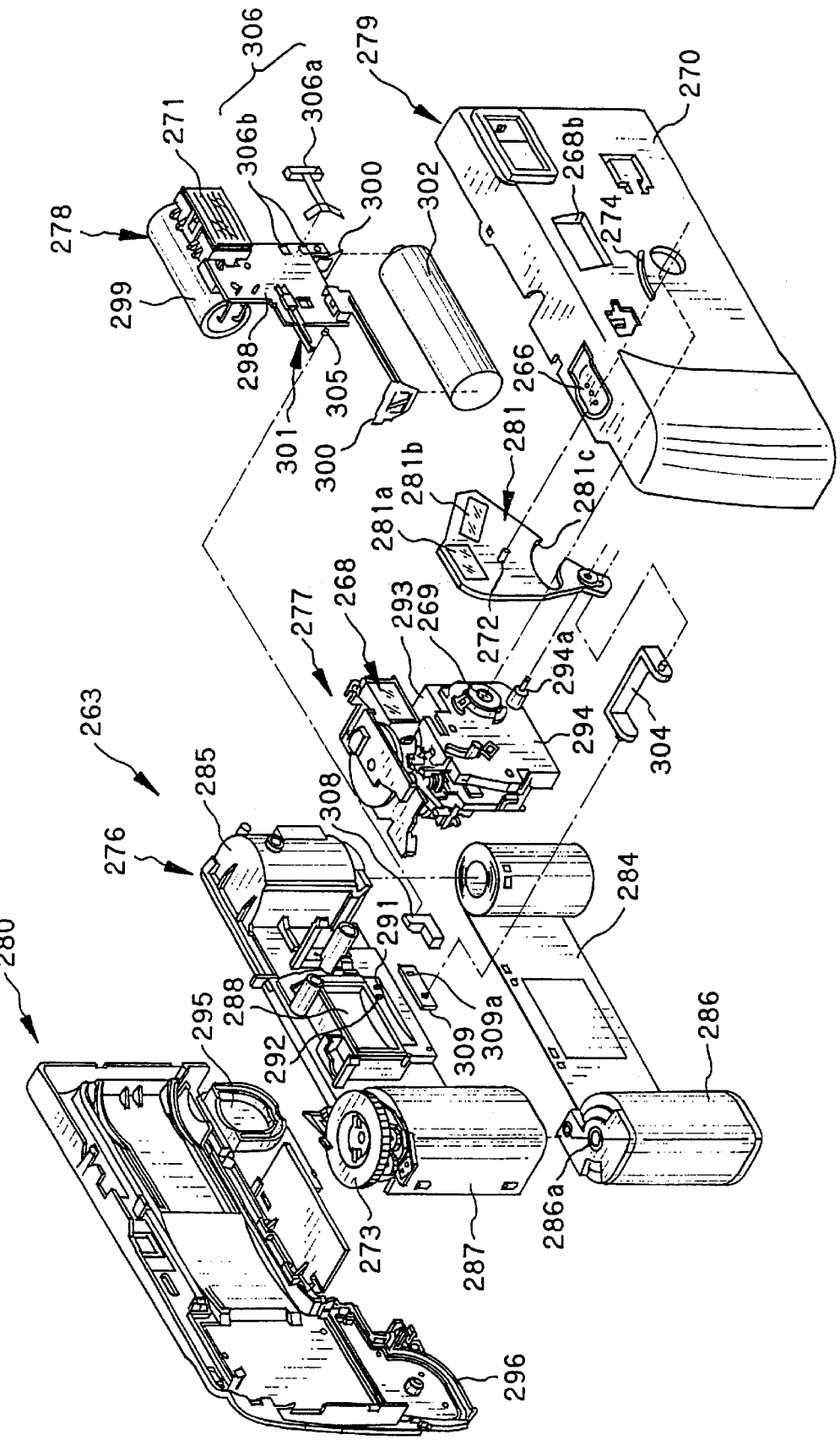
FIG. 33 is an exploded perspective illustrating the lens-fitted photo film unit.

In FIG. 33, a housing 263 is illustrated in perspective. The housing 263 is constituted by a main body 276, an exposure unit 277, an electronic flash unit 278, a front cover 279, a rear cover 280, a view selector plate 281 and a color-tone indica exposing device. The view selector plate 281 is disposed between the main body 276 and the front cover 279. The color-tone indica exposing device is shifted with the view selector plate 281, and imprints color-tone indica to photo film 284 according to the designated one of the color-tones. The view selector plate 281 is supported in a rotatable manner on a support shaft 294a, which is disposed on a lens holder 294. The exposure unit 277 is mounted on the front of the light-shielded tunnel.

A viewfinder 268 has a visual field, which is colored by the view selector plate 281 for the purpose of causing a user to observe a field of view in the toned color associated with the designated color-tone. The view selector plate 281 has two openings arranged on an arc defined about its rotational center. A sepia filter 281a and a black-and-white filter 281b are fitted in the respective openings. A recess 281c is formed in the view selector plate 281 in an arc shape, and keeps a taking lens 269 uncovered externally. The operation button 272 is formed integrally with the front of the view selector plate 281.

When the operation button 272 is in the C position, the view selector plate 281 is away from an objective lens 268a. The visual field of the viewfinder 268 is not colored. When the operation button 272 is in the S position, the sepia filter 281a is placed in front of the objective lens 268a to color the region of the viewfinder 268 in the sepia color. When the operation button 272 is in the B/W position, the black-and-white filter 281b is placed in front of the view-finder 268 to color the region of the viewfinder 268 in a predetermined color. As is not shown, the view selector plate 281 has a click mechanism for precisely setting in the C, B/W and S positions.

Of course no filter exists which could cause a user to observe a photographic subject in a black-and-white state in the viewfinder 268. The black-and-white filter 281b, in spite of its terminology, is a blue filter or a filter of any suitable single color. It is also possible to use the filters 281a and 281b with toned colors different from those described herein for the purpose of causing a user to recognize each designated color-tone. Also letters or indicia may be used to appear in the visual field in the viewfinder 268 to indicate the designated color-tone.

A link lever 304 is connected between bottoms of an indica selector plate 309 and the view selector plate 281, and causes the indica selector plate 309 to slide horizontally when the view selector plate 281 is rotated by operation of the operation button 272. A selector opening 309a is moved relative to openings 291 and 292 to select a manner of imprinting a 2-bit optical indica.

When the operation button 272 is set in the C position, the selector opening 309a of the indica selector plate 309 is located between the openings 291 and 292. Portions of the indica selector plate 309 beside the selector opening 309a block the openings 291 and 292. When the operation button 272 is set in the B/W position, the selector opening 309a is located at the opening 292. An end of the indica selector plate 309 retreats from the opening 291. Thus both the openings 291 and 292 are open. When the operation button 272 is set in the S position, the selector opening 309a retreats from the openings 291 and 292. An end of the indica selector plate 309 blocks only the opening 292. Then only the opening 291 is open.

Figure 34:
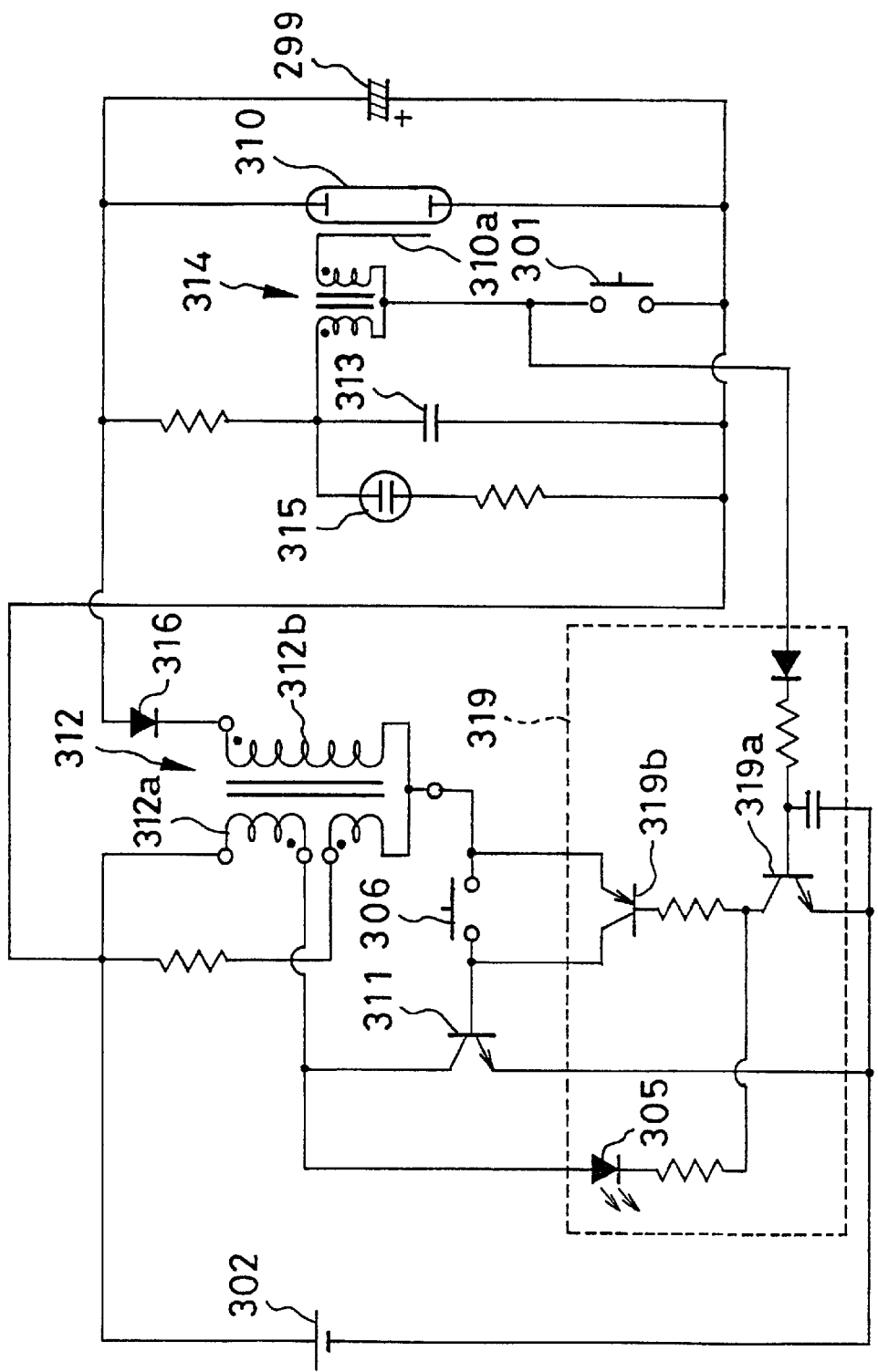
FIG. 34 is a block diagram schematically illustrating a flash circuit and a color-tone indicia exposing circuit.

In FIG. 34, the flash circuit includes a flash discharge tube 310, an oscillation transistor 311, an oscillation transformer 312, a trigger capacitor 313, a trigger transformer 314, a neon tube 315 and the like. The oscillation transformer 312 generates high voltage in a secondary winding 312b according to a ratio of the number of turns between the secondary winding 312b and a primary winding 312a. In a rectifier diode 316, a charging current of this high voltage flows. A trigger electrode 310a is used to application of a trigger voltage to the flash discharge tube 310. A first transistor 319a is turned on when a synchro switch 301 is turned on. A second transistor 319b is turned on when the first transistor 319a is turned on.

Figure 35A:
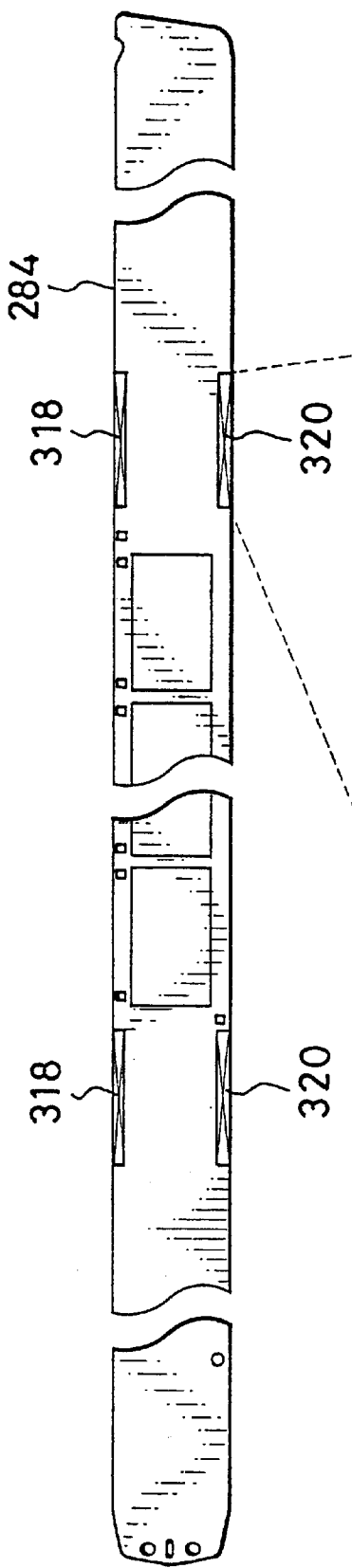
FIG. 35A is an explanatory view illustrating photo film for the lens-fitted photo film unit with a bar code.
Figure 35B:
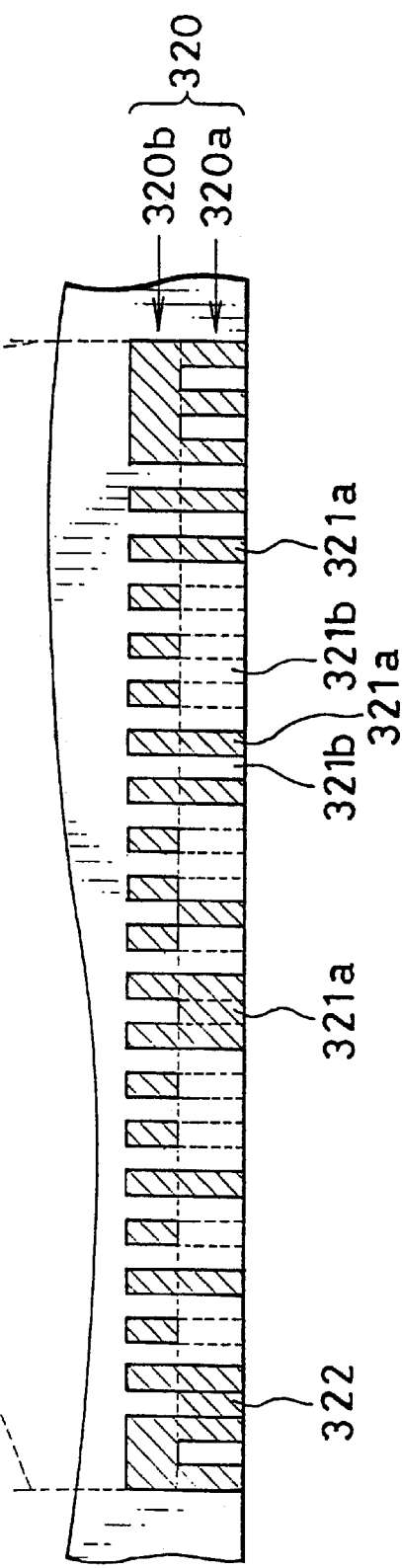
FIG. 35B is an explanatory view illustrating the bar code recorded on the photo film.

The photo film 284 used in the lens-fitted photo film unit 262 has color-tone photo film data, prerecorded thereon, for representing information of the photo film of which a color-tone is designated. In FIG. 35A, a bar code 320 is optically prerecorded in edge portions of the photo film 284 extending in the longitudinal direction. In FIG. 35B, an example of the bar code 320 is illustrated in enlargement. The bar code 320 is constituted of a data track 320a and a clock track 320b, which is used for synchronization in reading of the data track 320a. In FIG. 35A, a reference numeral 318 designates a train of letters, numbers or signs representing information of the FID code. After the development, an operator of photofinishing can read the sign train 318 visually.

The data track 320a is constituted by black bits 321a and white bits 321b which have a respective width in a direction of a length of the photo film 284. A pattern of arranging the black bits 321a and the white bits 321b represents an "FID code". The FID code is information including an ID number provided for each strip of the photo film and the number of available frames. The FID code of the photo film 284 used for the lens-fitted photo film unit 262 includes color-tone photo film data. A bit 322, which is conventionally unused in the data track 320a, is determined as a black bit in order that the information of the FID code also includes the color-tone photo film data. The color-tone photo film data in the FID code makes it possible to discern whether or not the dot or dots imprinted outside the imaging frame is the color-tone indica.

Note that the color-tone photo film data may be included in the FID data in such a manner that the photo film is detected the color-tone selectable type if the ID number of the photo film 284 is within a predetermined number range, or if a combination of some digits of the ID number is included in predetermined combinations. Moreover the color-tone photo film data may be recorded to a portion other than the FID code. A format of FID code may be newly defined.

The photo film 284 used in the lens-fitted photo film unit 262 is the IX 240 type, or the type according to the Advanced Photo System. The photo film 284 has a magnetic layer, disposed on the side of the back surface, for storing magnetic data of various kinds in magnetic tracks. It is possible to prerecord the color-tone photo film data as magnetic information. Note that the terms of the black bits 321a and the white bits 321b mean bits of low density and high density which are detectable by use of a photo sensor of a transmission type, and does not necessary mean the bits of properly determined black and white colors.

Figure 32:
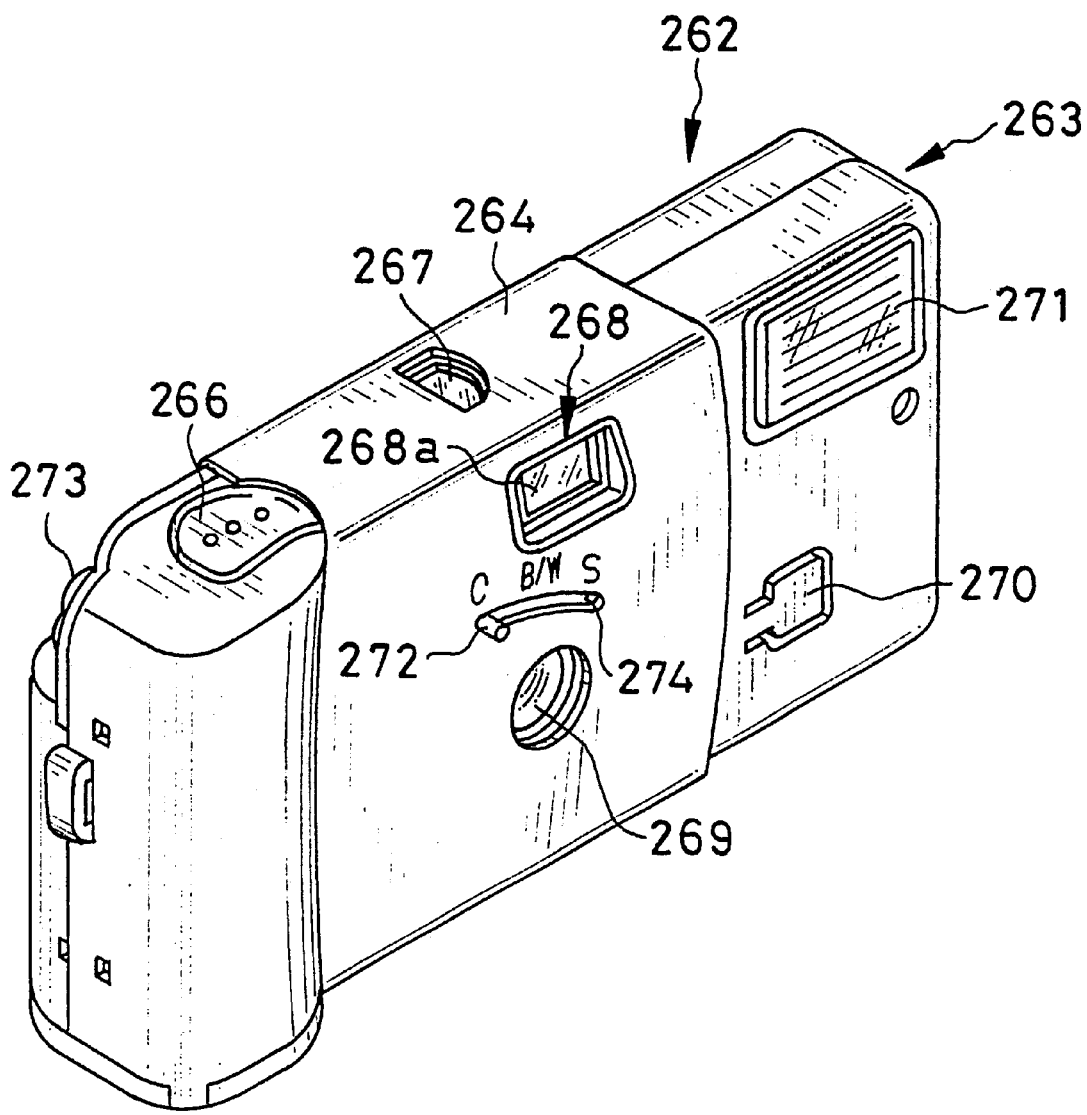
FIG. 32 is an explanatory view illustrating still another preferred type of lens-fitted photo film unit in which a printing color-tone is selectable.

In FIG. 32, a reference numeral 267 designates a counter window. There are a charger pushbutton 270 and a flash emitter 271 disposed on the front face of the housing 263. A winder wheel 273 appears in the rear. In FIG. 33, a roll holder chamber 285 contains a photo film roll formed by winding the photo film 284. A cassette holder chamber 287 contains a cassette 286 for winding the photo film 284 being exposed. An exposure aperture 288 defines a size of an imaging frame or exposure range on the emulsion surface of the photo film 284. A spool 286a has an end engaged with a shaft, which is formed integrally with the bottom of the winder wheel 273. A base portion 293 constitutes the exposure unit 277, and holds the shutter mechanism, the photo film one-frame advance mechanism, the viewfinder 268 and the like. Bottom lids 295 and 296 close bottoms of the roll holder chamber 285 and the cassette holder chamber 287 in a light-tight manner. The flash unit 278 includes a printed circuit board 298, a main capacitor 299, a pair of metal segments 300 and a dry battery 302. A charger switch 306 is constituted by a contact segment 306a, and is turned on when the contact segment 306a contacts a pair of contact points 306b.

Figure 36:
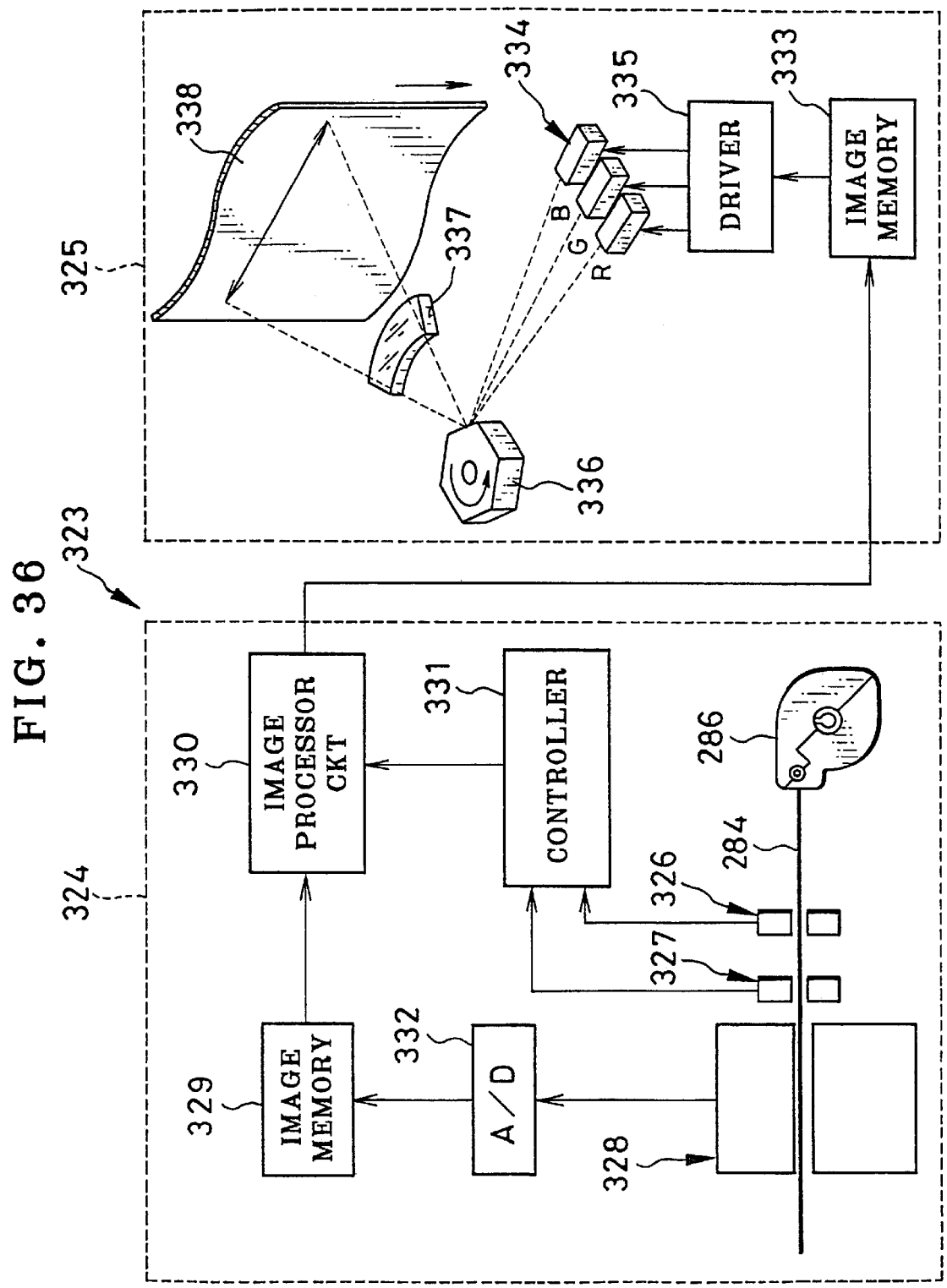
FIG. 36 is a block diagram schematically illustrating a digital printer.

In FIG. 36, the cassette 286 is set in a digital printer 323. A conveyor mechanism advances the photo film 284 to the outside of the cassette 286, and conveys the photo film 284 to photo sensors 326 and 327 and then to a scanner 328. During the conveyance, the photo sensor 326 optically reads the FID code from the data track 320a of the bar code 320. Note that the FID code is read each time that one strip of the photo film is conveyed. The photo sensor 327 reads the color-tone indica from each frame. A reference numeral 324 designates an input component of the digital printer 323. An output component 325 includes a polygon mirror 336 and an Fθ lens 337.

The operation of the above construction is described now. In FIG. 37, the photo film 284 for use in the lens-fitted photo film unit 262, when manufactured, is provided with the FID code in the form of the bar code 320 as latent image, the FID code including the color-tone photo film data.

The photo film 284 with which the bar code 320 is recorded is inserted into the housing 263 with the cassette 286. The label 264 is attached to the housing 263 to obtain the lens-fitted photo film unit 262, which is shipped, and supplied to a user.

When the operation button 272 is operated, the view selector plate 281 is rotated. The visual field of the view finder 268 is colored in a manner associated with the designated color-tone. Rotation of the view selector plate 281 causes the link lever 304 to slide the indica selector plate 309 to a position determined for the designated color-tone.

A user observes a subject to be photographed, and depresses a shutter release button 266. An imprinter LED 305 is caused to emit light by the operation the same as that of the circuits of FIG. 14 in a manner irrespective of emission of flash light. The light, emitted by the imprinter LED 305 while the synchro switch 301 is turned on, is directed toward the openings 291 and 292 through an imprinter light guide member 308.

If the operation button 272 is set in the B/W position in taking an exposure, dots 340a and 340b as color-tone indica are imprinted under the imaging frame on the photo film 284. See FIG. 38A. If the operation button 272 is set in the S position in taking an exposure, only the dot 340a as color-tone indica is imprinted under the imaging frame on the photo film 284. See FIG. 38B. If the operation button 272 is set in the C position in taking an exposure, no dot is imprinted, in other words the color-tone indica consists of zero (0) dot. See FIG. 38C.

The photo film 284 with the cassette 286 is set in a photo film processor, and subjected to a color development process. After this the photo film 284 is contained in the cassette 286 again and set in the digital printer 323. In FIG. 39, steps of the operation of the digital printer 323 are illustrated. During the conveyance of the photo film 284, the photo sensor 326 reads the FID code from the data track 320a in the leader of the photo film 284. The FID code is decoded by a controller 331. The controller 331 evaluates it as to whether its information includes the color-tone photo film data.

After reading the FID code, the first imaging frame is set on the photo film carrier in the scanner 328. Before the setting of the first imaging frame, the color-tone indica of the imaging frame is read by the photo sensor 327, and stored in the controller 331. Upon the setting of the first imaging frame, the CCD is operated to read the color image of the imaging frame. Three-color image data is written to an image memory 329 in cooperation with an A/D converter 332.

Figure 38A:
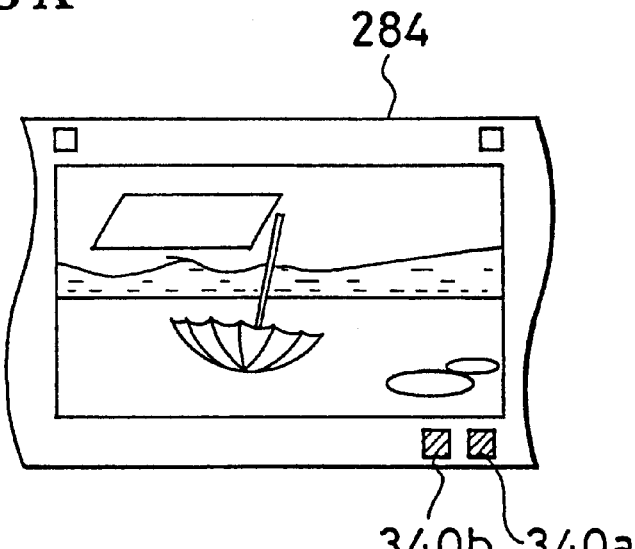
FIG. 38A is an explanatory view illustrating an imaging frame exposed on the photo film with a first color-tone indicia.

If the dots 340a and 340b are detected as color-tone indica of the first imaging frame as illustrated in FIG. 38A, the controller 331 sends an image processor circuit 330 a command for converting the color image of the imaging frame into a black-and-white image. According to the command, the image processor circuit 330 converts the color image into the black-and-white color-tone by use of the image data of the respective colors, and outputs three-color processed image data for the black-and-white image. The three-color processed image data is written to an image memory 333 of the output component 325.

A laser unit 334 is driven by a driver 335 according to the processed image data of the image memory 333. The first imaging frame is exposed on color photographic paper 338.

Figure 38B:
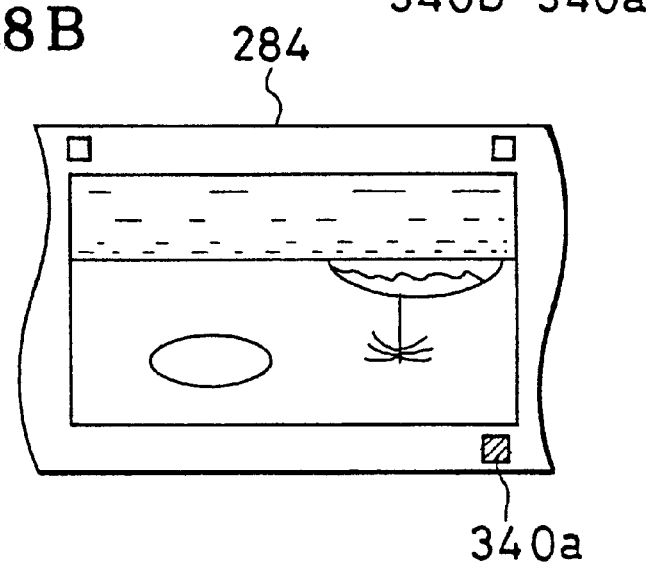
FIG. 38B is an explanatory view illustrating an imaging frame with a second color-tone indicia.
Figure 38C:
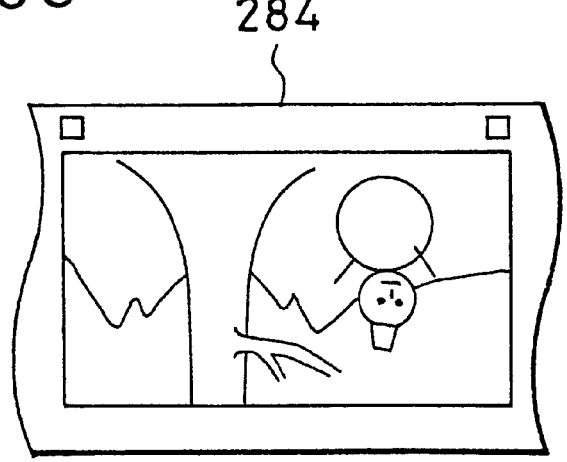
FIG. 38C is an explanatory view illustrating an imaging frame with a third color-tone indicia.

If only the dot 340a is detected as color-tone indica as illustrated in FIG. 38B, the controller 331 sends the image processor circuit 330 a command for converting the color image of the imaging frame into a sepia image. According to the command, the image processor circuit 330 converts the color image into the sepia color-tone by use of the image data of the respective colors, and outputs three-color processed image data for the sepia image. The three-color processed image data is written to the image memory 333. The laser unit 334 is driven according to the processed image data. The sepia image is recorded to the color photographic paper 338.

If no dot is detected recorded, then the controller 331 instructs the image processor circuit 330 to output the color image according to the color image of the imaging frame. The image processor circuit 330 does not treat the color image for processing of toning or black-and-white conversion, but processes the color image by ordinary steps including color correction and negative/positive inversion. Thus the image processor circuit 330 obtains the processed image data, and writes it to the image memory 333. According to the processed image data, the laser unit 334 is driven to record a color image to the color photographic paper 338 optically.

Figure 40A:
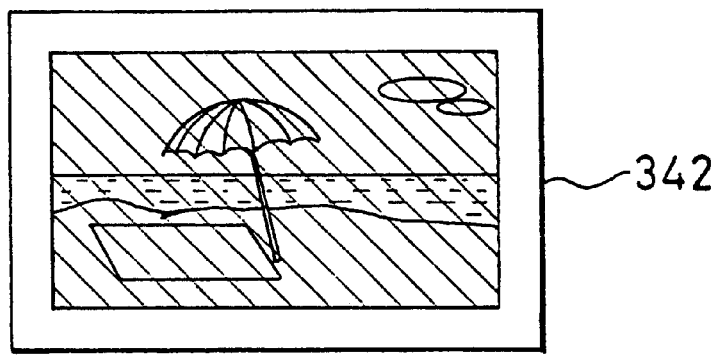
FIG. 40A is an explanatory view illustrating a black-and-white photographic print.
Figure 40B:
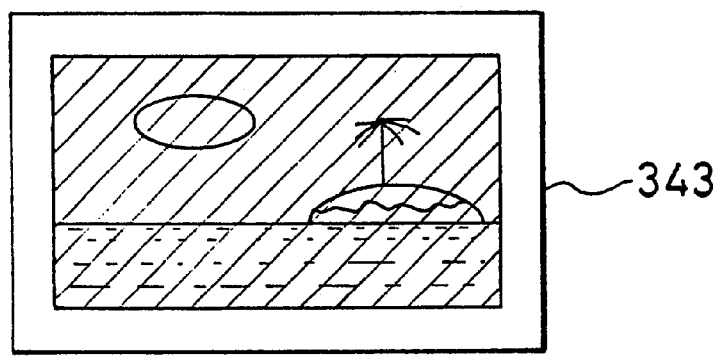
FIG. 40B is an explanatory view illustrating a sepia photographic print.
Figure 40C:
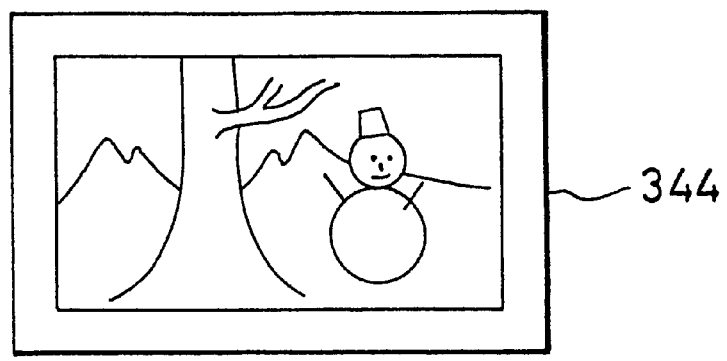
FIG. 40C is an explanatory view illustrating a color photographic print.

As a result, a black-and-white photographic print 342 of FIG. 40A is obtained from an imaging frame exposed while the operation button 272 is set in the B/W position. A sepia photographic print 343 of FIG. 40B is obtained from an imaging frame exposed with the operation button 272 set in the S position. A color photographic print 344 of FIG. 40C is obtained from an imaging frame exposed with the operation button 272 set in the C position.

If the FID code does not include the color-tone photo film data and if a dot or dots are detected by the photo sensor 327, then the dot or dots are printing region indica. According to the number of the dot or dots, the printing region or aspect ratio of the image is changed to produce a color print. If there is no dot, a color print of the standard size is produced. Note that, if the photo film in use is black-and-white monochromatic film, only black-and-white print is produced.

Prints as obtained are supplied to the user with the photo film 284. As the color images are exposed in the photo film 284, the user is enabled to request extra prints of the same imaging frames but in color-tones different from the initially obtained prints, if he or she desires it.

In the present embodiment the sepia print is monochromatically sepia if the color image is converted into the sepia image. However it is possible by use of the digital printer to produce a sepialike color print, which is a color print but slightly toned in sepia.

In the above embodiment, the prints are produced after designating one of three color-tones, which are color, black-and-white and sepia. However other color-tones may be included in the predetermined set. For example, a combination of blue and sepia, a combination of black-and-white, blue and sepia, a combination of color, black-and-white and sepia and the like may be used. It is further possible that color-tone photo film data includes information of each combination of color-tones, and that one color-tone is designated according to a combination of the color-tone photo film data and the color-tone indica.

Furthermore the lens-fitted photo film unit may be constructed specially for black-and-white prints or sepia prints. For this purpose, the color-tone photo film data and color-tone indica are optically prerecorded to the photo film. The lens-fitted photo film unit is loaded with the photo film, and does not have a mechanism for designating the color-tones. Of course color negative photo film may be used for such a type of the lens-fitted photo film unit. Thus color prints may be produced additionally or selectively. Moreover the lens-fitted photo film unit may be loaded with black-and-white photo film. This is preferred if only monochromatic prints are intended, either black-and-white or in a certain one of color-tones.

The above-described use of the digital printer is effective in producing prints, because images can be easily processed for changing the color-tone or others. It is possible to use the color-tone indica as optical indica for designating one type of image processing, such as posterization, soft focussing and the like, and for designating an auxiliary image to be combined in the periphery of the principal image of the subject. Furthermore it is possible selectively to prerecord color-tone photo film data for designating one color-tone, photo film data for designating a type of image processing, and photo film data for designating one kind of auxiliary image to be combined, any of the data being prerecorded on the photo film. This makes it unnecessary to change the mechanical construction of the lens-fitted photo film unit.

In the above embodiment, prints are produced from the photo film exposed in the lens-fitted photo film unit. Further a compact camera or a single-lens reflex (SLR) camera may be used, may be loaded with photo film to which the photo film data is prerecorded. A color-tone indica is recorded to the photo film by each of the imaging frames. Thus it is possible to produce prints of which the color-tone is changed. For such operation, the camera itself may record the photo film data such as color-tone photo film data.

Figure 41:
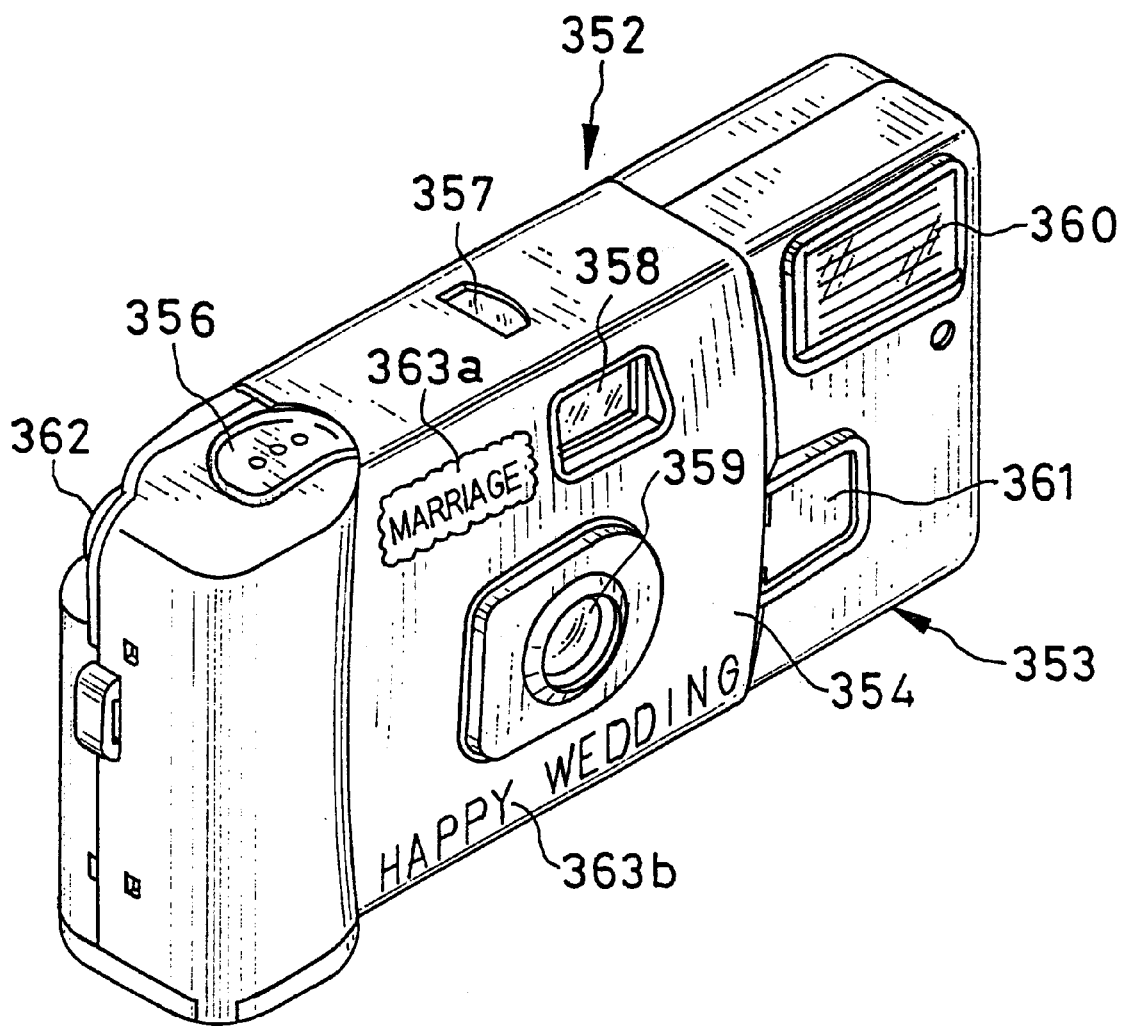
FIG. 41 is a perspective illustrating the lens-fitted photo film unit in which an auxiliary image is combined with a subject image to produce a photographic print.
Figure 42:
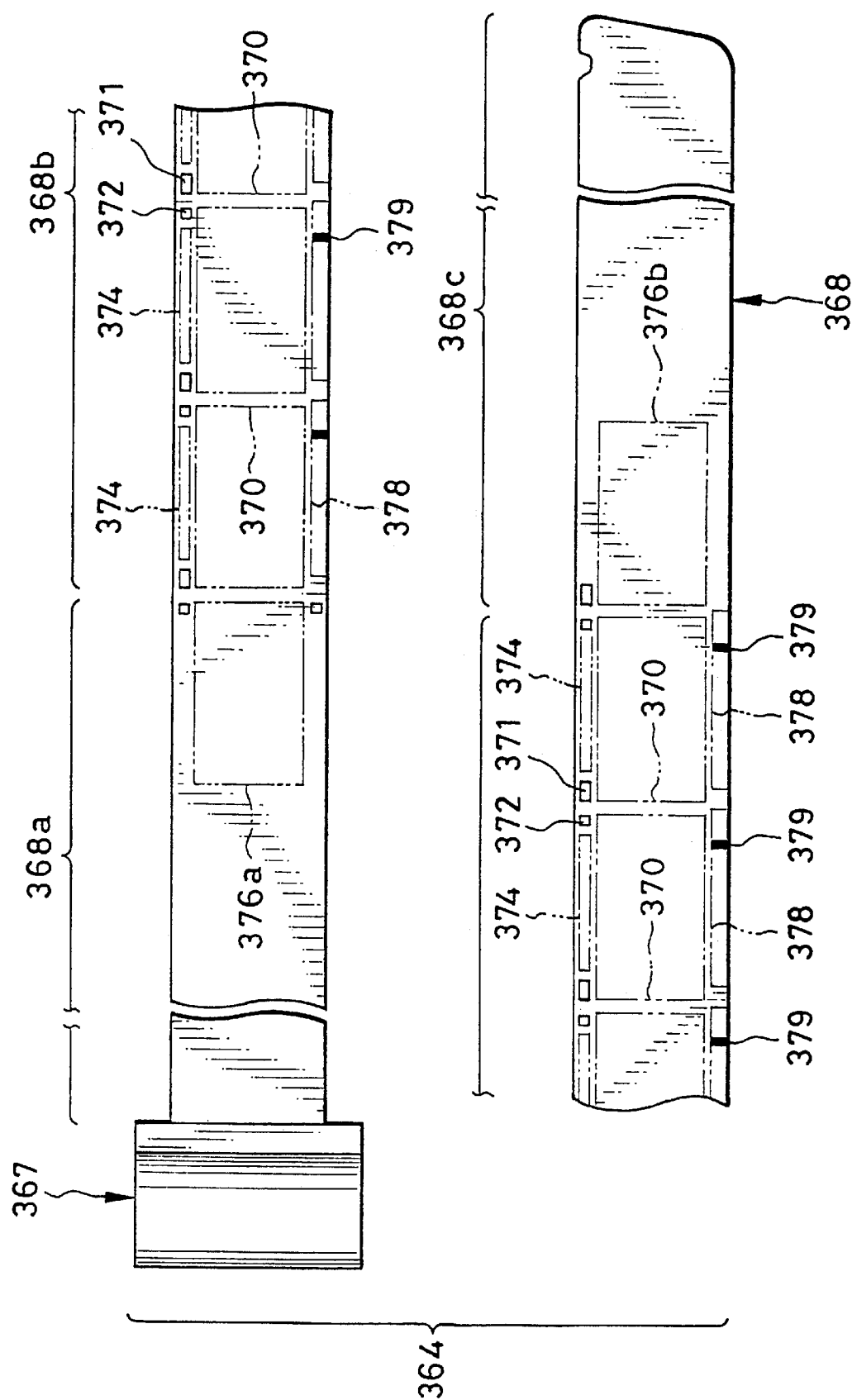
FIG. 42 is an explanatory view illustrating a photo film cassette to be used in the lens-fitted photo film unit.
Figure 43:
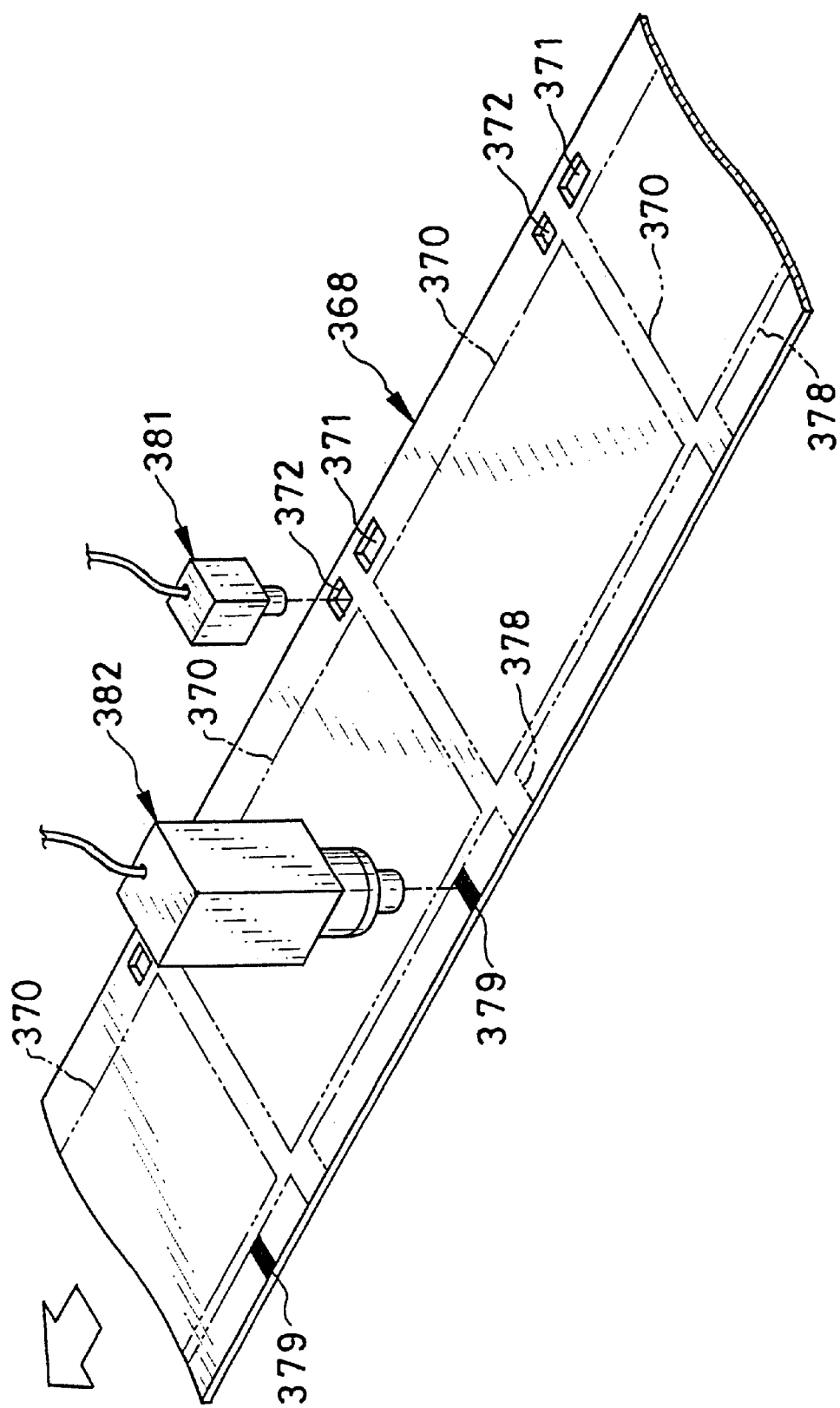
FIG. 43 is a perspective illustrating a device for recording an auxiliary image indicia to the photo film.

Now referring to FIGS. 41–43, another preferred lens-fitted photo film unit is described, which is adapted to produce a photographic print in which a subject image is combined with an auxiliary image. In FIG. 41, a lens-fitted photo film unit 352 is constituted of a housing 353 and a label 354. The housing 353 is pre-loaded with photo film, and incorporates a mechanism for taking an exposure. The label 354 covers a portion of the housing 353. Notice and description of the lens-fitted photo film unit 352 are printed on the label 354. Also sample images 363a and 363b are printed on the front of the label 354 to illustrate auxiliary images to be combined in the image synthesis.

The lens-fitted photo film unit 352 is shipped and sold in a form packaged in a packaging bag having a moisture-proof property. A sample of the auxiliary image for the image synthesis is also printed on a surface of the packaging bag. This reliably informs a user of the lens-fitted photo film unit 352 that prints will be produced in combination with the auxiliary image. The indicated sample image on the packaging bag makes it easy for a user to choose this type of the lens-fitted photo film unit.

In FIG. 41, a reference numeral 356 designates a shutter release button. A counter window 357 indicates the number of remaining available frames. A viewfinder 358 and a taking lens 359 are disposed in the housing 353. A flash emitter 360 emits flash light toward a photographic subject. A charger pushbutton 361 causes a flash unit to store electric charge when depressed by external operation.

In FIG. 42, an exposure region 368b of photo film 368 includes a predetermined number of imaging frames 370. Two kinds of perforations 371 and 372 are alternately arranged along one edge of the photo film 368. The perforation 371 is greater than the perforation 372. The perforations 371 and 372 define starting and ending positions respectively of the imaging frames 370. As the photo film 368 is wound into a cassette 367 in the lens-fitted photo film unit 352, the perforation 371 associated with one of the imaging frames 370 is located upstream from the perforation 372 associated with the same imaging frame.

Note that the conventionally used photo film has perforations of which a size is the same as that of the smaller perforation 372. But the photo film in the lens-fitted photo film unit 352 has the perforation 371 greater than the perforation 372 for the purpose of preventing users from reloading a used main body with a new photo film. There are photo-lab frames 376a and 376b defined respectively in a trailer 368a and in a leader 368c of the photo film 368 to be used in a photo laboratory for photo film development.

An optical indica area 378 is located along an edge of the photo film 368 opposite to the perforations 371 and 372, for optical recording of encoded data of a type of an auxiliary image for the image synthesis. The encoded data to be recorded in the optical indica area 378 is an auxiliary image indica 379, which is constituted by a dot. A width of the auxiliary indica area 379 and/or its position inside the optical indica area 378 is information representing the auxiliary image type.

The auxiliary indica area 379 is recorded to the photo film 368 in the course of manufacture of a photo film cassette 364 for the lens-fitted photo film unit 352. In FIG. 43, the photo film 368 is conveyed in the arrow direction to be contained in the cassette 367. A sensor 381 and a preexposing device 382 are arranged in a station in the photo film conveying line. The sensor 381 is directed to the photo film 368 for detecting a conveyed position of the photo film 368. The preexposing device 382 preexposes the auxiliary indica area 379.

The sensor 381 is an infrared photoelectric sensor, of which an infrared beam does not expose the photo film 368. The sensor 381 detects the perforations 371 and 372. In a manufacturing line of the photo film cassette 364, a detecting signal from the sensor 381 is monitored, so as to stop conveyance of the photo film 368 in response to generation of the detecting signal. The preexposing device 382 prerecords the auxiliary indica area 379 in the predetermined position in the optical indica area 378 while the photo film 368 is stopped. Note that the auxiliary indica area 379 is illustrated as if it were visible for the purpose of conveyance, but is not visible, because the auxiliary indica area 379 as preexposed is a latent image before being developed.

Figure 44:
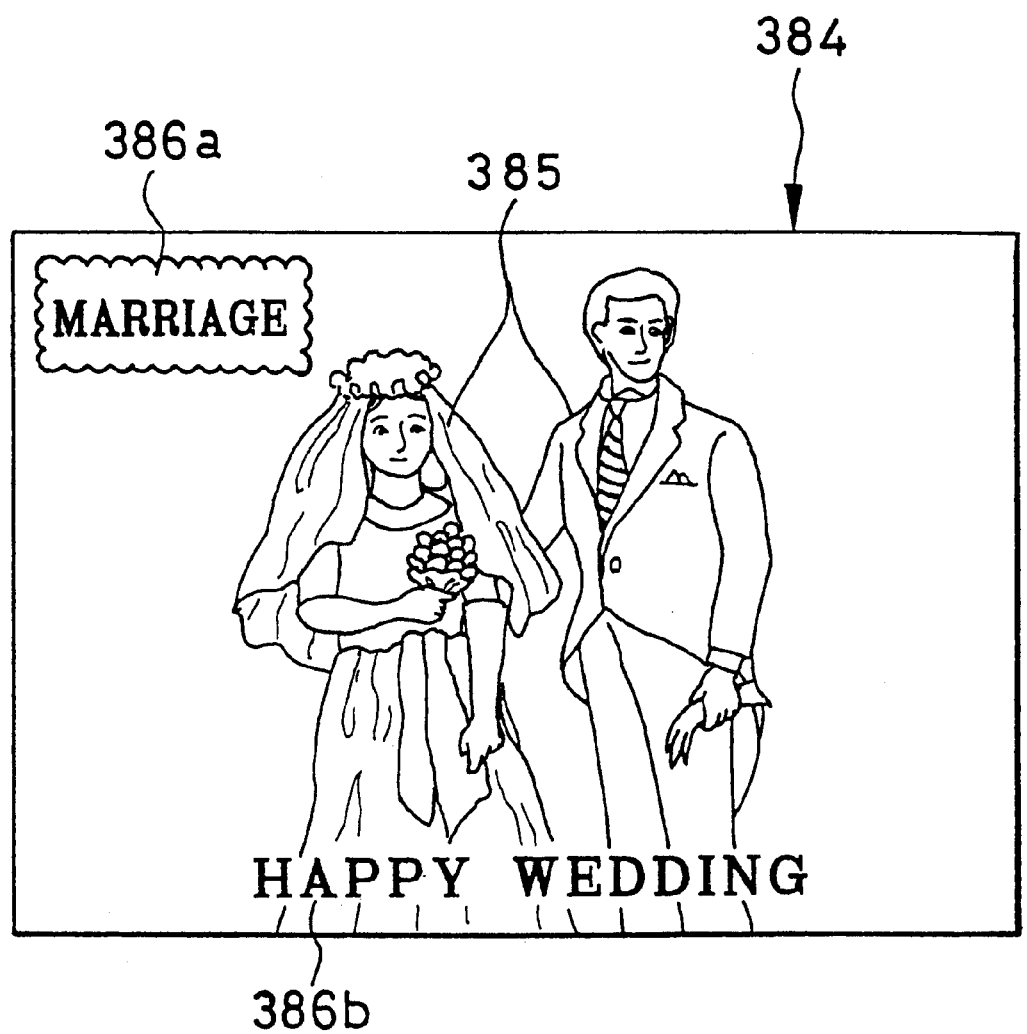
FIG. 44 is an explanatory view illustrating a photographic print obtained from the lens-fitted photo film unit.

In FIG. 44, a photographic print 384 is depicted, which is obtained by photofinishing after taking exposures on the lens-fitted photo film unit 352. In the print 384, there are a subject image 385 and auxiliary images 386a and 386b, which are the same as the sample images 363a and 363b printed on the label 354. Portions of the subject image 385 have been cut away in spaces for inserting the auxiliary images 386a and 386b, to avoid overlapping the subject image 385 on the auxiliary images 386a and 386b. Thus the print 384 is prevented from having poor appearance.

Figure 45:
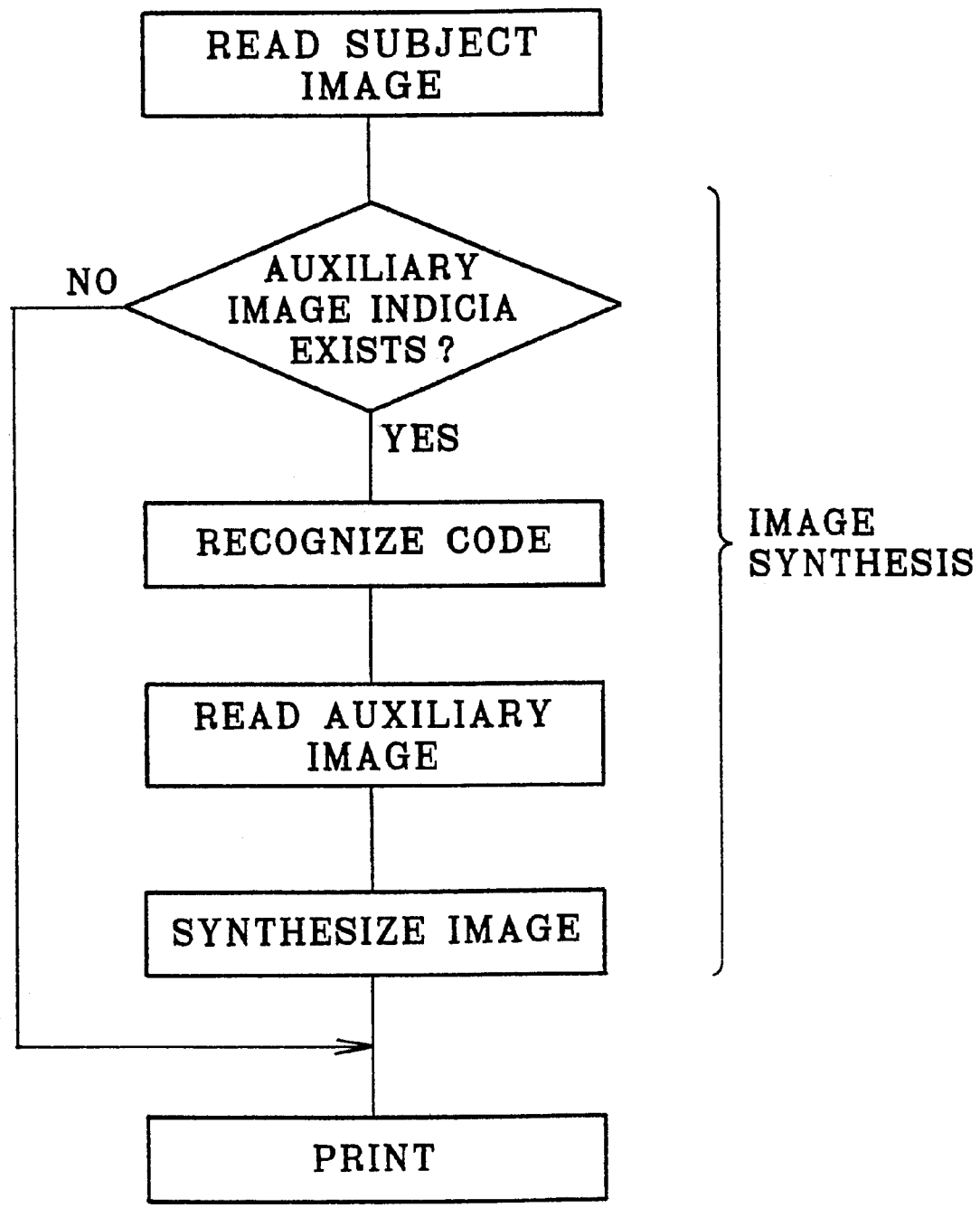
FIG. 45 is a flow chart illustrating a printing operation.

The operation of the above construction is described with reference to the flow in FIG. 45. A user selectively purchases the lens-fitted photo film unit as he or she desires to insert a caption or auxiliary image suitable for photographs to be taken. Samples of the auxiliary image are printed on the label of the lens-fitted photo film unit and on the surface of the packaging bag packaging the same. The user does not fail to obtain the lens-fitted photo film unit as desired. If he or she wishes to have a product suitable for a marriage ceremony, he or she purchases the lens-fitted photo film unit 352 of which the auxiliary image is the caption related to the marriage ceremony.

Exposures are taken to expose all the imaging frames 370 on the photo film 368. Then the lens-fitted photo film unit 352 is forwarded by the user to a photo laboratory, where an operator subjects the photo film to photofinishing. After the photo film 368 is developed, the digital printer is used for producing prints. In FIG. 45, the scanner in the digital printer reads an image in the imaging frame 370 of the photo film 368 at first. The subject image data being read is stored in a subject image memory in a provisional manner.

Then the digital printer detects presence or absence of the auxiliary indica area 379 in the optical indica area 378 of the photo film 368. If the auxiliary indica area 379 does not exist, it is determined that the photo film 368 has been exposed in a camera or a conventional type of lens-fitted photo film unit. Prints are produced on photographic paper by use of a subject image stored in the memory.

If existence of the auxiliary indica area 379 is detected on the photo film 368, the digital printer discerns the code represented by the auxiliary indica area 379. Plural types of auxiliary images are stored in the memory. In accordance with the discerned code, data of an associated one of the auxiliary images is written to a work memory. The digital printer combines the subject image data and the auxiliary image data, the subject image data being stored in the subject image data memory, the auxiliary image data being stored in the work memory. In the course of the image synthesis, portions of the subject image data of the subject image overlapped on the auxiliary images are deleted.

The synthesis produces combined image data. A known digital printing technique, such as CRT, laser, liquid crystal and the like, is used to expose the color photographic paper according to the combined image data. In FIG. 44, the print 384 is obtained, inclusive of the subject image 385 and the auxiliary images 386a and 386b. After the printing, the photo film 368 is accommodated in the cassette 367 again, and returned to the user while the print 384 is supplied.

If the user does not wish the image synthesis, he or she can request a photofinisher to produce prints only with the subject image. This is effective both at the time of an initial request of photofinishing and at the time of a subsequent request of extra printing.

In the present embodiment, the auxiliary image is only one kind common to all the imaging frames 370 of the photo film 368. However auxiliary images may be predetermined differently between any of the imaging frames 370. Or the imaging frames 370 may be grouped into plural groups, each of which may be associated with one predetermined auxiliary image. Furthermore a magnetic data track 374 may be used to store a code of the auxiliary image according to magnetic recording. The photo film 368 is entirely coated with the magnetic recording layer. Thus the code of the auxiliary image may be magnetically recorded to a portion other than the magnetic data track 374.

In the above embodiment, the information of the auxiliary image and the subject image is digitalized to combine the auxiliary image with the subject image. However the subject image from the photo film 368 may be optically exposed on the color photographic paper by use of photographic printer or enlarger. After this the auxiliary image may be digitally printed with the subject image.

In the above embodiment, elimination of the auxiliary image, if desired by a user, is instructed to photofinisher directly by the user. Alternatively a lens-fitted photo film unit may be provided with a construction in which insertion or elimination of the auxiliary image can be selected. Elements similar to those of the above embodiment are designated with identical reference numerals.

Figure 46:
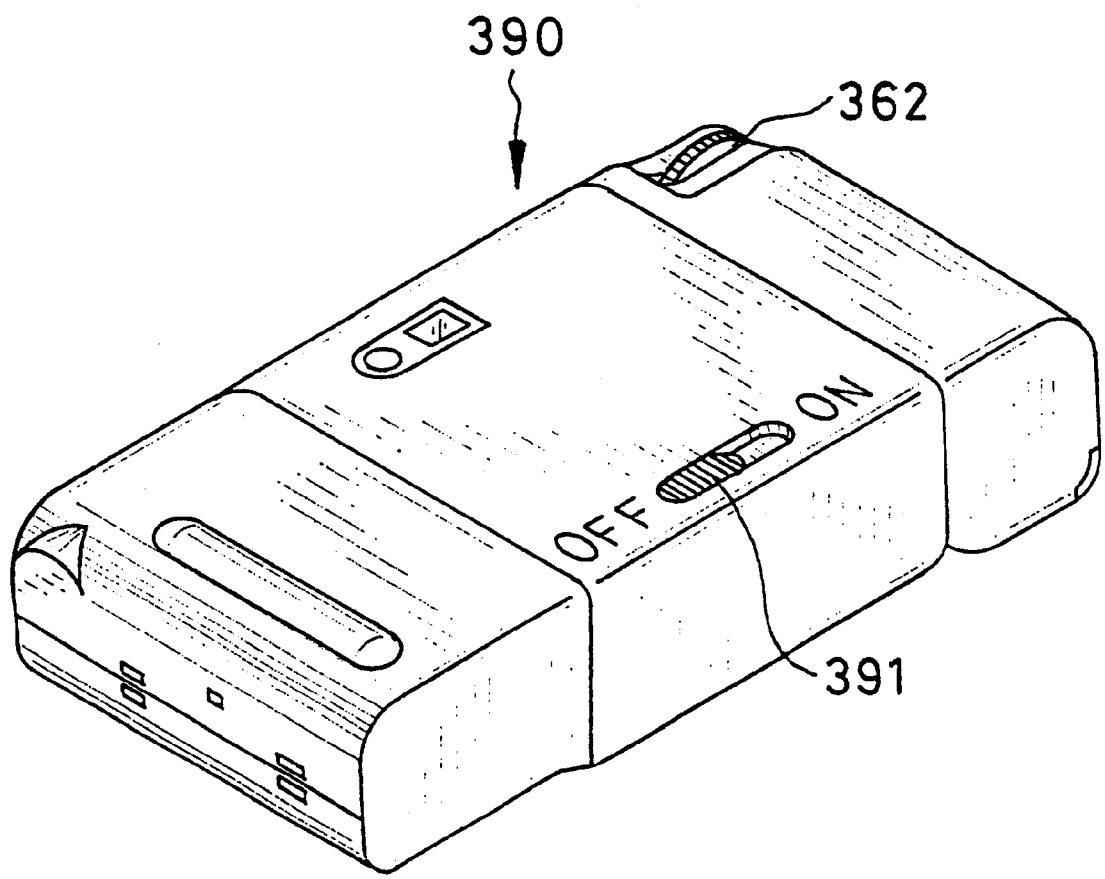
FIG. 46 is a perspective illustrating a rear of another preferred lens-fitted photo film unit in which insertion and elimination of an auxiliary image is selectable.

In FIG. 46, a lens-fitted photo film unit 390 has a device for designating insertion or elimination of the auxiliary image can be selected. An operation button 391 is disposed on the rear of the lens-fitted photo film unit 390 to be set in a selected one of two positions. The operation button 391 is horizontally slidable. Before a winder wheel 362 is rotated each time after one exposure, the operation button 391 is slid to the on-position, to instruct the insertion of the auxiliary image for the imaging frame. Note that the operation button 391 is biased by a spring (not shown) to the off-position, where the operation button 391 is kept when not pushed externally.

Figure 47:
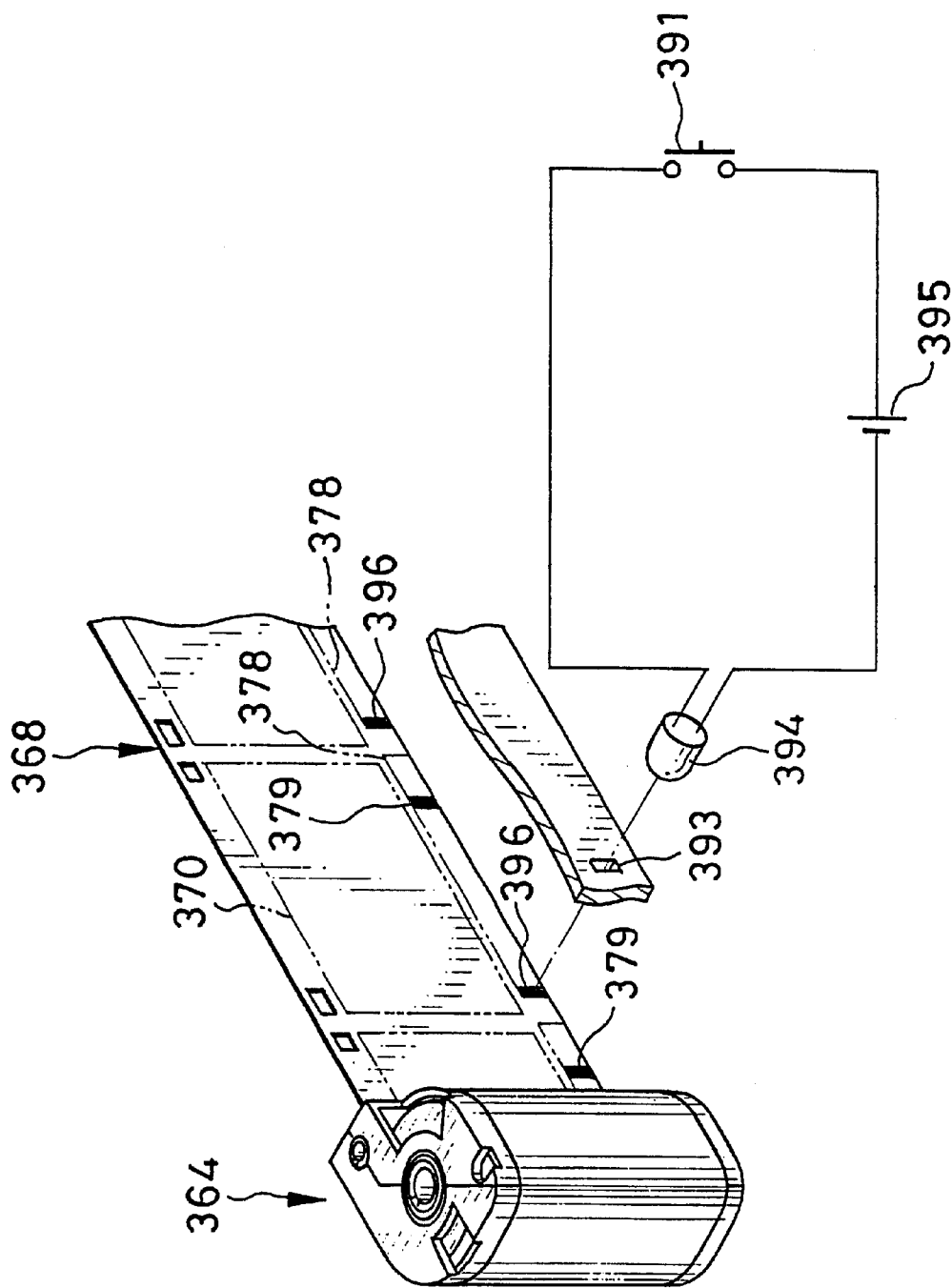
FIG. 47 is an explanatory view illustrating a designator device in the lens-fitted photo film unit of FIG. 46.

In FIG. 47, the photo film 368 of the photo film cassette 364 to be used in the lens-fitted photo film unit 390 has the auxiliary indica area 379, prerecorded in the optical indica area 378, for representing the type of the auxiliary image. This is similar to the counterpart of the above embodiment.

The synthesis designator device is constituted of an opening 393, an imprinter LED 394, a dry battery 395, and the operation button 391. The opening 393 is located in a low position associated with the optical indica area 378. The imprinter LED 394 is disposed in front of the opening 393. The battery 395 is a power source for driving the imprinter LED 394. The battery 395 is also a power source of the flash unit. When the operation button 391 is shifted to the on-position, the imprinter LED 394 emits light, which is passed through the opening 393 to expose an end of the optical indica area 378 of the photo film 368. A synthesis command indica 396 is imprinted by the imprinter LED 394, and represents the command of insertion of the auxiliary image. At the time of printing, existence of the synthesis command indica 396 is detected, so that the auxiliary image is used for the image synthesis.

Still another preferred lens-fitted photo film unit is described now, in which auxiliary images of plural types are predetermined, and selectively designated by a user. Elements similar to those of the above embodiments are designated with identical reference numerals.

Figure 48:
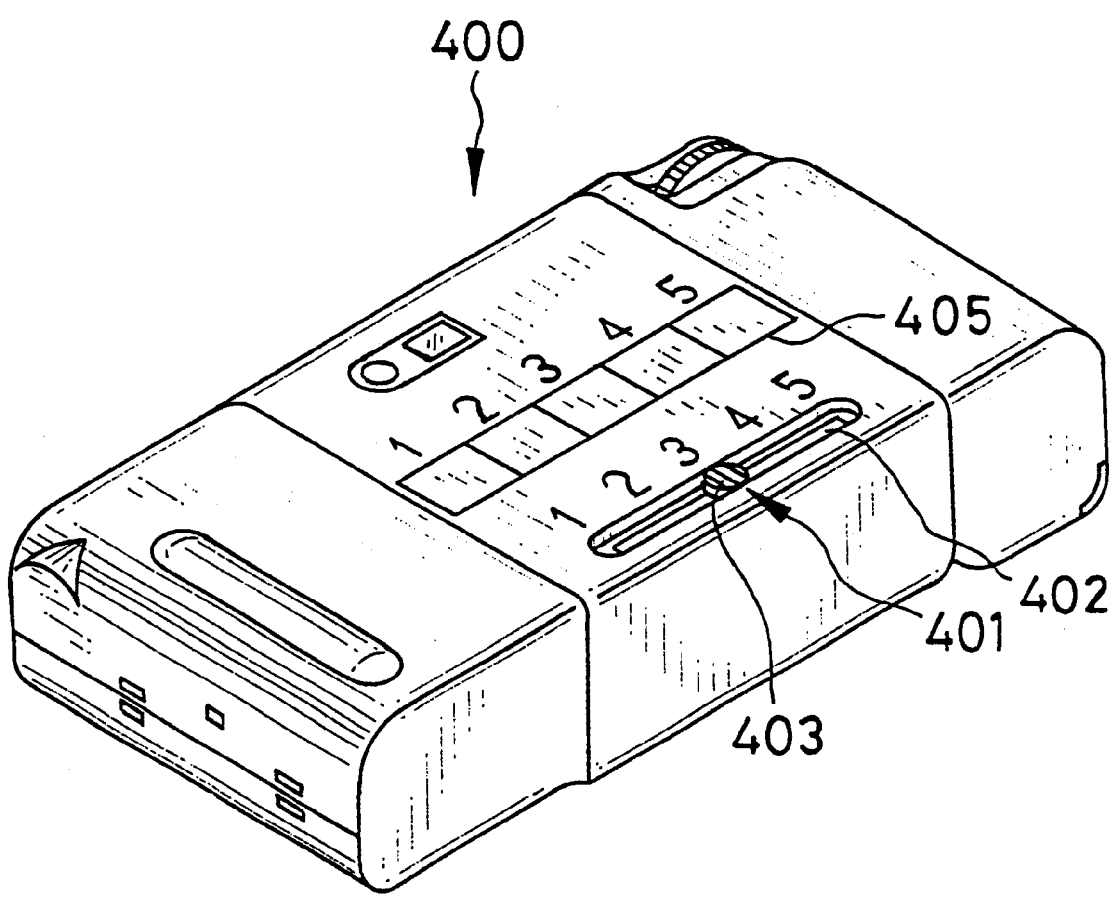
FIG. 48 is a perspective illustrating a rear of still another preferred lens-fitted photo film unit in which one of plural auxiliary images is selectable.

In FIG. 48, a lens-fitted photo film unit 400 has a selector for selectively designating one of five types of predetermined auxiliary images. An image selector 401 is disposed on the rear of the lens-fitted photo film unit 400 in an externally operable manner. The image selector 401 is constituted of a slit 402 and an operation button 403 horizontally slidable in the slit 402. The operation button 403 is settable in a selected one of five positions indicated by signs 1–5.

There are five sample images 405, disposed on the rear of the label 354 and above the image selector 401, associated with the set positions of 1–5 of the image selector 401, for indicating respective auxiliary images in reduction. A user observes the sample images 405, and slides the operation button 403 to a position of a desired one of the sample images 405 to select one of the auxiliary images.

Figure 49:
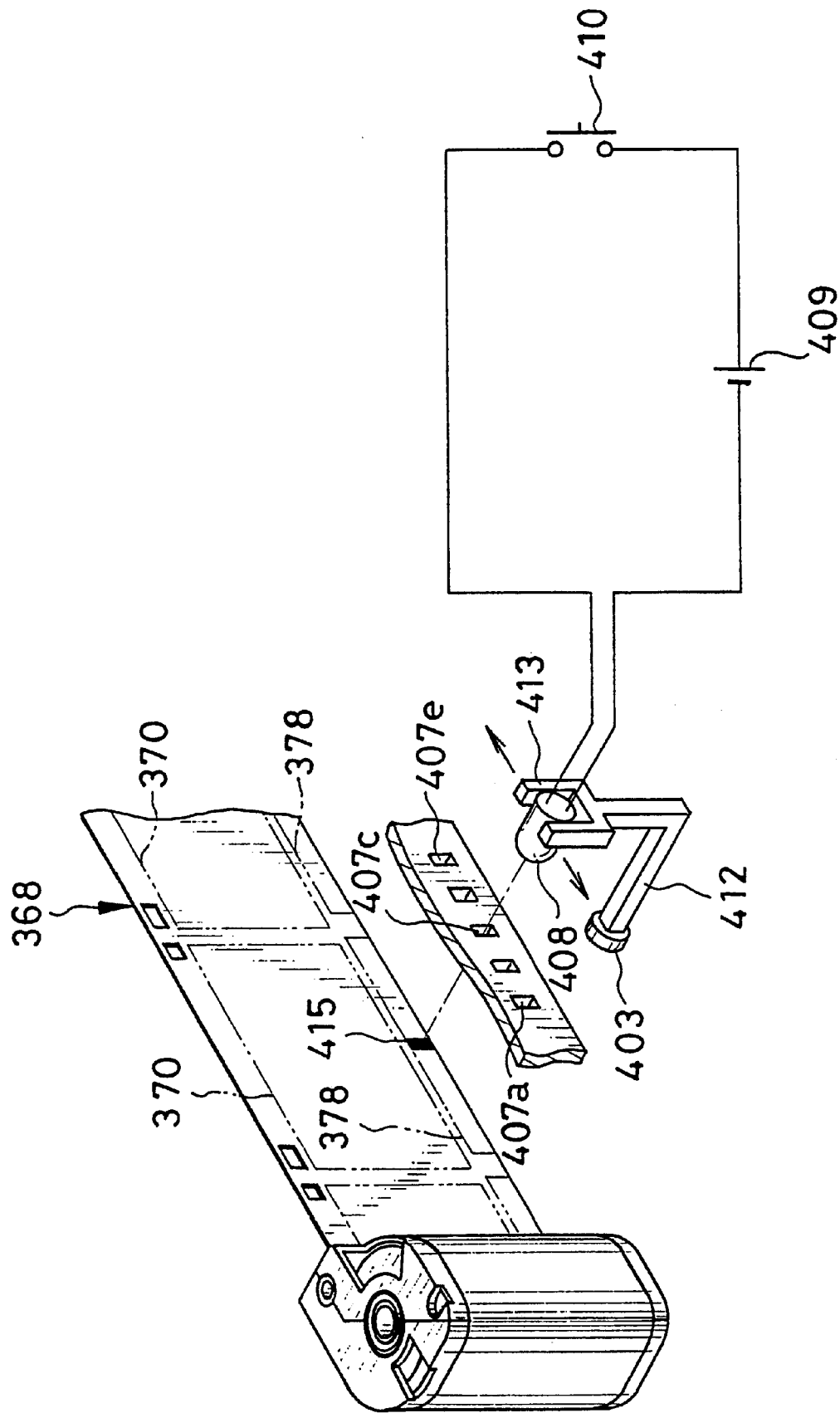
FIG. 49 is an explanatory view illustrating a selector in the lens-fitted photo film unit of FIG. 48.

In FIG. 49, the optical indica area 378 of the photo film 368 to be used in the lens-fitted photo film unit 400 does not have a prerecorded indica for representing the type of the auxiliary image.

An image selector unit is constituted by openings 407a–407e, an imprinter LED 408, a dry battery 409 and an imprinter synchro switch 410. The openings 407a–407e are disposed in a position of the optical indica area 378. The imprinter LED 408 are confronted with the openings 407a–407e. The battery 409 is a power source for driving the imprinter LED 408. The battery 409 is also a power source of the flash unit. The imprinter synchro switch 410 is used for synchronization with emission of flash light of the flash unit. The imprinter synchro switch 410 is turned on when depressed by the shutter blade opening and closing the shutter opening.

A slider 412 is formed with the operation button 403 of the image selector 401. An end of the slider 412 has a fork 413, which fixedly holds the imprinter LED 408. When the operation button 403 is set in any of the set positions at the signs, the imprinter LED 408 comes in front of one of the openings 407a–407e after sliding with the operation button 403. If, for example, the operation button 403 is set at the sign "3", the imprinter LED 408 comes in front of the opening 407c. Then the shutter release button 356 is depressed to release the shutter mechanism, of which the shutter blade turns on the imprinter synchro switch 410.

When the imprinter synchro switch 410 is turned on, the imprinter LED 408 emits light, which is passed through the opening 407c to expose the optical indica area 378 on the photo film 368. An auxiliary image indica 415 is imprinted by the imprinter LED 408, and represents the type of the auxiliary image. At the time of printing, the position of the auxiliary image indica 415 is detected, so that the auxiliary image of this type is used for the image synthesis.

In FIGS. 46–49, the optical recording of indica is used for imprinting insertion or elimination of an auxiliary image, or imprinting a selected type of auxiliary image. However the magnetic recording may be used for recording data related to the same. In the above embodiments, the lens-fitted photo film unit is pre-loaded with IX 240 type of photo film cassette of which a body is plastic. However a lens-fitted photo film unit may contain 135 type of photo film cassette. The present invention is applicable to a camera in which a photo film cassette is used.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photographic print producing method of producing a photographic print from an imaging frame on photo film in a printer, said photographic print producing method comprising steps of:

determining whether prerecorded photo film data has been identically imprinted adjacent each of said imaging frames on a first edge of said photo film, and if said photo film data is present, interpreting said photo film data to represent a selected one of a plurality of processing parameters;

determining whether an optical indicium exists adjacent each said imaging frame on a second edge of said photo film, and if said optical indicium is present, interpreting each said optical indicium as representing a selected one of a plurality of options within said selected one of said plurality of processing parameters; and if said optical indicium and said photo film data exist on said photo film, controlling said printer to produce said photographic print utilizing the selected option indicated by the optical indicium within the selected processing parameter indicated by the photo film data.

2. A photographic print producing method as defined in claim 1, wherein said printer is a digital printer in which an image of said imaging frame is photoelectrically converted to obtain image data, and said image is optically exposed on photographic paper according to said image data;

said image data is processed according to said selected option within the selected processing parameter.

3. The photographic print producing method of claim 1, wherein the plurality of processing parameters represented by the photo film data include aspect ratio of the photographic print and degree of magnification of the final print.

4. The photographic print producing method of claim 3, wherein the plurality of processing parameters represented by the photo film data further includes a selection of tonal value of the photographic print.

5. The photographic print producing method of claim 4, wherein the plurality of options within the parameter of tonal value of the final print includes color print, sepia-toned print, and black-and-white print.

6. The photographic print producing method of claim 4, wherein the plurality of processing parameters represented by the photo film data further includes a parameter representing a choice between standard print, slim print, and soft print.

7. A photographic print producing method of producing a photographic print from an imaging frame on photo film in a printer, said photographic print producing method comprising steps of:

determining whether color-tone data exists for said imaging frame on said photo film, said color-tone data being predetermined for one of plural printing color-tone conditions;

determining whether photo film data exists on said photo film, said photo film data signaling directly or indirectly that said color-tone data designates said one printing color-tone condition; and if said color-tone data and said photo film data exist on said photo film, controlling said printer according to said one printing color-tone condition, so as to obtain said photographic print.

8. A photographic print producing method as defined in claim 7, wherein said printer is a digital printer in which an image of said imaging frame is photoelectrically converted to obtain image data, and said image is optically exposed on photographic paper according to said image data;

said image data is processed according to said color-tone data.

* * * * *

UNITED STATES PATENT AND TRADEMARK OFFICE
CERTIFICATE OF CORRECTION

PATENT NO. : 6,313,904 B1  
DATED : November 6, 2001  
INVENTOR(S) : Kamata et al.

Page 1 of 1

It is certified that error appears in the above-identified patent and that said Letters Patent is hereby corrected as shown below:

Title page,
Item [30], Foreign Application Priority Data, the number of the March 26, 1998 Japanese Application should be as follows:

-- Mar. 26, 1998   (JP) ............................ 10-78857 --.

Signed and Sealed this

Twenty-third Day of April, 2002

*Attest:*

JAMES E. ROGAN  
*Attesting Officer*  *Director of the United States Patent and Trademark Office*